(12) United States Patent
Yahata et al.

(10) Patent No.: US 12,391,177 B2
(45) Date of Patent: Aug. 19, 2025

(54) CONTROL METHOD AND CONTROL DEVICE

(71) Applicant: Panasonic Intellectual Property Management Co., Ltd., Osaka (JP)

(72) Inventors: Hiroshi Yahata, Osaka fu (JP); Tomoyuki Hirota, Hyogo ken (JP); Takahiro Nishi, Nara ken (JP); Tadamasa Toma, Osaka fu (JP); Toshiyasu Sugio, Osaka fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 294 days.

(21) Appl. No.: 18/123,743

(22) Filed: Mar. 20, 2023

(65) Prior Publication Data
US 2023/0302990 A1    Sep. 28, 2023

(30) Foreign Application Priority Data

Mar. 28, 2022 (JP) ................................. 2022-051845
Jan. 20, 2023 (JP) ................................. 2023-007248

(51) Int. Cl.
| | |
|---|---|
| *B60Q 3/00* | (2017.01) |
| *B60Q 3/217* | (2017.01) |
| *B60Q 3/233* | (2017.01) |
| *B60Q 3/30* | (2017.01) |
| *B60Q 3/70* | (2017.01) |
| *B60Q 3/80* | (2017.01) |
| *G06Q 10/02* | (2012.01) |

(52) U.S. Cl.
CPC ............... *B60Q 3/80* (2017.02); *B60Q 3/217* (2017.02); *B60Q 3/233* (2017.02); *B60Q 3/30* (2017.02); *B60Q 3/731* (2022.05); *G06Q 10/02* (2013.01)

(58) Field of Classification Search
None
See application file for complete search history.

(56) References Cited

U.S. PATENT DOCUMENTS

| | | | |
|---|---|---|---|
| 10,527,428 B1* | 1/2020 | Mehta | G05D 1/0027 |
| 11,067,983 B2* | 7/2021 | Kentley-Klay | G07C 5/00 |

(Continued)

FOREIGN PATENT DOCUMENTS

| | | |
|---|---|---|
| JP | 2021-086307 A | 6/2021 |
| JP | 2021-146893 A | 9/2021 |

*Primary Examiner* — James M McPherson
(74) *Attorney, Agent, or Firm* — GREENBLUM & BERNSTEIN, P.L.C.

(57) ABSTRACT

According to the present disclosure, a control method of a vehicle including a communication circuit capable of communicating with a computer via a network includes: acquiring, from the computer via the communication circuit, first reservation information including first boarding area information indicating a first boarding area, first seat information indicating a first seat, and first color information indicating a first color; causing the vehicle to travel to the first boarding area based on the first boarding area information; and causing, in the first boarding area, at least two lighting devices to emit light of the first color based on the first color information, the at least two lighting devices being selected from a group consisting of a first door light indicating a first door, a first seat light indicating the first seat, and a first baggage light indicating an installation position or a lock.

2 Claims, 43 Drawing Sheets

(56) References Cited

U.S. PATENT DOCUMENTS

| | | | | |
|---|---|---|---|---|
| 12,118,588 | B2* | 10/2024 | MacNeille | G01C 21/3476 |
| 2004/0201277 | A1* | 10/2004 | Hentsch | G07C 9/00309 |
| | | | | 307/10.1 |
| 2017/0213308 | A1* | 7/2017 | Wellborn | G01C 21/3453 |
| 2018/0218470 | A1* | 8/2018 | Belwafa | G06Q 50/40 |
| 2020/0070715 | A1* | 3/2020 | Krause | B60Q 3/76 |
| 2020/0116503 | A1* | 4/2020 | Salter | B61L 15/009 |
| 2020/0294173 | A1* | 9/2020 | Shah | G06Q 10/02 |
| 2021/0350046 | A1* | 11/2021 | Bosson | G06Q 50/40 |
| 2022/0108235 | A1* | 4/2022 | Schulz | G06Q 10/025 |
| 2022/0155086 | A1* | 5/2022 | Woo | G01C 21/365 |
| 2022/0265881 | A1* | 8/2022 | Kakuchi | A61L 9/16 |
| 2022/0292850 | A1 | 9/2022 | Muroi | |
| 2022/0390938 | A1* | 12/2022 | Villar | B60K 35/81 |
| 2023/0010445 | A1* | 1/2023 | Alspach | B60N 2/0025 |

* cited by examiner

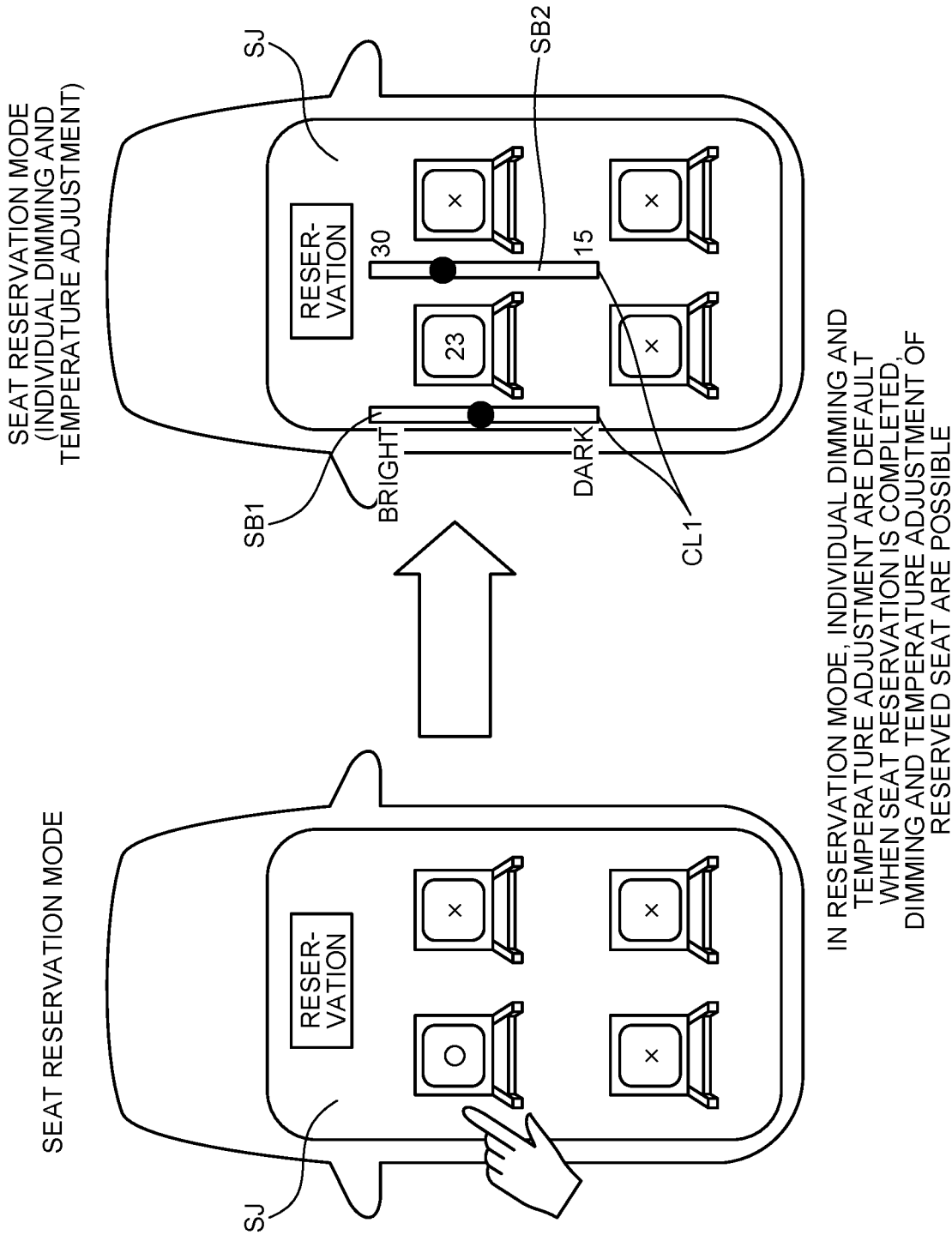

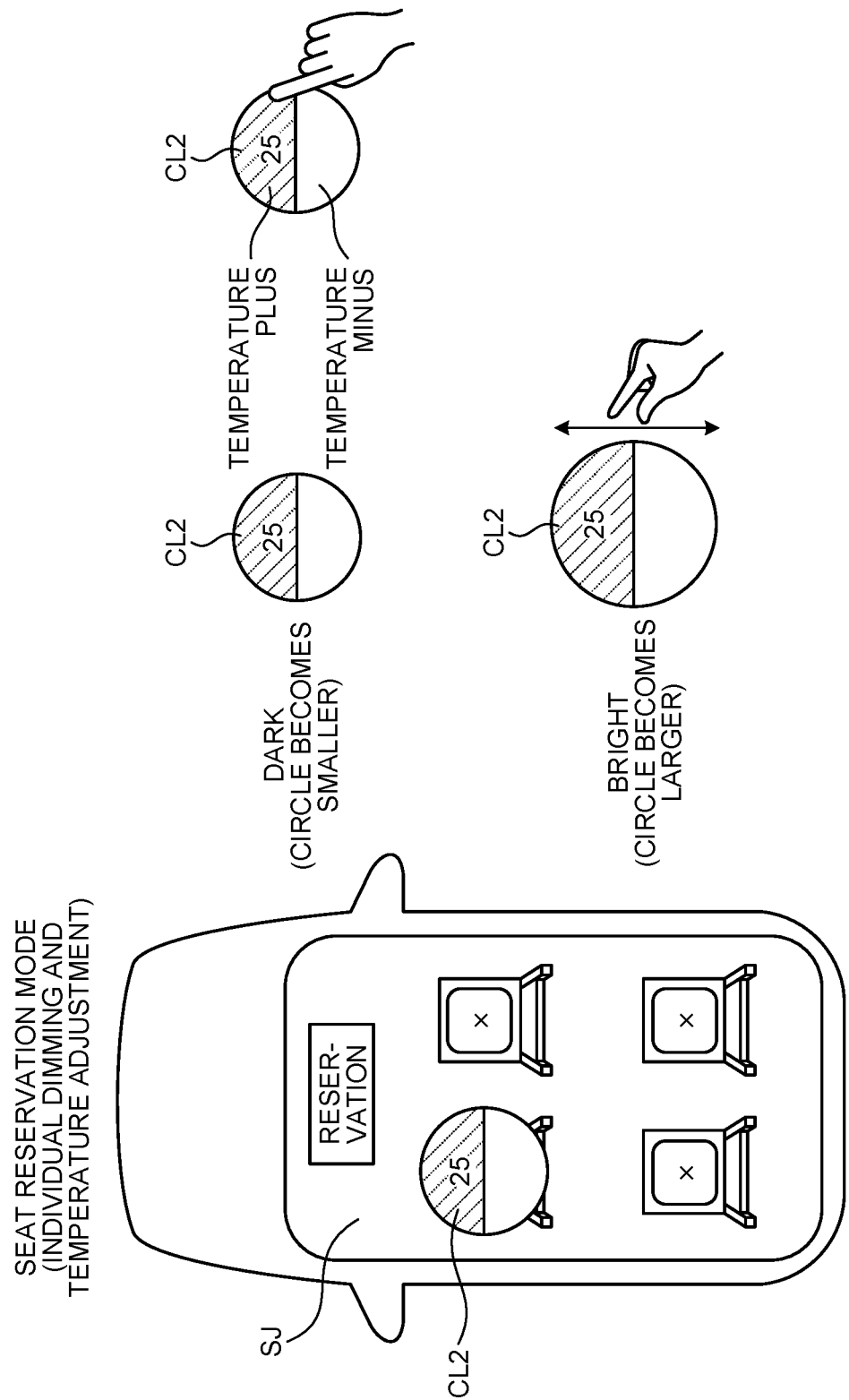

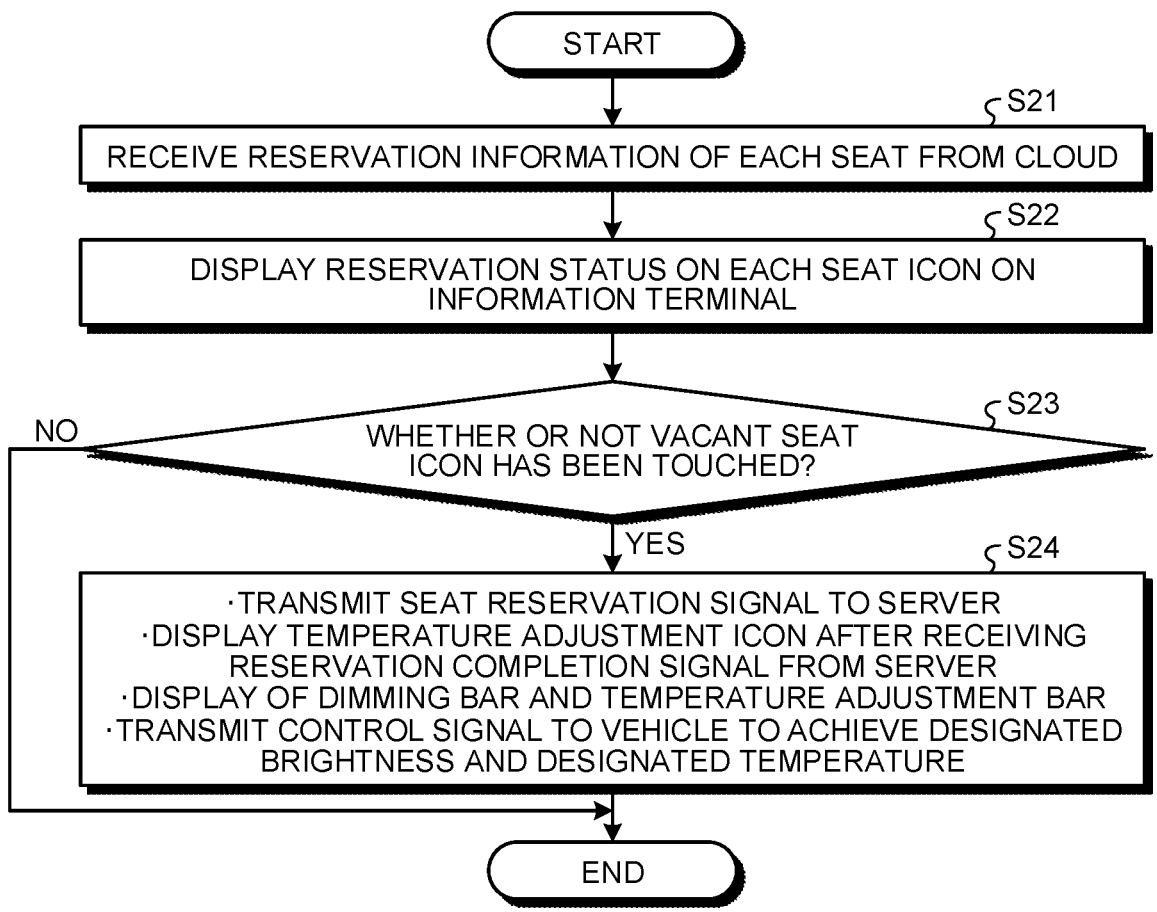

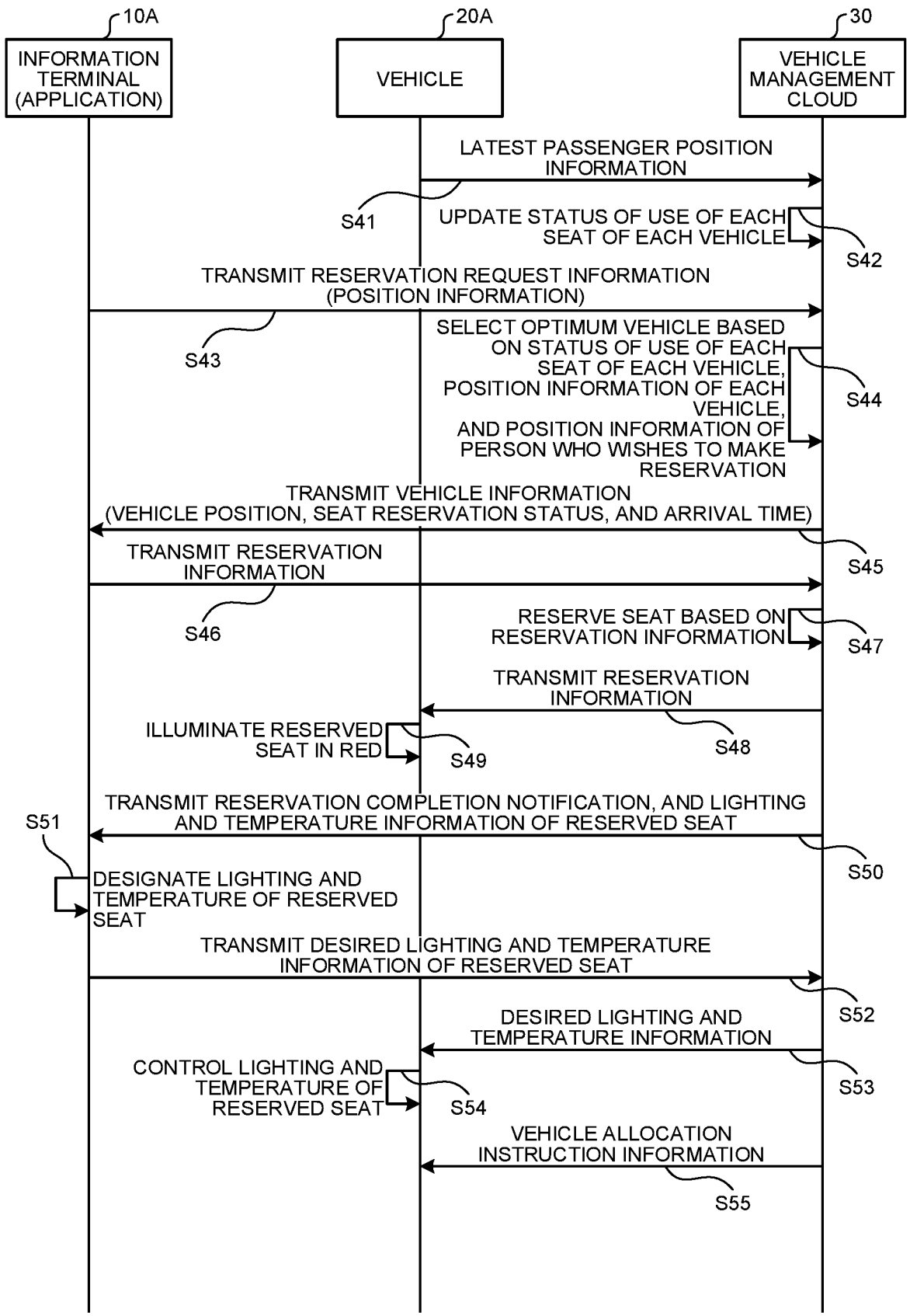

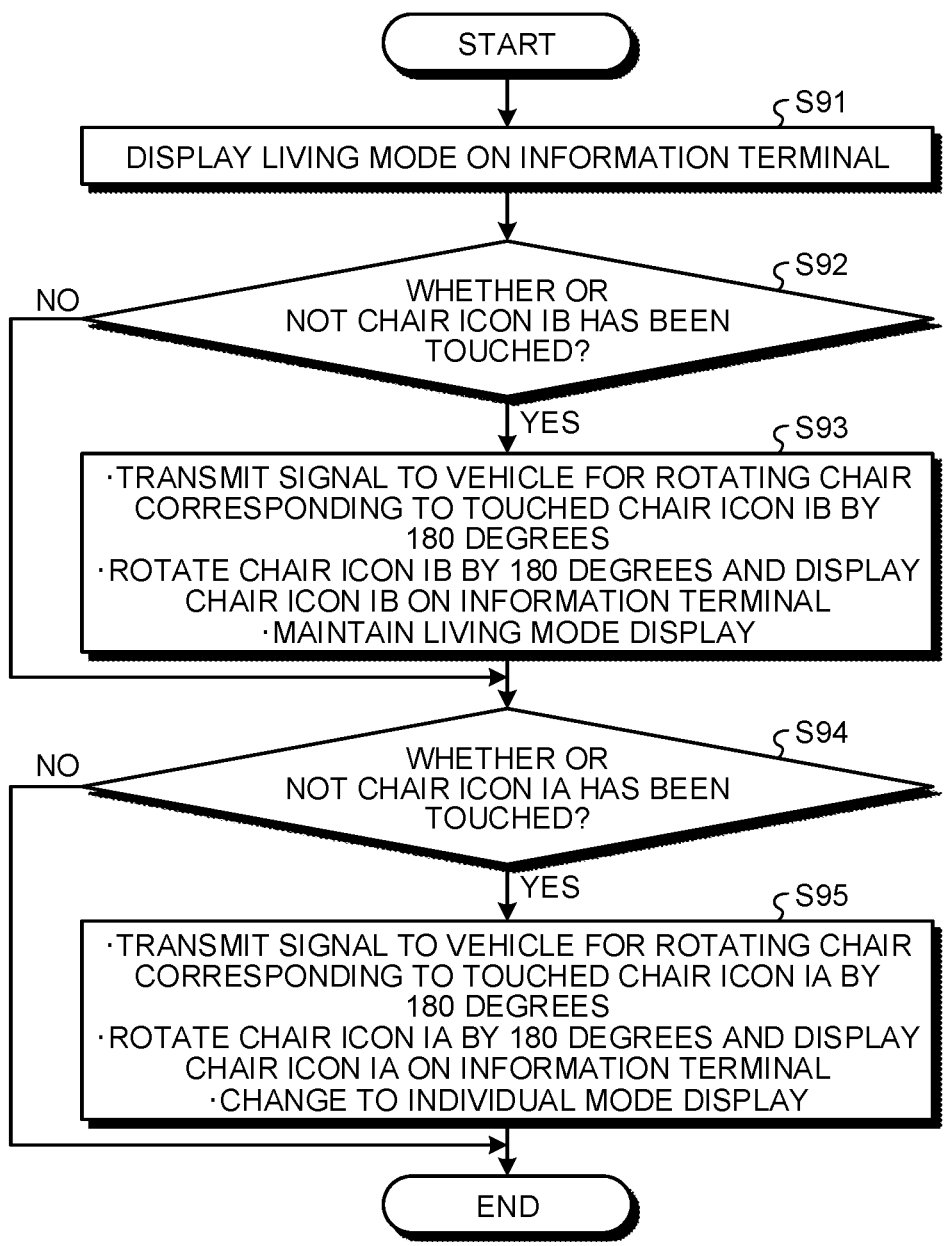

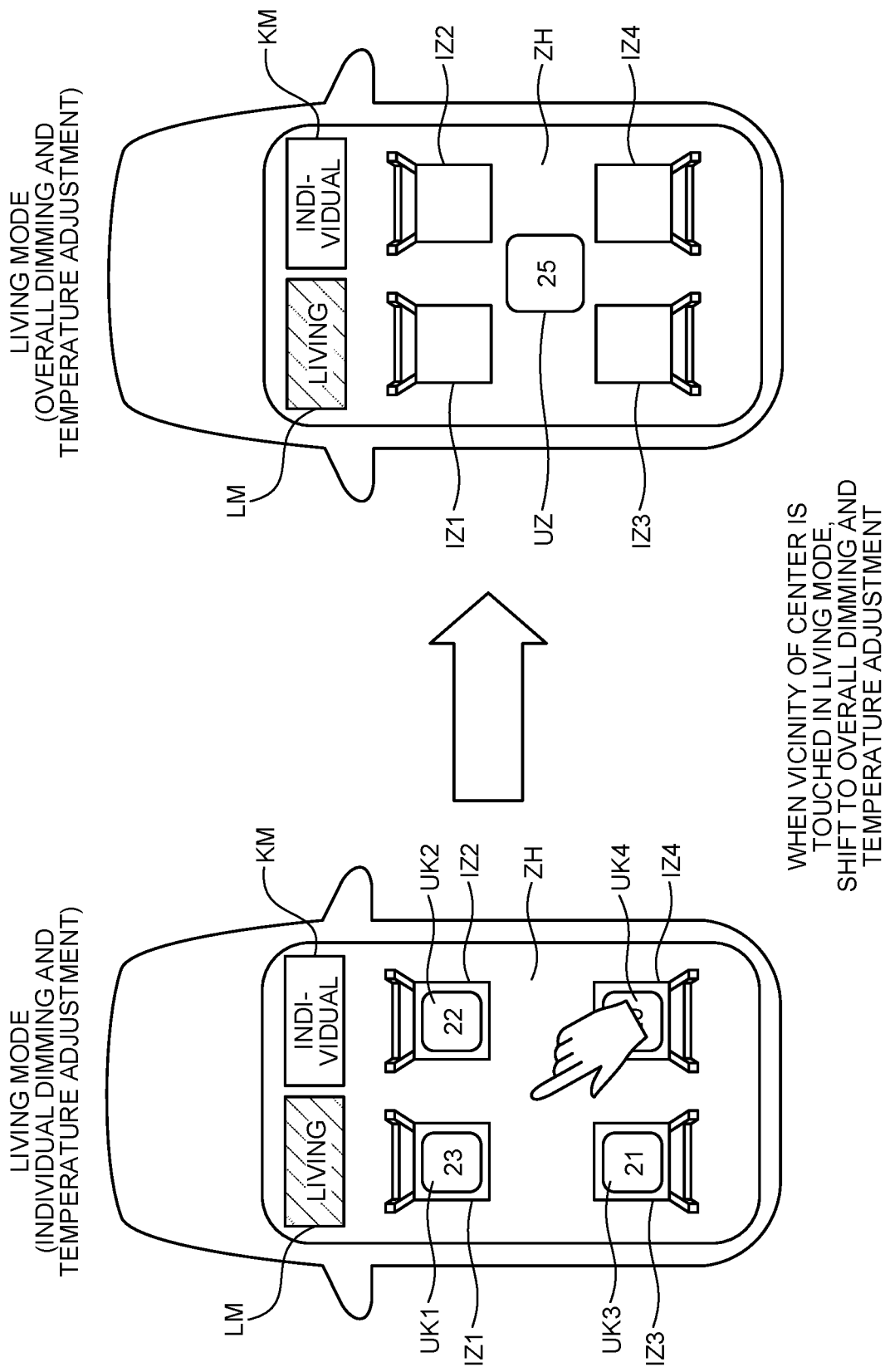

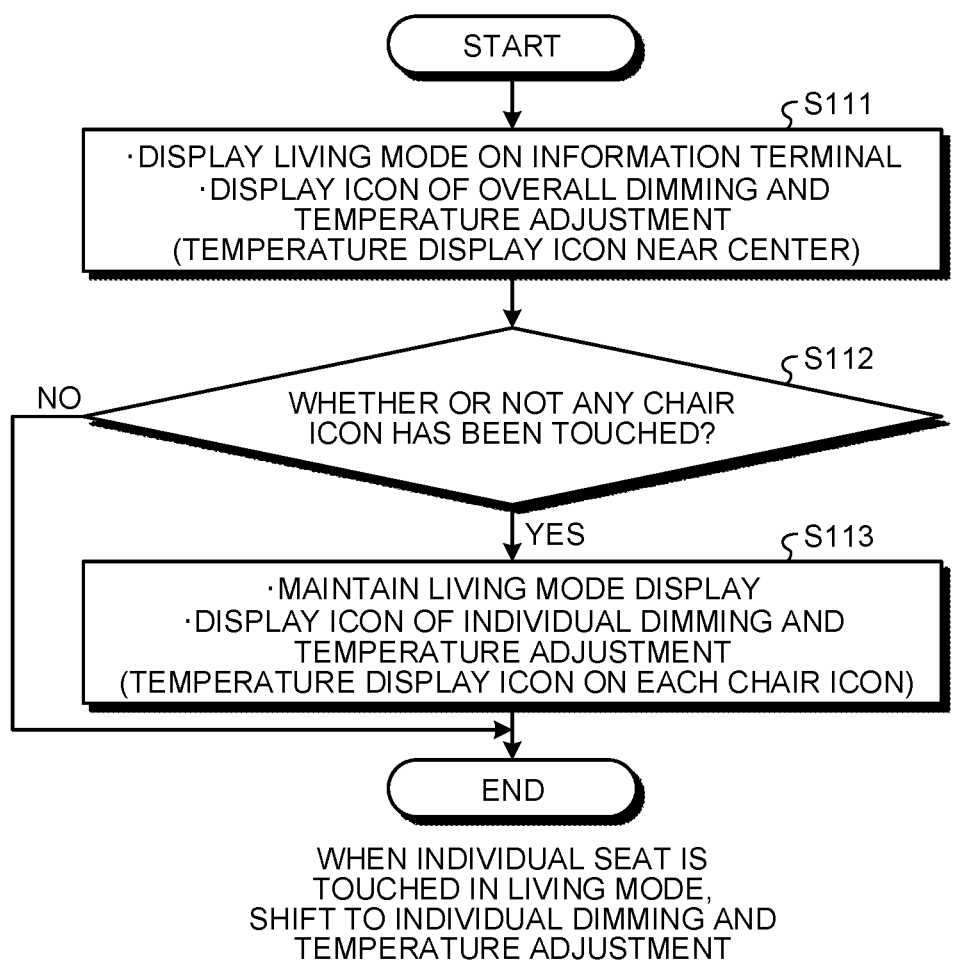

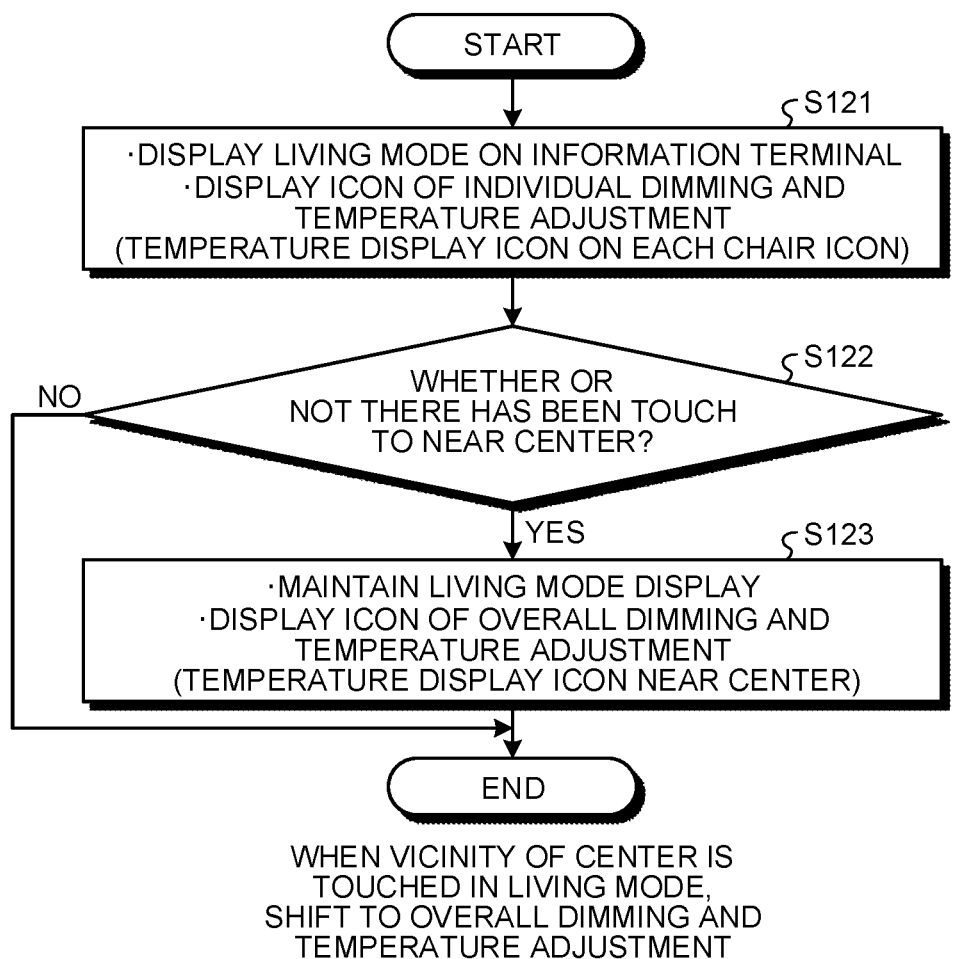

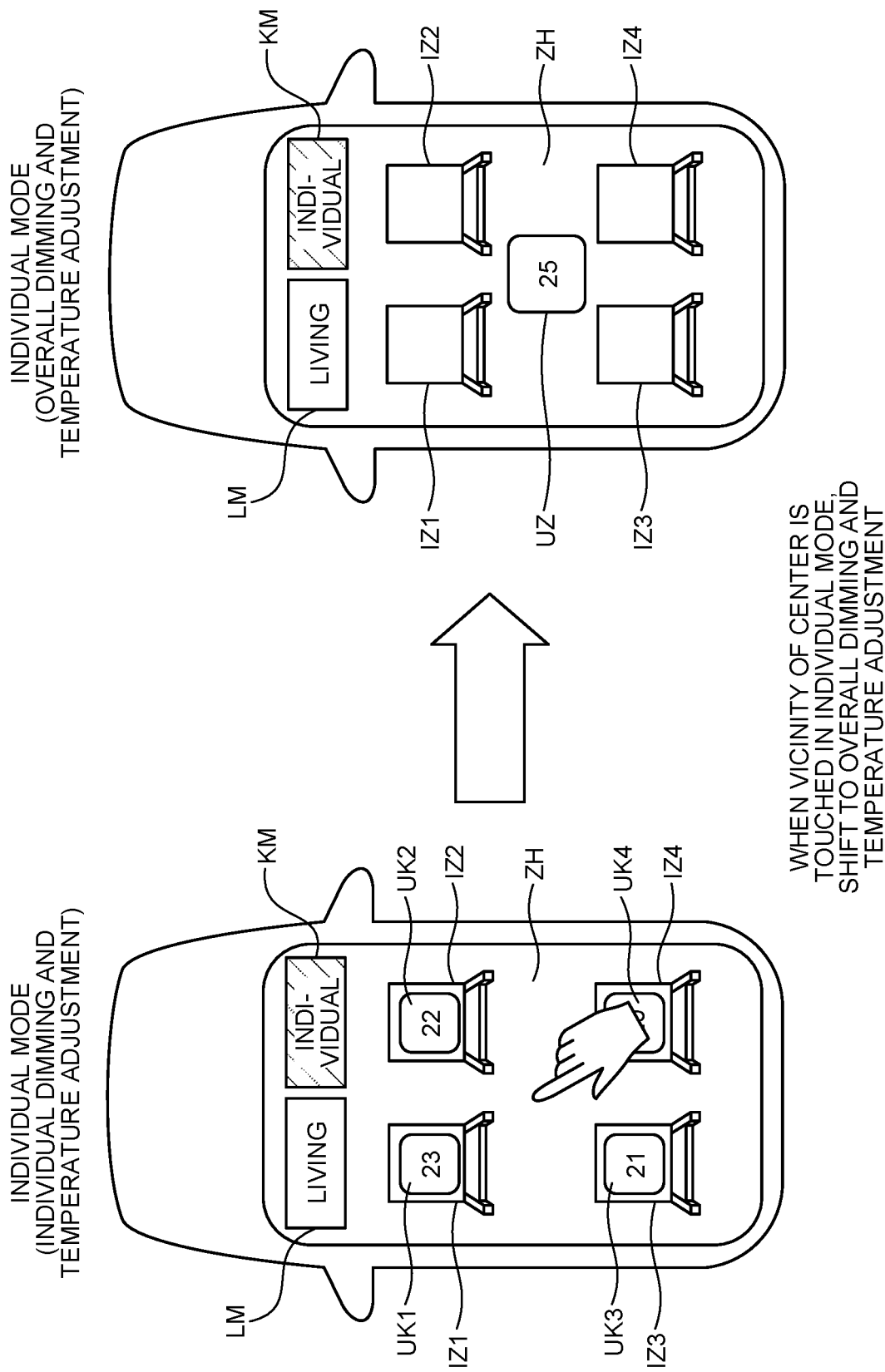

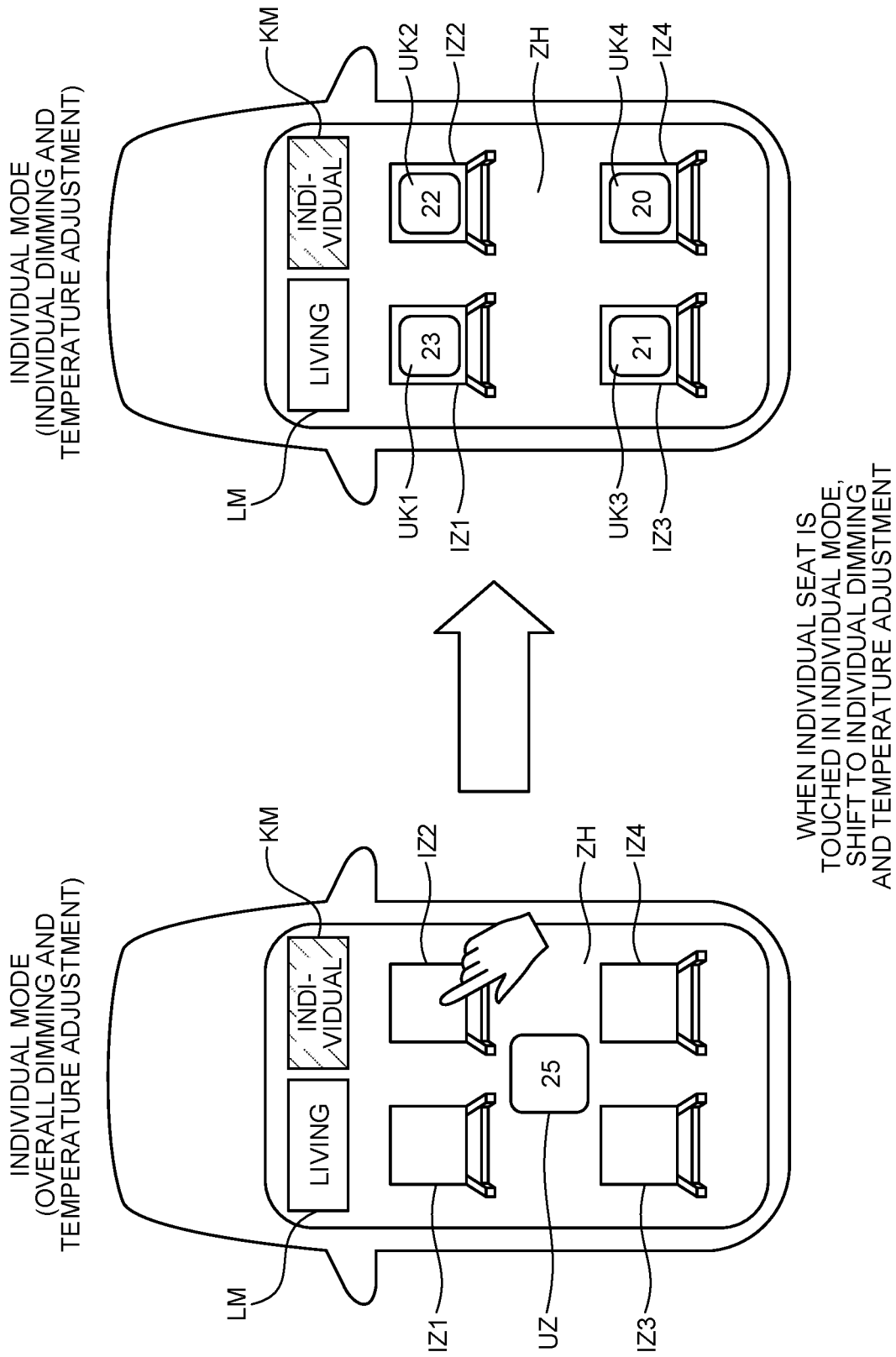

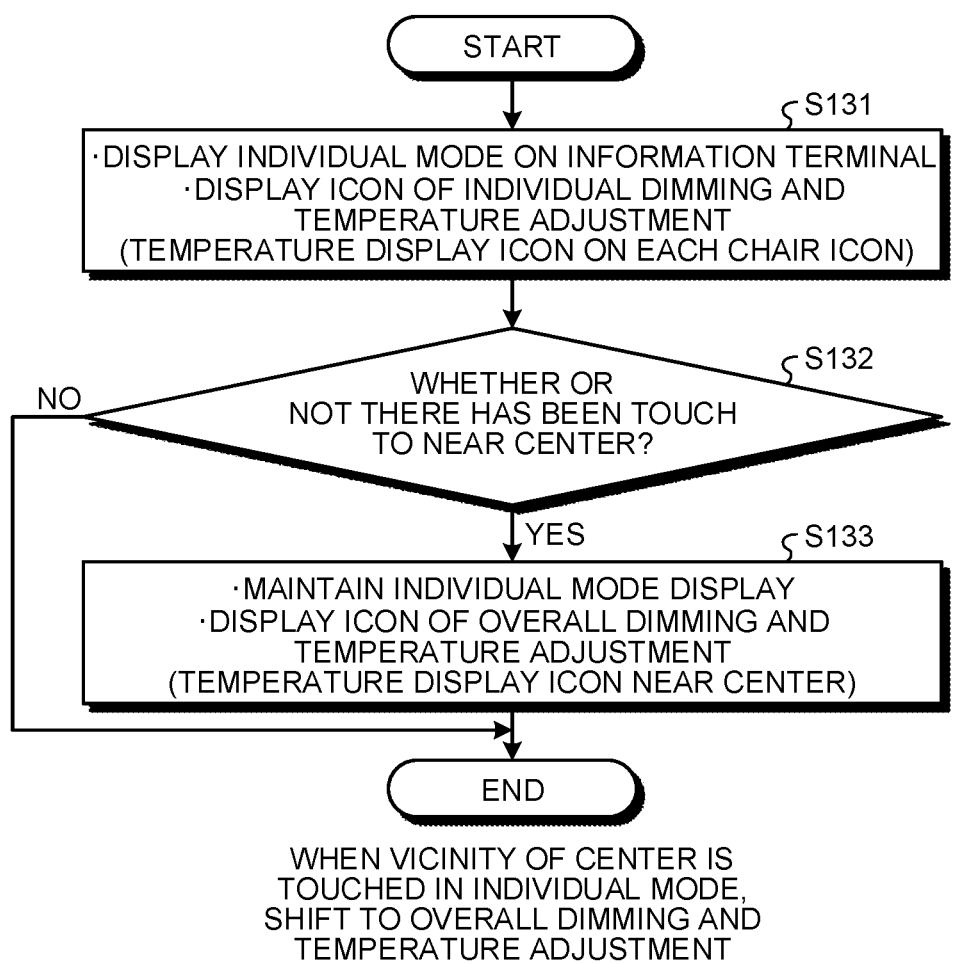

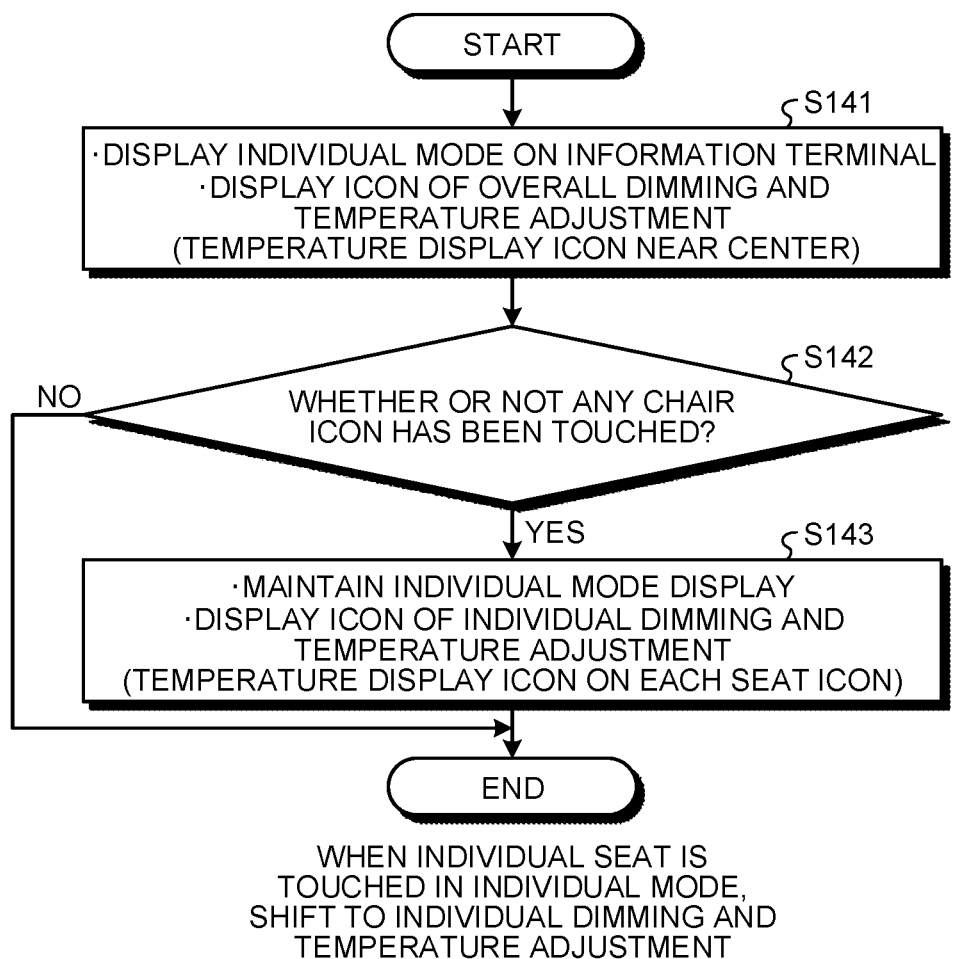

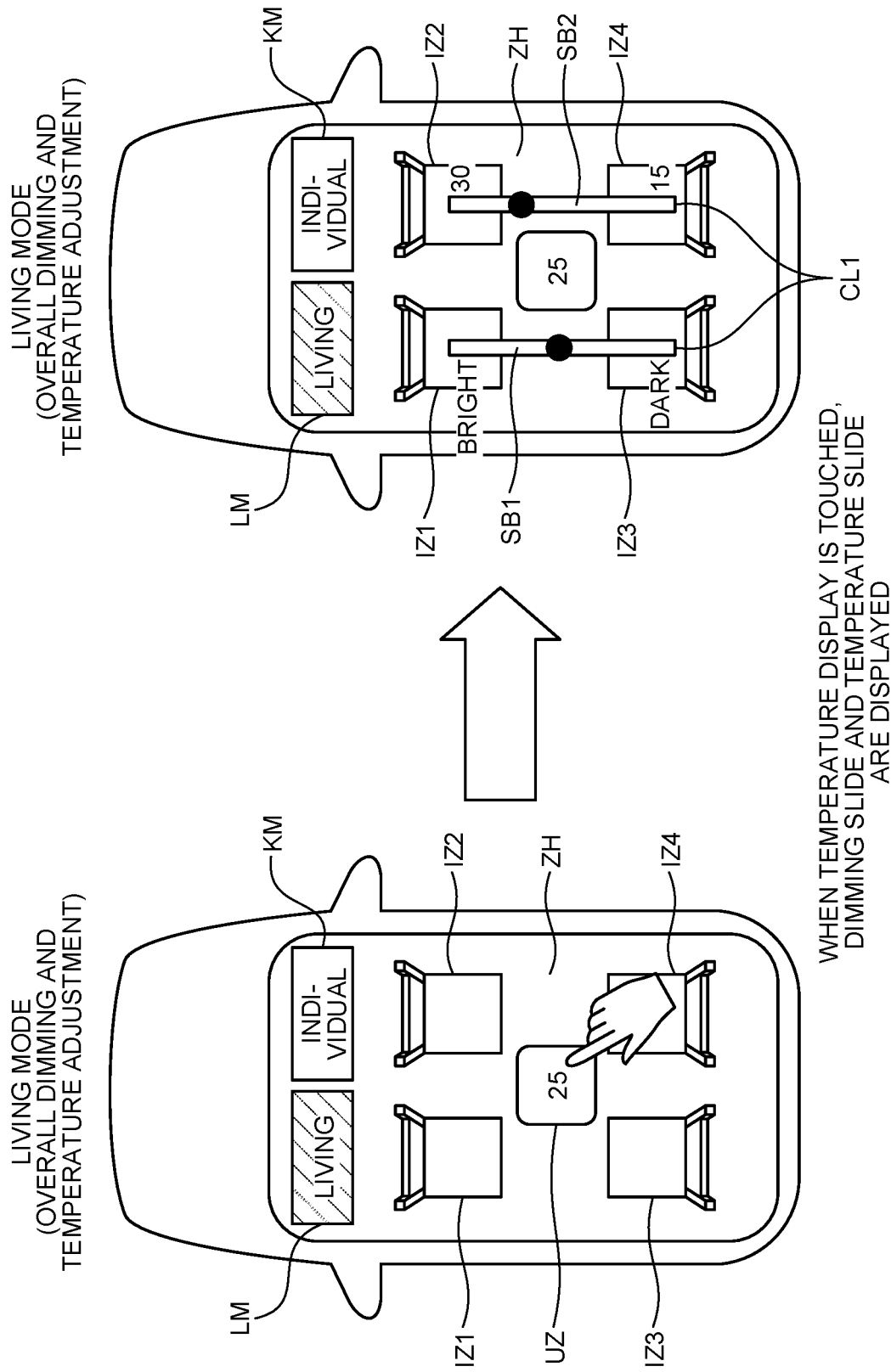

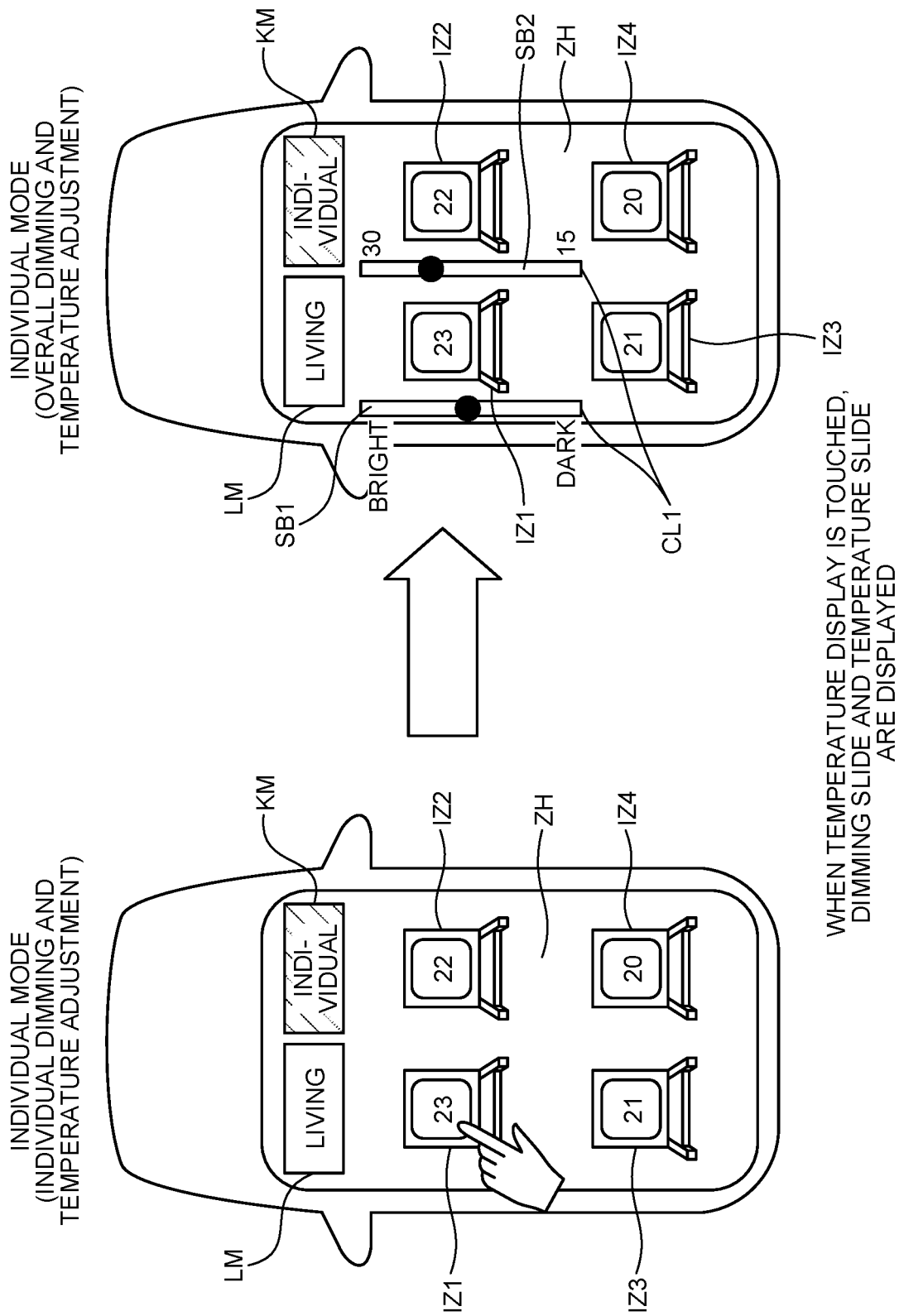

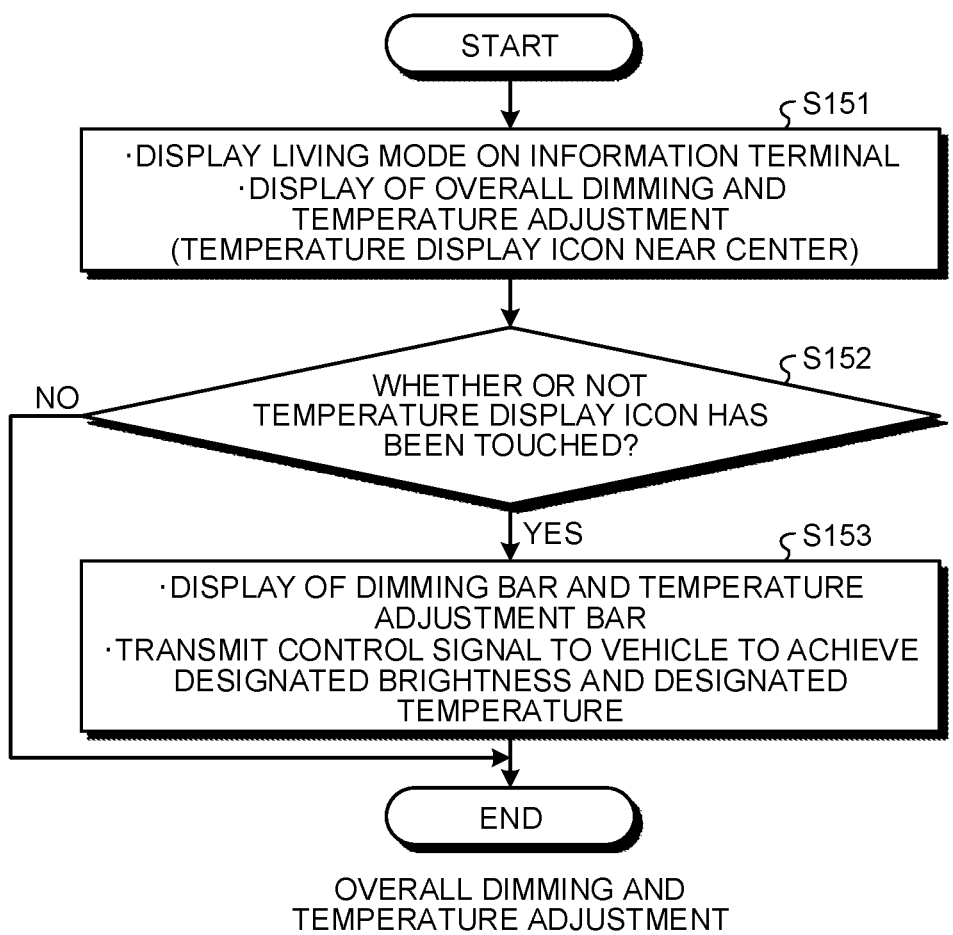

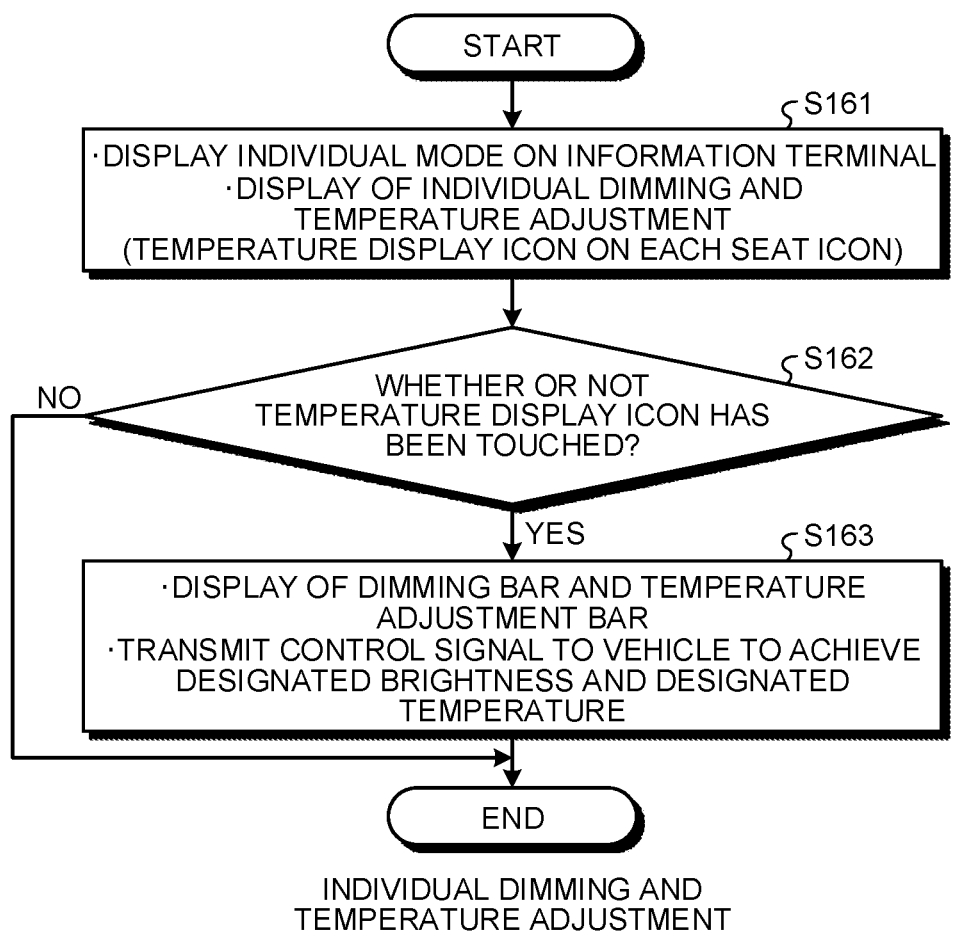

PROHIBIT CHANGE OF SEAT DIRECTION

LD

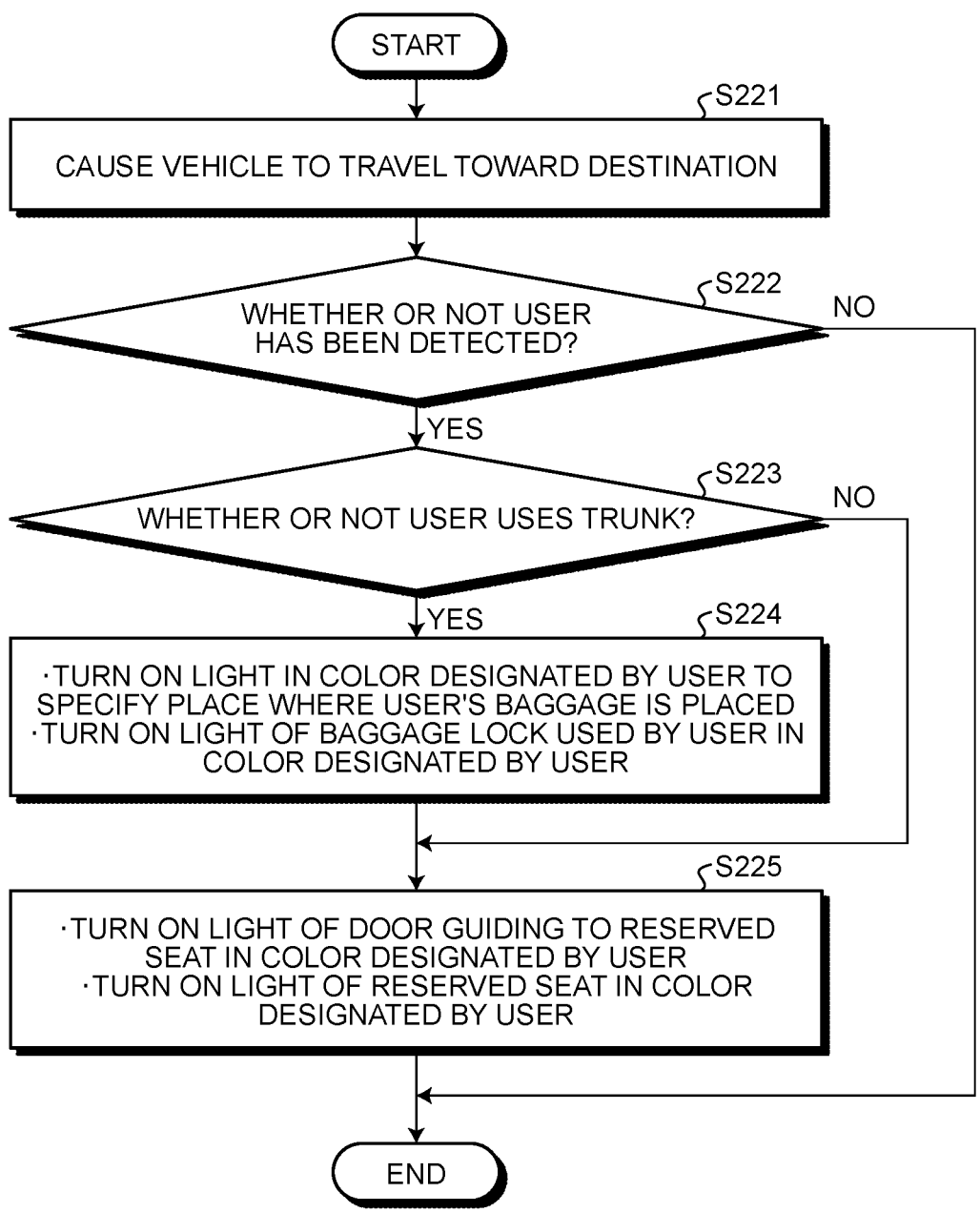

CONTROL METHOD AND CONTROL DEVICE

CROSS-REFERENCE TO RELATED APPLICATIONS

This application is based upon and claims the benefit of priority from Japanese Patent Application No. 2022-051845, filed on Mar. 28, 2022 and Japanese Patent Application No. 2023-007248, filed on Jan. 20, 2023, the entire contents of which are incorporated herein by reference.

FIELD

The present disclosure relates to a control method and a control device.

BACKGROUND

JP 2021-146893 A discloses a configuration in which it is determined whether or not a passenger who gets on an automatic driving vehicle is an authorized reservation person, and when it is determined that there is a passenger who is not an authorized reservation person, the door of the automatic driving vehicle is kept open.

There is a need for improvements for more accurate boarding of a vehicle.

SUMMARY

According to one aspect of the present disclosure, a control method of a vehicle including a communication circuit capable of communicating with a computer via a network includes: acquiring, from the computer via the communication circuit, first reservation information including first boarding area information indicating a first boarding area for a first user who has reserved the vehicle to board, first seat information indicating a first seat reserved by the first user among a plurality of seats of the vehicle, and first color information indicating a first color selected from a plurality of colors to identify the first user from other users who ride in the vehicle; causing the vehicle to travel to the first boarding area based on the first boarding area information; and causing, in the first boarding area, at least two lighting devices to emit light of the first color based on the first color information, the at least two lighting devices being selected from a group consisting of a first door light provided on a side surface of the vehicle and indicating a first door where the first user is to board, a first seat light provided in the vehicle and indicating the first seat reserved by the first user, and a first baggage light provided in a trunk of the vehicle and indicating an installation position where a first baggage of the first user is to be placed or a lock to be attached to the first baggage.

BRIEF DESCRIPTION OF THE DRAWINGS

FIG. 5 is a diagram illustrating an example of a UI when a seat is reserved by an information terminal according to the first embodiment;

FIG. 6 is a diagram illustrating an example of a UI that adjusts a temperature and lighting of a seat by the information terminal according to the first embodiment;

FIG. 7A is a flowchart illustrating an example of processing of adjusting the temperature and lighting of the seat by the information terminal according to the first embodiment;

FIG. 8 is a sequence diagram illustrating an example of processing of the vehicle allocation system according to the first embodiment;

FIG. 14A is a flowchart illustrating an example of processing of changing a direction of a seat by the information terminal according to the second embodiment;

FIG. 17 is a diagram illustrating an example of processing of adjusting the temperature and lighting of the seat by the information terminal according to the second embodiment;

FIG. 18A is a flowchart illustrating an example of processing of adjusting the temperature and lighting of the seat by the information terminal according to the second embodiment;

FIG. 18B is a flowchart illustrating an example of a process of adjusting the temperature and lighting of the seat by the information terminal according to the second embodiment;

FIG. 19 is a diagram illustrating an example of processing of adjusting the temperature and lighting of the seat by the information terminal according to the second embodiment;

FIG. 20 is a diagram illustrating an example of processing of adjusting the temperature and lighting of the seat by the information terminal according to the second embodiment;

FIG. 21A is a flowchart illustrating an example of processing of adjusting the temperature and lighting of the seat by the information terminal according to the second embodiment;

FIG. 21B is a flowchart illustrating an example of a process of adjusting the temperature and lighting of the seat by the information terminal according to the second embodiment;

FIG. 22 is a diagram illustrating an example of processing of adjusting the temperature and lighting of the seat by the information terminal according to the second embodiment;

FIG. 24 is a diagram illustrating an example of processing of adjusting the temperature and lighting of the seat by the information terminal according to the second embodiment;

FIG. 25A is a flowchart illustrating an example of processing of adjusting the temperature and lighting of the seat by the information terminal according to the second embodiment;

FIG. 25B is a flowchart illustrating an example of a process of adjusting the temperature and lighting of the seat by the information terminal according to the second embodiment;

FIG. 36 is a flowchart illustrating an example of lighting processing of light when guiding a user to a reserved seat according to the third embodiment;

DETAILED DESCRIPTION

Background to Present Disclosure

In recent years, development for fully automatic driving has progressed, and it is predicted that a world in which many automatic driving vehicles travel on public roads and many people share the automatic driving vehicles will be realized in the near future. In the sharing of the automatic driving vehicles, it is important how efficiently vehicle allocation is performed. Efficient allocation of the automatic driving vehicles can reduce traffic congestion caused by the automatic driving vehicles, leading to efficient utilization of energy in the entire town. Therefore, the efficient allocation of the automatic driving vehicles is also important for contributing to environmental load reduction. Generally, a method of determining a vehicle to be allocated on the basis of a position of the automated driving vehicle and a position of the user is conceivable as the automated driving vehicle allocation. However, when the automated driving vehicle overflows into the town, it is necessary to perform the vehicle allocation more precisely including the time for the user to get on and off the automated driving vehicle. Therefore, an object of the present disclosure is to shorten the vehicle allocation time for each vehicle to improve the vehicle allocation efficiency, improve the energy efficiency of the entire town, and reduce the environmental burden by realizing vehicle allocation that reduces the user's getting on and off time to the automated driving vehicle.

Note that the present disclosure can also be implemented as a program that causes a computer to execute each characteristic configuration included in a control method used here, or a system that operates by the program. Furthermore, it goes without saying that such a computer program can be distributed via a computer-readable non-transitory recording medium such as an SD card or a communication network such as the Internet.

Note that each of the embodiments described below illustrates a specific example of the present disclosure. Numerical values, shapes, constituent elements, steps, order of steps, and the like shown in the following embodiments are merely examples, and do not limit the present disclosure. Furthermore, among the constituent elements in the following embodiments, constituent elements that are not described in independent claims indicating the highest concept are described as arbitrary constituent elements. Moreover, in all the embodiments, the respective contents can be combined.

First Embodiment

Figure 1:
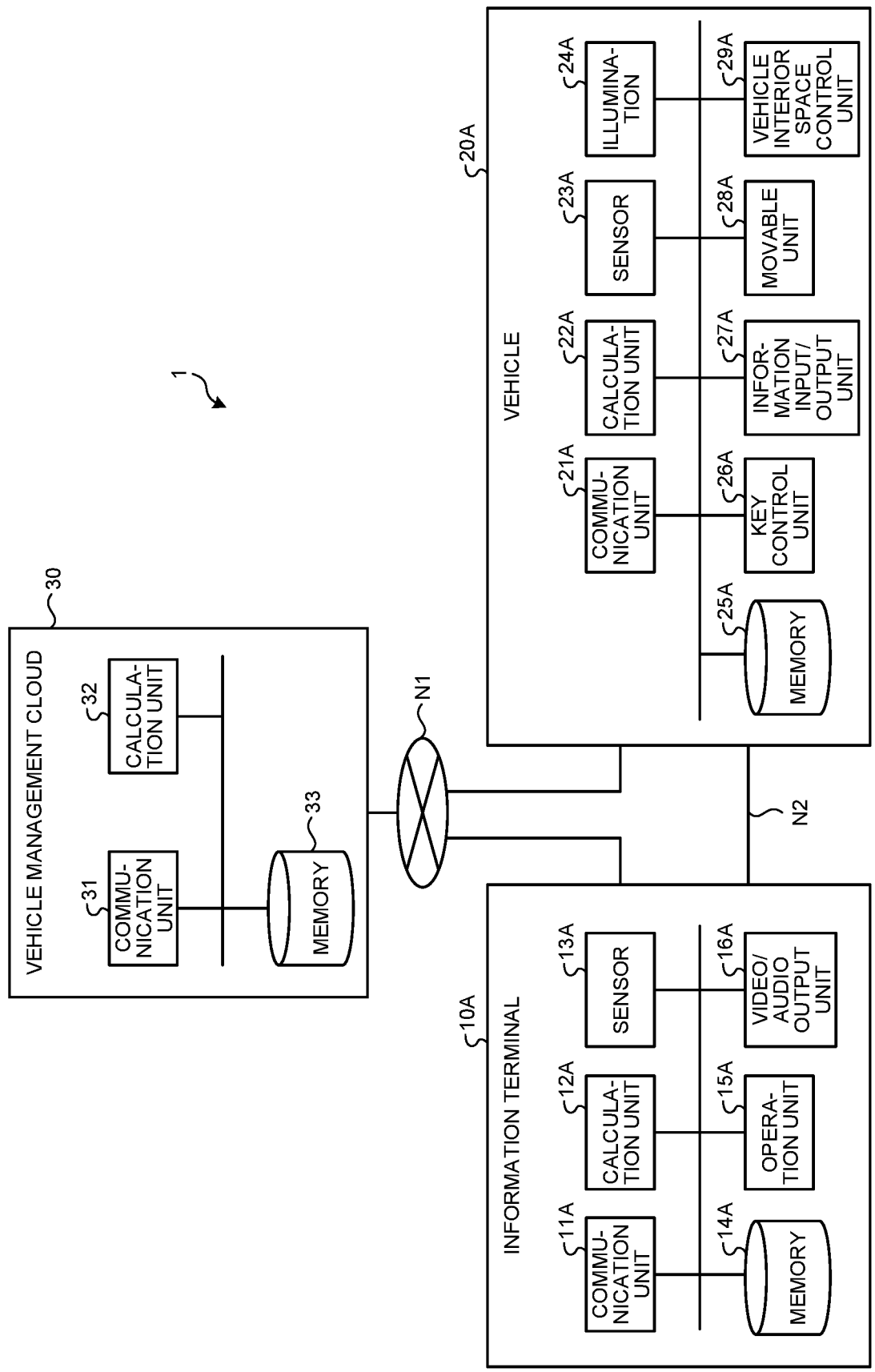
FIG. 1 is a block diagram illustrating an example of an overall configuration of a vehicle allocation system according to a first embodiment.

FIG. 1 is a block diagram illustrating an example of an overall configuration of a vehicle allocation system 1 according to an embodiment of the present disclosure. The vehicle allocation system 1 includes an information terminal 10A, a vehicle 20A, and a vehicle management cloud 30. The information terminal 10A of a user UA and the vehicle 20A can access various types of information by connecting to the Internet N1 which is a wide-area communication network using a wireless communication standard such as cellular communication called 4G or 5G. Furthermore, the information terminal 10A of the user UA and the vehicle 20A can wirelessly communicate with a short-distance device using a short-range wireless communication network N2 such as Bluetooth (registered trademark) or UWB that is an ultra-wideband wireless communication standard. For example, in a case where the user UA owns or uses the vehicle 20A, a direction, arrangement, temperature, lighting, and the like of a seat of the vehicle 20A can be controlled through the short-range wireless communication network N2 or the Internet N1. Furthermore, for example, in a case where the user UA does not own or use a vehicle, the user UA makes a vehicle reservation to the vehicle management cloud 30 through the Internet N1, and in a case where an optimal vehicle is the vehicle 20A, the vehicle 20A can be allocated to the user UA. The user UA and the vehicle 20A are described as an example, and many other users and vehicles may be similarly connected to the vehicle management cloud 30 through the Internet N1.

When the vehicle reservation is made from the information terminal 10A of the user UA, the reservation information is transmitted to the vehicle management cloud 30 via the Internet N1. The vehicle management cloud 30 manages reservation statuses of a plurality of vehicles, selects an optimal vehicle on the basis of reservation information of the user UA (coordinate position, use time, and destination of the user UA), and transmits a control signal to the vehicle through the Internet N1 so as to move to the position of the user UA.

Here, a configuration of the information terminal 10A will be described. The information terminal 10A includes a communication unit 11A, a calculation unit 12A, a sensor 13A, a memory 14A, an operation unit 15A, and a video/audio output unit 16A.

The communication unit 11A transmits and receives information to and from the vehicle 20A and the vehicle management cloud 30 via the short-range wireless communication network N2 or the Internet N1. The calculation unit 12A performs calculation related to processing of the information terminal 10A. The sensor 13A detects the state of the information terminal 10A. Examples of the sensor 13A include an acceleration sensor, a GPS sensor, and the like. The memory 14A stores various types of information. Examples of the memory 14A include various storage media and storage devices such as an HDD, an SSD, and a flash memory. The operation unit 15A receives various operations from the user UA. Examples of the operation unit 15A include an input device that receives a user's input, such as a touch panel or a keyboard. The video/audio output unit 16A outputs video and audio. Examples of the video/audio output unit 16A include a liquid crystal display, an organic EL display, and a speaker.

Next, a configuration of the vehicle 20A will be described. The vehicle 20A includes a communication unit 21A, a calculation unit 22A, a sensor 23A, an illumination 24A, a memory 25A, a key control unit 26A, an information input/output unit 27A, a movable unit 28A, and a vehicle interior space control unit 29A.

The communication unit 21A transmits and receives information to and from the information terminal 10A and the vehicle management cloud 30 via the short-range wireless communication network N2 or the Internet N1. The calculation unit 22A performs calculation related to control of the vehicle 20A. The sensor 23A detects the state of the vehicle 20A. Examples of the sensor 23A include an acceleration sensor, a GPS sensor, and the like. The illumination 24A is a device that illuminates an interior of the vehicle 20A. The memory 25A stores various types of information. Examples of the memory 25A include various storage media and storage devices such as an HDD, an SSD, and a flash memory. The key control unit 26A controls opening and closing of a key of a door of the vehicle 20A. The information input/output unit 27A inputs information from an external device to the vehicle 20A. Furthermore, the information input/output unit 27A outputs information from the vehicle 20A to an external device. The movable unit 28A is a unit of the vehicle 20A that is movable by the operation of the user UA. Examples of the movable unit 28A include a brake pedal, a shift lever, a steering wheel, and the like. The vehicle interior space control unit 29A controls an environment of a space inside the vehicle 20A. For example, the vehicle interior space control unit 29A controls a vehicle interior temperature, brightness of the illumination, and the like.

Next, a configuration of the vehicle management cloud 30 will be described. The vehicle management cloud 30 includes a communication unit 31, a calculation unit 32, and a memory 33.

The communication unit 31 transmits and receives information to and from the information terminal 10A and the vehicle 20A via the Internet N1. The calculation unit 32 performs calculation related to processing of the vehicle management cloud 30. The memory 33 stores various types of information. Examples of the memory 33 include various storage media and storage devices such as an HDD, an SSD, and a flash memory.

Figure 2:
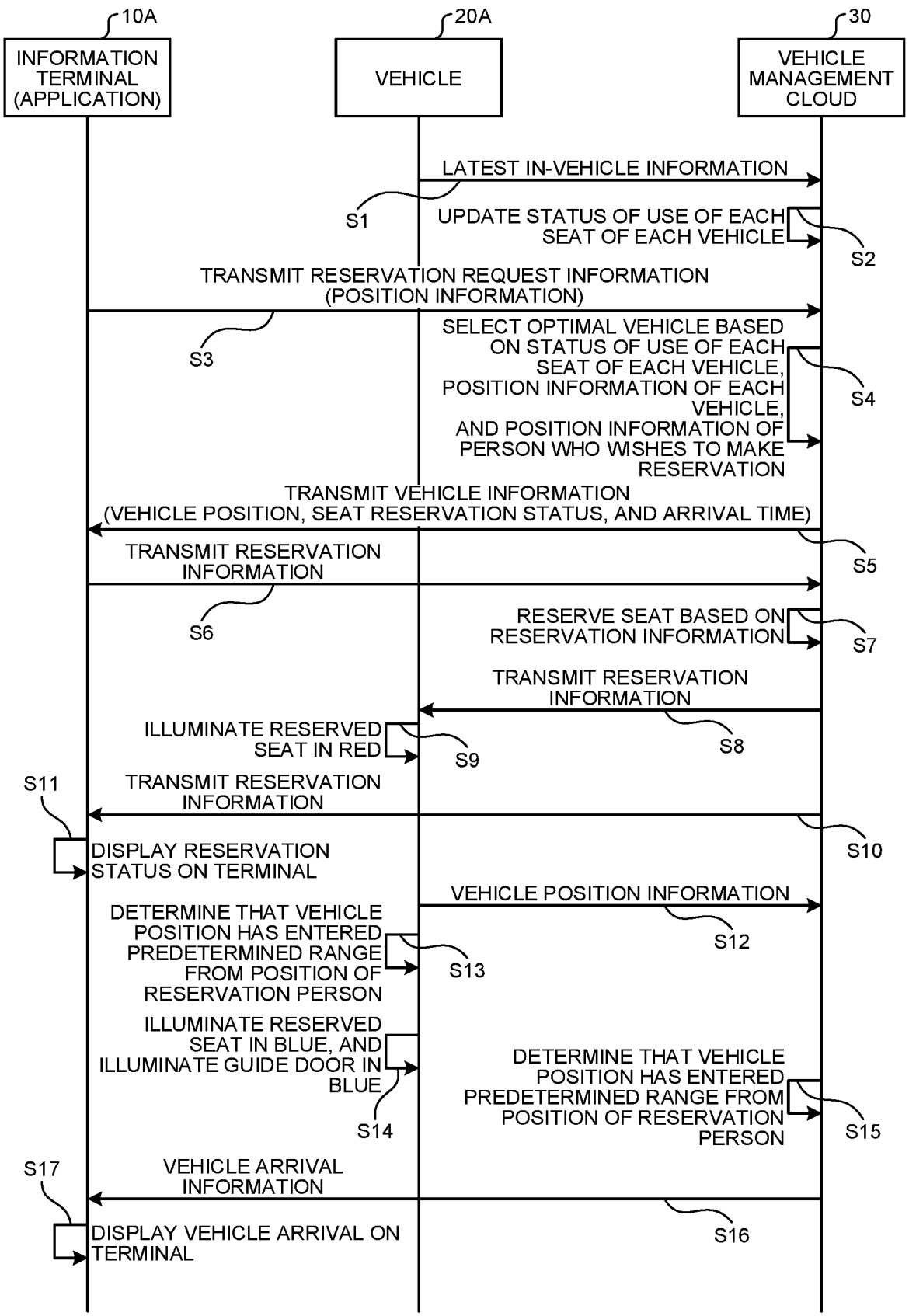
FIG. 2 is a sequence diagram illustrating an example of processing of the vehicle allocation system according to the first embodiment.

FIG. 2 is a sequence diagram illustrating an example of processing of the vehicle allocation system 1. The vehicle 20A is, for example, an automatic driving vehicle, and performs going-around movement in order to allow any passenger to get on the vehicle. The vehicle 20A senses a situation of a passenger in the vehicle 20A by an in-vehicle monitoring system (camera, infrared sensor, and weight sensor) mounted in the vehicle. Since a passenger in the vehicle 20A can freely move in the vehicle 20A and sit on a favorite seat, it is necessary to check the latest situation in the vehicle and determine whether another passenger can be accommodated and in which seat another passenger can be seated. Therefore, the latest in-vehicle information sensed by the in-vehicle monitoring system is transmitted to the vehicle management cloud 30 (Step S1). Since the latest in-vehicle information is transmitted from a plurality of vehicles, the vehicle management cloud 30 always updates and manages the latest in-vehicle information of the plurality of vehicles (Step S2). When the user UA wishes vehicle allocation and the reservation request information (coordinate position, use time, destination, and destination arrival time of the user UA) is transmitted from the information terminal 10A (Step S3), the vehicle management cloud 30 selects an optimal vehicle on the basis of the latest status of use of each seat inside each vehicle, the coordinate position information of each vehicle, a traveling direction, the coordinate position information of the user UA, the use time, the destination, and the destination arrival time (Step S4). For example, in a case where the user UA stands by on the right side in the traveling direction of the vehicle on a right-hand traffic road as in the United States, when a vehicle with a vacant seat on the right side with respect to the traveling direction of the vehicle is selected and when the vehicle arrives at a place where the user UA stands by, the user UA can sit on the right seat in the immediate vicinity of the opened right door, so that the user UA can get on smoothly. Therefore, in a case where a plurality of vehicles are located around the user UA, a vehicle to which a vehicle with a vacant right seat is allocated with priority is determined. In a case where the number of sharing vehicles increases, the number of allocatable vehicle candidates increases. Therefore, by using the latest usage status of the seat inside the vehicle, the coordinate position of the vehicle, the traveling direction, and the coordinate position of the user, the vehicle allocation time including the user's boarding time can be shortened, and the vehicle allocation can be performed more smoothly. The vehicle management cloud 30 transmits the vehicle information (vehicle position, seat reservation status, and arrival time) of the selected vehicle 20A to the information terminal 10A of the user UA (Step S5). The user UA selects a desired seat from the available seats displayed on the information terminal, and transmits reservation information (desired seat) to the vehicle management cloud 30 (Step S6). The vehicle management cloud 30 reserves the seat selected by the user UA on the basis of the reservation information (Step S7), and transmits the reservation request information (coordinate position, use time, destination, and destination arrival time of the user UA) and the reservation information (wish seat) to the vehicle 20A (Step S8). The vehicle 20A turns on a light installed on the reserved seat in red based on the reservation information (Step S9). For example, it is conceivable to turn on a light installed at an edge of the seat in red. In order to smoothly get on and off the vehicle including the boarding time of the user UA, the vehicle and the seat are reserved. Therefore, when another passenger uses the reserved seat, the vehicle allocation time cannot be shortened. Therefore, by turning on the seat in red, it is possible to prevent other passengers on board from being seated or putting an object, and to more reliably shorten the vehicle allocation time. Furthermore, the vehicle management cloud 30 transmits the vehicle 20A and the seat information for which the reservation of the vehicle 20A is completed to the information terminal 10A of the user UA (Step S10). The information terminal 10A displays a situation inside the vehicle 20A (seating information indicating which seat another passenger is seated, and information about a reserved seat reserved by the user UA) (Step S11). The vehicle 20A periodically transmits information on the coordinate position of the own vehicle to the vehicle management cloud 30 (Step S12), and determines whether or not the coordinate position of the own vehicle is within a predetermined range from the coordinate position of the user UA. In a case where it is determined that the coordinate position of the own vehicle is within the predetermined range from the coordinate position of the user UA (Step S13), the lighting of the light installed in the reserved seat is changed from red to blue. Furthermore, a light installed on a door close to the reserved seat is turned on in blue (Step S14). For example, in a case where the right seat in the traveling direction is reserved and the user UA is waiting on the right side in the traveling direction, the door closest to the reserved seat on the right side in the traveling direction is turned on in blue. In a case where the seat on the left side in the traveling direction is reserved and the user UA is waiting on the right side in the traveling direction, the door (alternatively, a door that allows the user to get on the reserved seat most smoothly, and so on.) closest to the reserved seat on the right side in the traveling direction is turned on in blue. In this manner, by turning on the door close to the reserved seat in blue, the vehicle allocation time including the boarding time of user UA can be shortened. For example, it is conceivable to turn on a light installed on a door knob in blue. The vehicle management cloud 30 determines whether or not the coordinate position of the vehicle 20A has entered a predetermined range from the coordinate position of the user UA, and when determining that the coordinate position has entered the predetermined range (Step S15), the vehicle management cloud transmits vehicle arrival information to the information terminal 10A of the user UA (Step S16). Upon receiving the vehicle arrival information, the information terminal 10A notifies the user UA in advance of the status of the contents of the vehicle 20A and the position of the reserved seat by making an announcement such as "the vehicle will arrive soon", and blinking the seat arrangement, the seat usage status, and the reserved seat of the vehicle 20A in blue (Step S17). Here, an example of turning on and blinking in red or blue has been described, but the present disclosure is not limited thereto as long as it is a method that can be recognized by a passenger. Other colors may be used as long as the colors are recognizable by the passenger.

Furthermore, in FIG. 2, the user UA determines the reserved seat. Alternatively, when the current location, the destination, and the number of people of the user UA are transmitted to the vehicle management cloud 30, the management cloud may automatically determine the reserved vehicle and the reserved seat. By determining the reserved seat on the management cloud side, the reservation time can be shortened, and the efficiency of the entire vehicle allocation can be improved.

Figure 3:
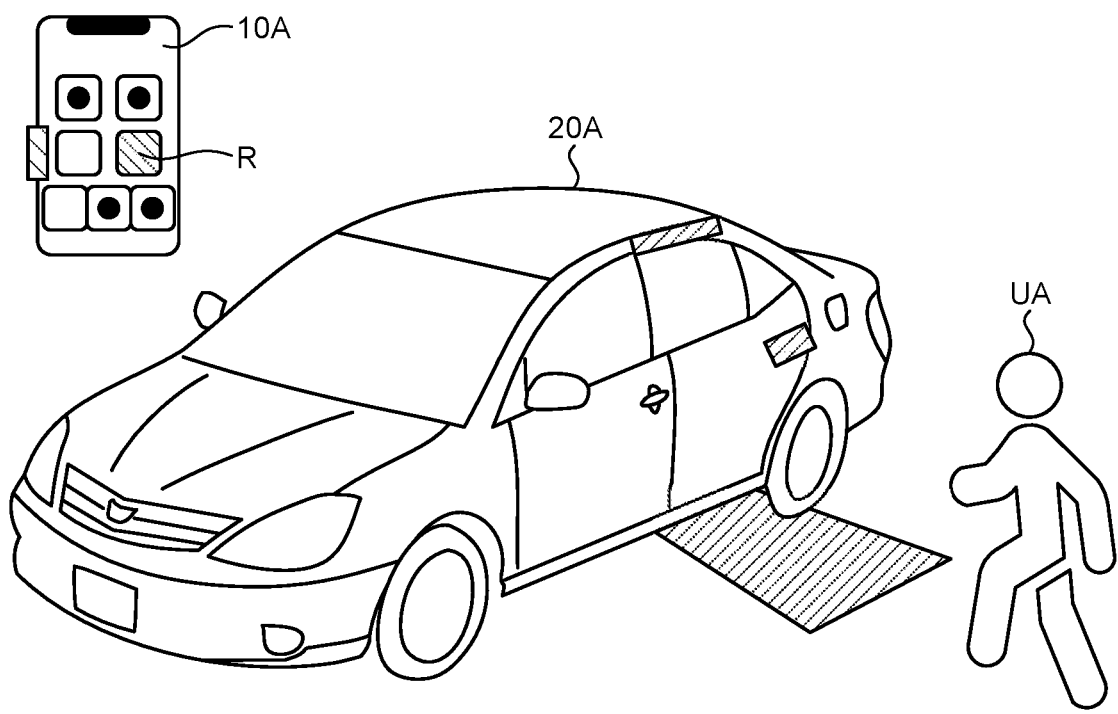
FIG. 3 is a diagram illustrating an example of guidance by light of a door of a vehicle according to the first embodiment.

FIG. 3 is an example in which a door of the vehicle 20A is illuminated blue and the vicinity of a bottom of the door of the vehicle 20A is illuminated blue in order to shorten the time for determining the door to be used for the user UA who is a reservation person. In a case where it is determined that the coordinate position of the vehicle 20A has entered the predetermined range from the coordinate position of the user UA, which door the vehicle 20A illuminates is determined on the basis of a standby coordinate position of the user UA, a reserved seat R, and the traveling direction of the vehicle, and the door of the vehicle 20A is illuminated in blue and the vicinity of the bottom of the door of the vehicle 20A is illuminated in blue. For example, in the case of right-hand traffic as in the United States, when the coordinate position of the user UA is located on the right with respect to the traveling direction of the vehicle 20A, the right door is selected. Only the door of the vehicle 20A may be illuminated in blue from when the coordinate position of the vehicle 20A enters the predetermined range from the coordinate position of the user UA until the vehicle arrives at the coordinate position of the user UA, and when the vehicle arrives at the coordinate position of the user UA, in addition to the door of the vehicle 20A, the vicinity of the bottom of the door of the vehicle 20A may be illuminated in blue. With such a configuration, it is possible to prevent erroneous recognition that some kind of notification is given to passersby other than the reservation person, and at the same time, it is possible to shorten the boarding time by providing appropriate guidance to the reservation person when the reservation person arrives. When the door of the vehicle is turned on, as illustrated in FIG. 3, the light installed near the door knob may be turned on, or the light installed along the edge of the door may be turned on. Furthermore, the color to be illuminated is not limited to blue, and may be a specific identical color.

Figure 4:
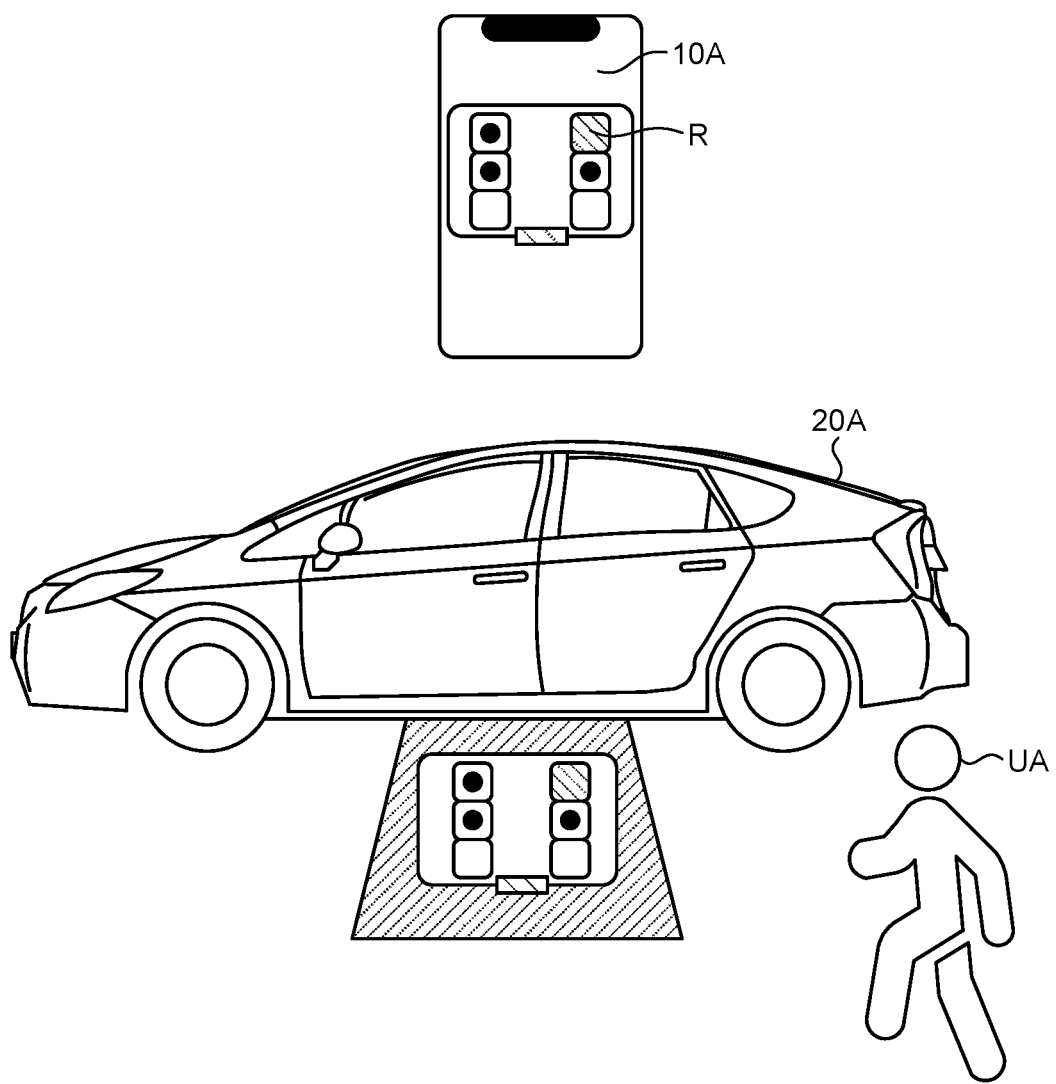
FIG. 4 is a diagram illustrating an example of guidance by light of the door of the vehicle according to the first embodiment.

FIG. 4 is another example of guiding the user UA who is a reservation person to a reserved seat R in a case where the vehicle is a double-door automatic driving vehicle in which the doors are opened to the left and right. In the case of double doors, since the doors are simultaneously opened to the left and right, the same display as that displayed on the information terminal 10A is performed near the bottom of the door. For example, in a case where a room layout of seats in the vehicle, a usage status of the seats, and the reserved seat R are displayed on the information terminal 10A, the display is displayed near the bottom of the door when the automatic driving vehicle arrives. Furthermore, as in FIG. 3, only the door of the vehicle 20A may be illuminated in blue from when the coordinate position of the vehicle 20A enters the predetermined range from the coordinate position of the user UA to when the vehicle arrives at the coordinate position of the user UA. When the vehicle arrives at the coordinate position of the user UA, the vicinity of the bottom of the door of the vehicle 20A may be illuminated in blue in addition to the door of the vehicle 20A, and a guide diagram of the inside of the vehicle displayed on the information terminal 10A may be displayed. Since the same guide map as the guide diagram of the interior of the vehicle 20A displayed on the information terminal 10A is displayed near the bottom of the door of the vehicle 20A that arrived, the user UA can smoothly find the reserved seat and shorten the boarding time. Here, when the vicinity of the bottom of the door of the vehicle is illuminated or the guide diagram of the inside of the vehicle is displayed, a projector may be installed near the bottom of the door of the vehicle, or a projector may be installed above the door.

Note that it is conceivable that the user UA may load baggage into the trunk of the automated driving vehicle. In this case, the user UA may notify the vehicle management cloud 30 in advance that there is baggage to be checked in the trunk with (the application of) the information terminal 10A. In this case, when the automated driving vehicle arrives, the user UA first unlocks the trunk (or opens the automatically unlocked trunk) and stores the baggage in the trunk. At this time, a plurality of baggage storage keys (smart locks), hereinafter referred to as baggage locks, are installed in the trunk so as not to be mistaken for baggage of another user, and a reserved seat of the user UA and/or a baggage lock to be used by the user UA shines in the same color as a door (such as a door knob) that shines when the user UA gets in the vehicle. The user UA with his/her baggage in the trunk closes the trunk, enters through the guided door, and sits in the reserved seat. Also in a case where the user UA gets off the vehicle at the destination, when the user UA gets off the vehicle, the user UA unlocks the trunk (or opens the automatically unlocked trunk) and takes out the baggage from the trunk. In this case as well, the baggage lock may shine as in the case of loading baggage, and only the baggage lock assigned to the user UA may be automatically unlocked. In this way, it is possible to prevent another person's baggage from being carried by mistake or intentionally without forgetting to take the baggage. It is desirable that the reserved seat, the door at the time of boarding, and the baggage lock in the trunk of the user UA described above shine in the same color for the user UA. Moreover, it is desirable that this color is a color different from those of other users who get on the vehicle at the same time because it is easy to identify. Furthermore, this color may be notified from the vehicle management cloud 30 to the information terminal 10A so that it can be confirmed in advance on the information terminal at the time of reservation.

Figure 7B:
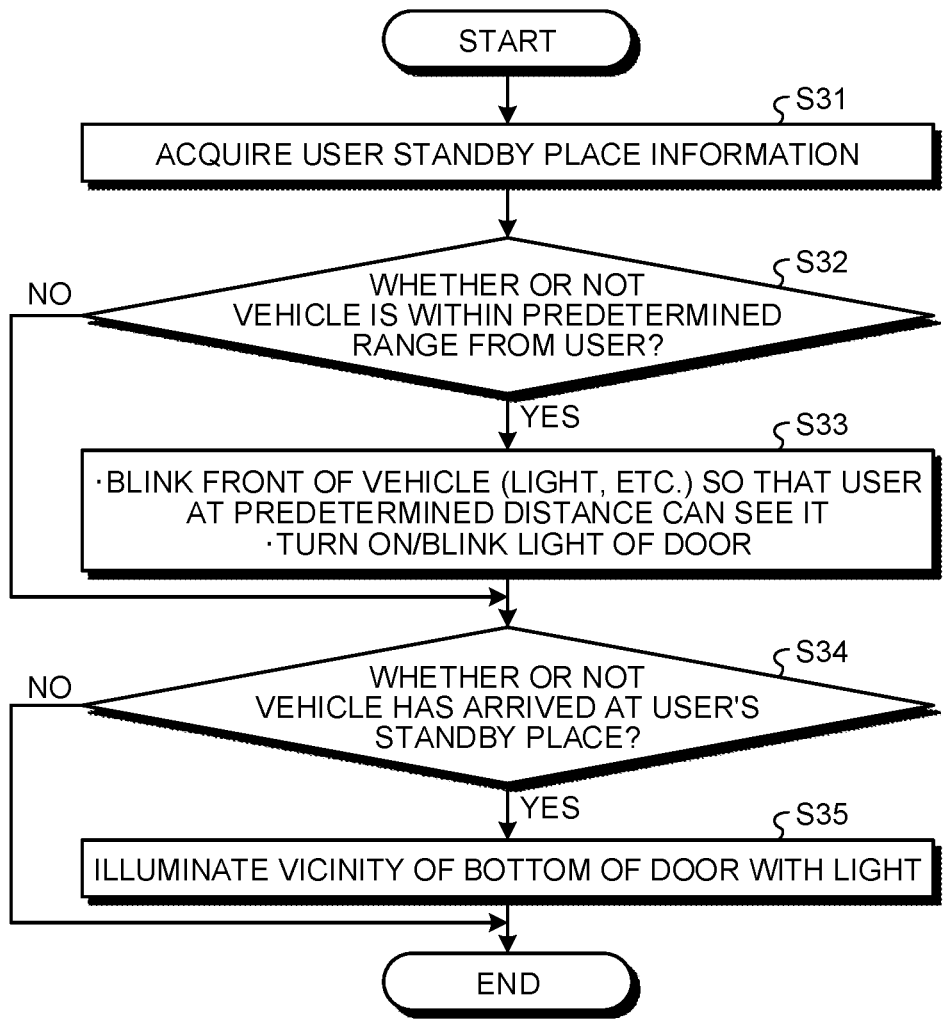
FIG. 7B is a diagram illustrating an example of guiding a user to the vehicle according to the first embodiment.

FIG. 7B is a flowchart illustrating the example of FIGS. 3 and 4. The vehicle 20A acquires the position information of the standby place of the user UA from the vehicle management cloud 30 and starts moving (Step S31). The vehicle 20A determines whether the position of the own vehicle is within a predetermined range from the position of the standby place of the user UA (Step S32). When it is determined that the position of the own vehicle is within the predetermined range (Step S32: Yes), in order to notify the user UA that the vehicle is a target vehicle scheduled to be boarded, a notification is given to the user UA in a visually recognizable manner (Step S33). For example, the vicinity of the front light may be blinked in blue, or the door of the vehicle may be blinked in blue. Next, the vehicle 20A determines whether or not the vehicle has arrived at the standby place of the user UA (Step S34), and in a case where it is determined that the vehicle has arrived (Step S34: Yes), the vehicle illuminates the vicinity of the bottom of the door with light (Step S35). Alternatively, as illustrated in FIG. 4, the projector displays the same content as the interior floor plan displayed on the information terminal. At this time, the blinking near the front light may be stopped, and the blinking of the door may be changed to lighting. As described above, by changing the place where the light is turned on and blinks according to the distance from the user, it is possible to more smoothly guide the user to the seat, and it is possible to shorten the boarding time of the user. Note that, although the description has been given assuming that the processing proceeds to the next processing in a case where it is determined as No in the determination of steps S32 and S34, the present disclosure is not limited thereto, and a processing form in which the processing returns immediately before each determination may be adopted in a case where it is determined as No.

FIG. 5 illustrates a UI when the user UA reserves a seat by the information terminal 10A. The information terminal 10A displays a usage status SJ of the seat in the vehicle. When the user UA reserves a seat, a controller CL1 (slide bar SB1, slide bar SB2) for temperature adjustment and dimming of the reserved seat is displayed on the left and right of the reserved seat. The user UA can remotely perform temperature adjustment and dimming by moving a finger up and down on a bar of the controller CL1 for temperature adjustment and dimming. Since the temperature and dimming of the reserved seat can be adjusted while the vehicle 20A is reserved, the temperature and dimming are adjusted to the user UA's preference when the user UA gets into the vehicle, and the comfort of the user UA can be improved. Here, when the information terminal 10A and the vehicle 20A can wirelessly communicate with each other, a control signal may be directly transmitted from the information terminal 10A to the vehicle 20A. When the information terminal 10A and the vehicle 20A cannot perform wireless communication, a control signal may be transmitted from the information terminal 10A to the vehicle management server, and a control signal may be transmitted from the vehicle management server to the information terminal 10A to perform temperature and dimming.

FIG. 6 illustrates another example of the UI at the time of performing temperature and dimming. When the circle is enlarged in the operation of pinching the circular display CL2 of the seat with the fingertips, light is adjusted brightly, and when the circle is reduced, light is adjusted darkly. Tapping the upper semicircle adjusts the temperature higher, and tapping the lower semicircle adjusts the temperature lower. Since temperature adjustment and dimming can be performed with one icon in this manner, it is possible to realize a UI that prevents malfunction in a limited display space. The temperature may be adjusted by the size of the circle, and the light may be adjusted by the upper and lower semicircles.

FIG. 7A is a diagram illustrating an example of a flow of the processing of FIGS. 5 and 6. The information terminal 10A receives reservation information of each seat of the vehicle 20A from the vehicle management cloud 30 (Step S21). The seat arrangement of the vehicle 20A and the reservation status of each seat are displayed on the information terminal 10A (Step S22). The information terminal 10A determines whether or not a seat icon indicating a vacant seat has been touched (Step S23), and in a case where the seat icon has been touched (Step S23: Yes), the information terminal transmits a seat reservation signal to the vehicle management cloud 30. After receiving the reservation completion signal from the vehicle management cloud 30, a temperature adjustment and dimming icon is displayed (Step S24). As illustrated in FIG. 5, a control bar may be displayed on the left and right of the reserved seat, or as illustrated in FIG. 6, a circular control icon may be displayed.

Figure 9:
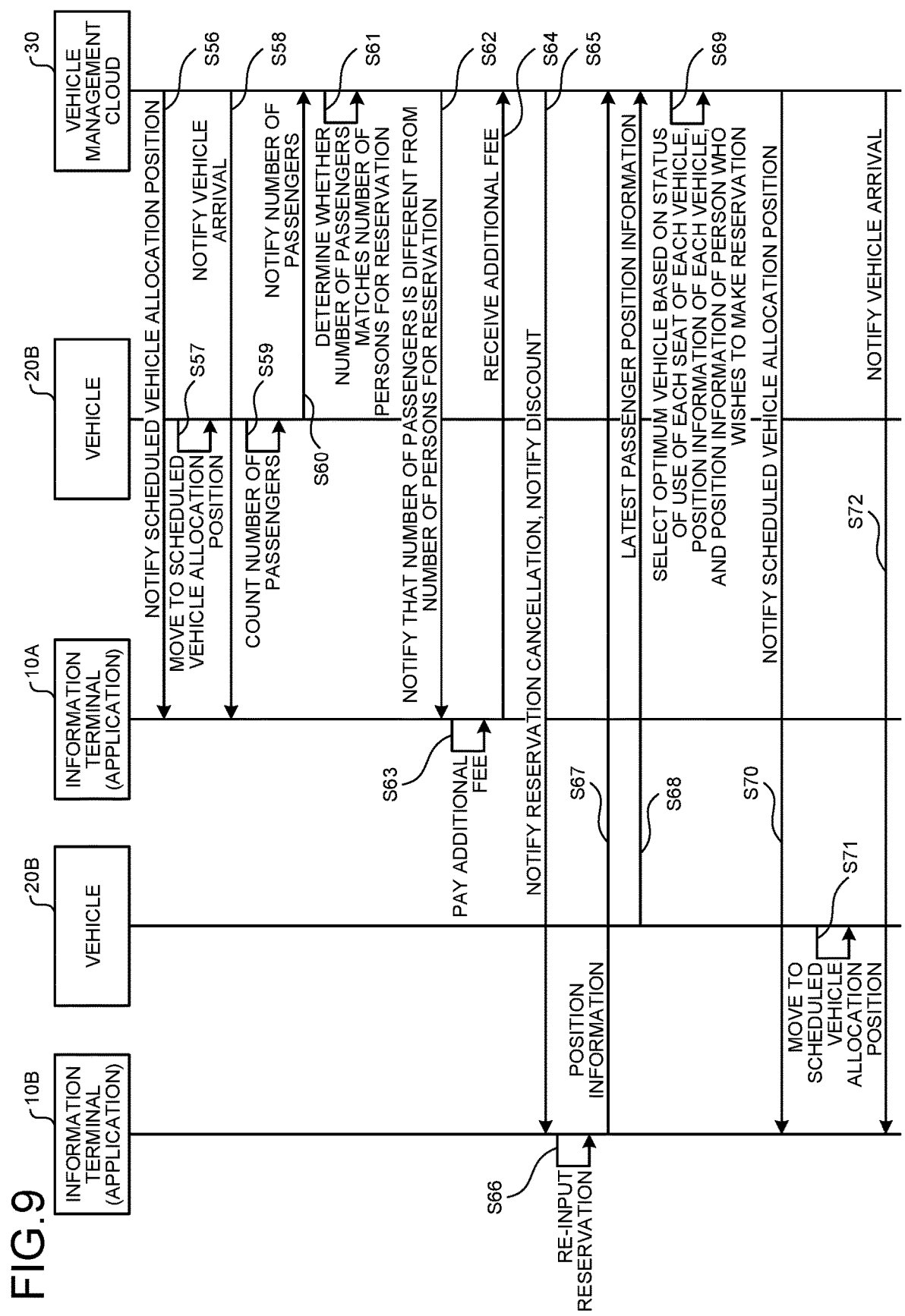
FIG. 9 is a sequence diagram illustrating an example of processing of the vehicle allocation system according to the first embodiment.

FIGS. 8 and 9 are diagrams illustrating another form of sequence when the vehicle 20A is reserved. The processes up to the process of illuminating the reserved seat in red (steps S41 to S49) are the same as those in FIG. 2 (steps S1 to S9), and thus the description thereof is omitted. The vehicle management cloud 30 transmits a reservation completion signal and the lighting and temperature information about the reserved seat (Step S50). When the user UA inputs a desired temperature and lighting to the information terminal 10A (Step S51), the temperature and lighting information desired by the user UA is transmitted to the vehicle management cloud 30 (Step S52). The vehicle management cloud 30 transmits the received temperature and lighting information to the vehicle 20A (Step S53). When the information terminal 10A and the vehicle 20A are in a state capable of wireless communication, the temperature and lighting information may be transmitted from the information terminal 10A to the vehicle 20A by wireless communication. The vehicle 20A adjusts the lighting and temperature of the reserved seat based on the received temperature and lighting information (Step S54). The vehicle management cloud 30 transmits vehicle allocation instruction information to the vehicle 20A (Step S55). Furthermore, the vehicle management cloud 30 transmits a notification indicating the scheduled vehicle allocation position to the information terminal 10A (Step S56). Upon receiving the vehicle allocation instruction information from the vehicle management cloud 30, the vehicle 20A moves to the vicinity of the coordinate position of the user UA (Step S57). When the vehicle 20A moves from the position of the user UA to a position within a predetermined range, the vehicle management cloud 30 transmits a notification indicating that the vehicle 20A will arrive soon to the information terminal 10A (Step S58). The vehicle 20A counts the number of passengers using the in-vehicle monitoring system (Step S59), and transmits information on the number of passengers to the vehicle management cloud 30 (Step S60). The vehicle management cloud 30 determines whether or not the number of persons for reservation matches the number of passengers (Step S61), and in a case where the number of persons for reservation is different from the number of passengers, the information terminal 10A is notified of the number of passengers exceeding the number of persons for reservation and the payment notification of the additional fee (Step S62). When the user UA pays the additional fee using the information terminal 10A (Step S63), the vehicle management cloud 30 receives the additional fee (Step S64). Next, the vehicle management cloud 30 makes a reservation cancellation and a fare discount notification to another user UB who has reserved the seat of the vehicle 20A (Step S65). Since it is difficult to secure the reserved seat of the user UB due to the fact that the user UA gets on the vehicle with the number of persons exceeding the number of persons for reservation, the reservation cancellation and the fare discount notification are performed to the user UB. When the user UB inputs reservation information to an information terminal 10B again (Step S66), processing similar to that in steps S41, S43, S44, and S56 to S58 is performed, and the vehicle management cloud 30 selects an optimal vehicle and allocates a vehicle to the user UB (steps S67 to S72).

Second Embodiment

Figure 10:
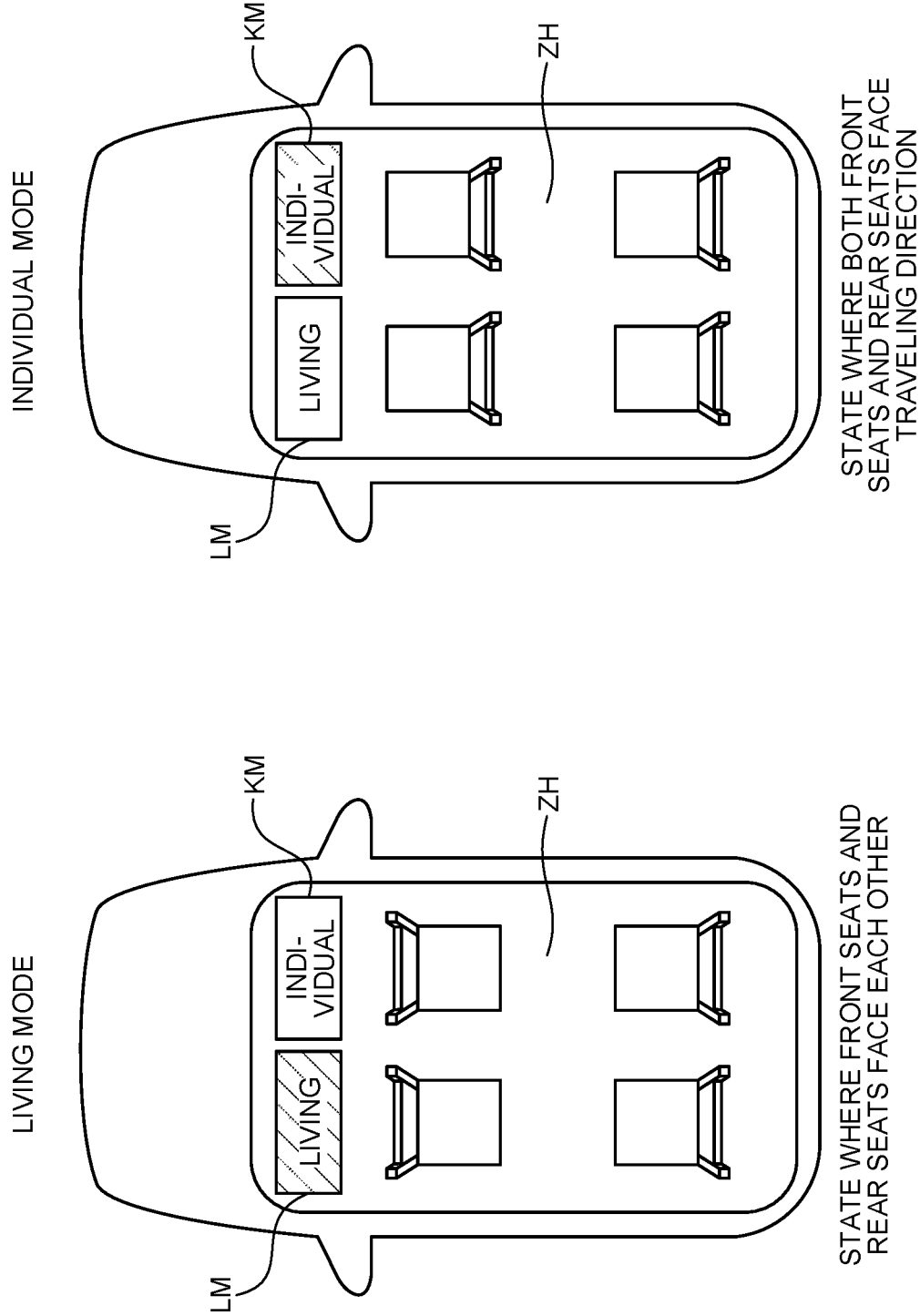
FIG. 10 is a diagram illustrating an example of a UI that changes a direction of a seat by the information terminal according to the first embodiment.
Figure 15:
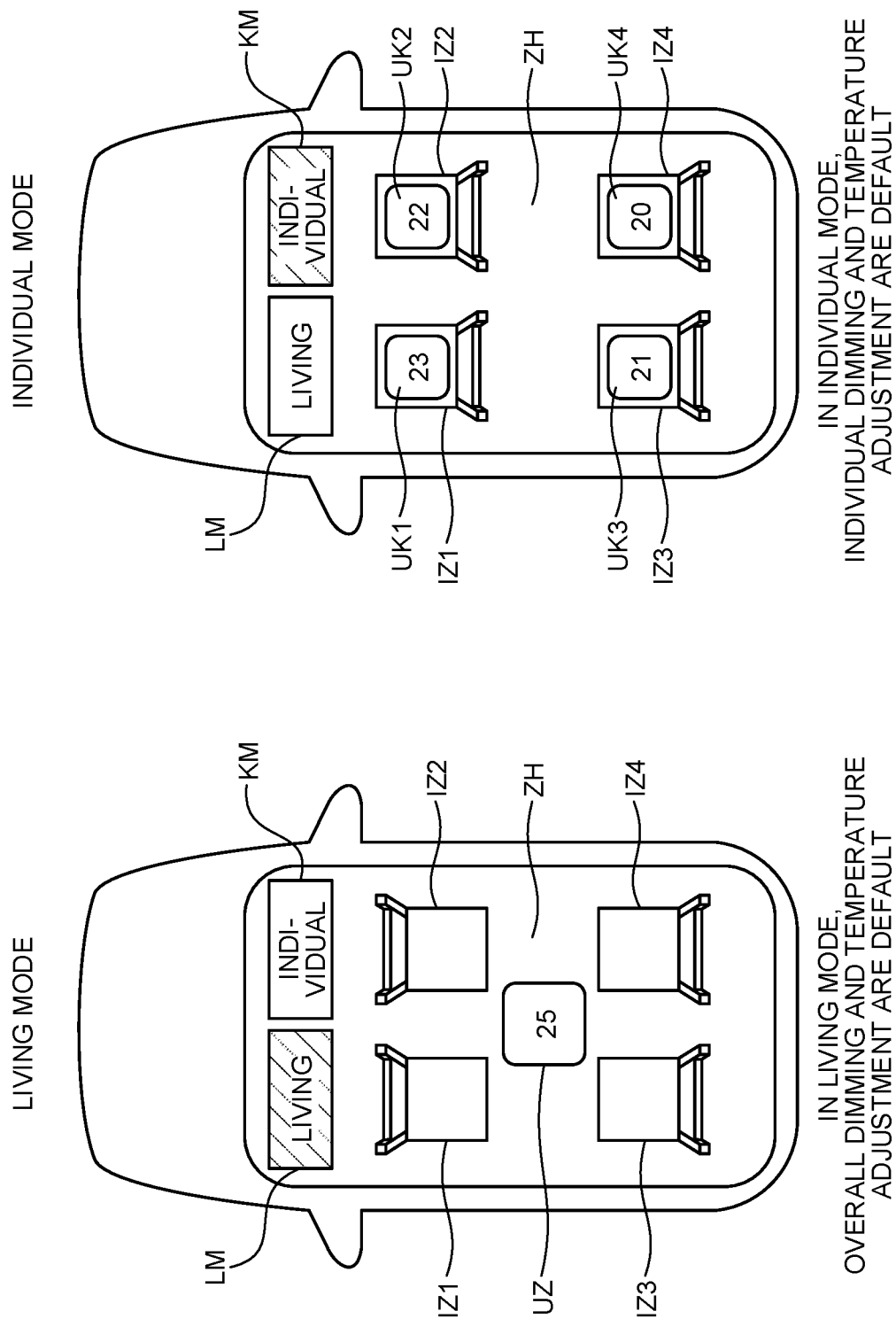
FIG. 15 is a diagram illustrating an example of processing of adjusting a temperature and lighting of a seat by the information terminal according to the second embodiment.

FIG. 10 is a diagram illustrating an example of a UI when a seat arrangement ZH of the vehicle 20A is changed in a case where the user UA owns the vehicle 20A. When a living mode button LM is touched, the front seat is rotated by 180 degrees, and the seat arrangement ZH in which the front seat and the rear seat face each other is controlled. When an individual mode button KM is touched, both the front seat and the rear seat are controlled to have the seat arrangement ZH facing the traveling direction. As illustrated in FIG. 15, in the living mode, a controller UZ is displayed in the vicinity of the center of the floor plan of the vehicle so that temperature adjustment and dimming can be performed in the entire vehicle. In the case of the living mode, since a scene in which the occupant performs a conference or a game while facing each other is assumed, priority is given to temperature adjustment and dimming in the entire vehicle. On the other hand, in the case of the individual mode, a controller UK (controllers UK1 to UK4) is displayed on the icon of each seat so that temperature adjustment and dimming can be individually performed at each seat. Since a scene in which each seat individually enjoys the space is assumed, priority is given to a private space by individual temperature adjustment and dimming. Note that, since the controller UZ and the controller UK can also be referred to as icons for displaying temperature, the controller UZ and the controller UK may be referred to as temperature display icons in the following description.

Figure 11:
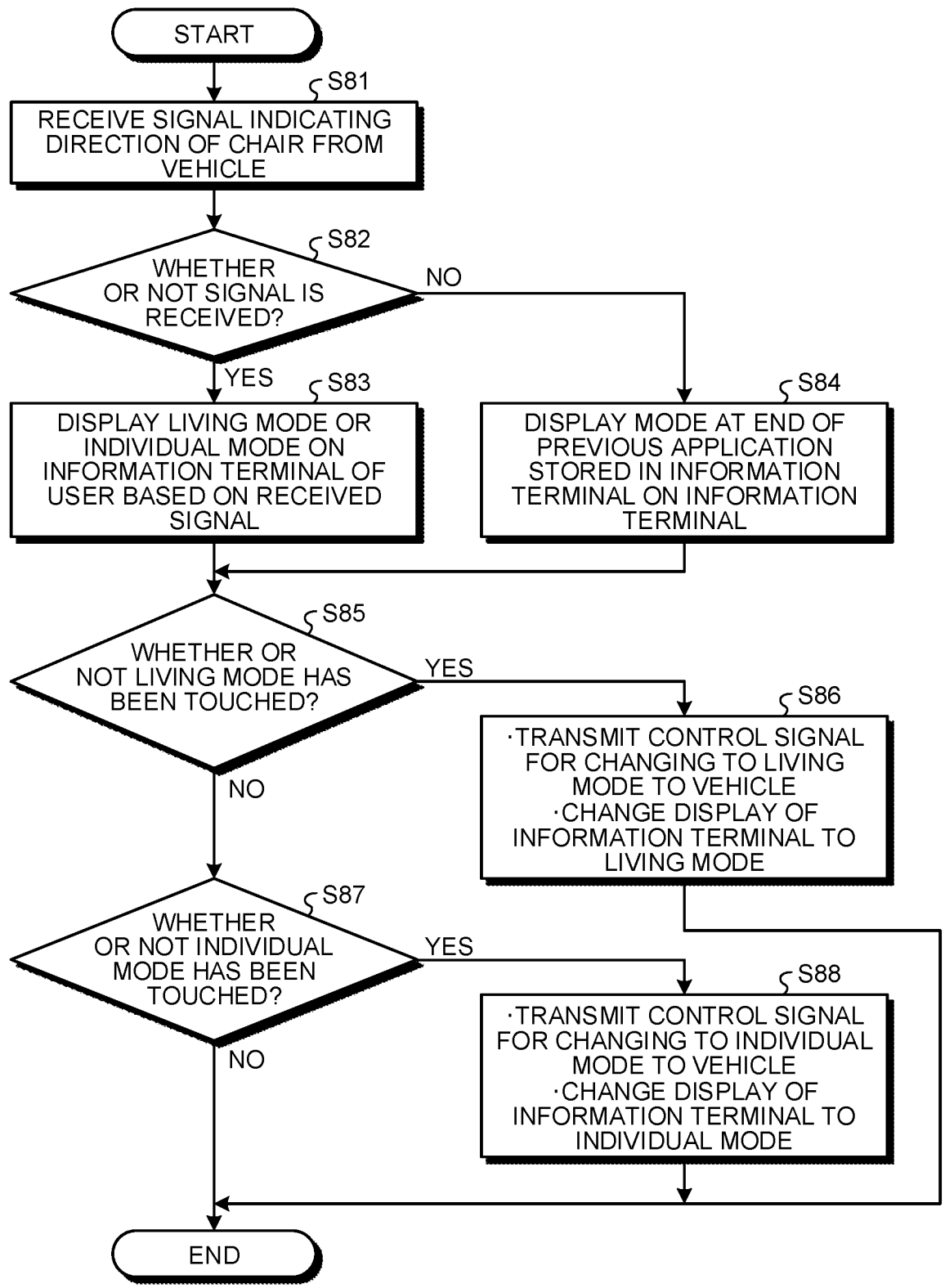
FIG. 11 is a flowchart illustrating an example of processing of changing a direction of a seat by an information terminal according to a second embodiment.

FIG. 11 is a diagram illustrating a flow when the living mode/individual mode is changed. In a case where the information terminal 10A receives the signal indicating the direction of the chair from the vehicle (Step S81, Step S82, Step S82: Yes), the information terminal 10A displays the living mode/individual mode on the user's information terminal based on the received signal (Step S83). On the other hand, in a case where the signal indicating the direction of the chair cannot be received from the vehicle due to some influence such as a communication error (Step S82: No), the information terminal 10A displays the mode at the end of the previous application stored in the information terminal 10A on the information terminal (Step S84). Note that, since the direction of the chair is assumed to be a direction state at the time of the previous application end, the mode at the time of the previous application end may be displayed on the information terminal without receiving a signal of the direction of the chair from the vehicle. When the user UA touches the living mode (Step S85, Step S85: Yes), a control signal for changing the seat arrangement to the living mode is transmitted to the vehicle. Furthermore, the display of the information terminal 10A is changed to the living mode (Step S86). When the user UA touches the individual mode (Step S85: No, Step S87, Step S87: Yes), a control signal for changing the seat arrangement to the individual mode is transmitted to the vehicle. Furthermore, the display of the information terminal 10A is changed to the individual mode (Step S88).

Figure 12:
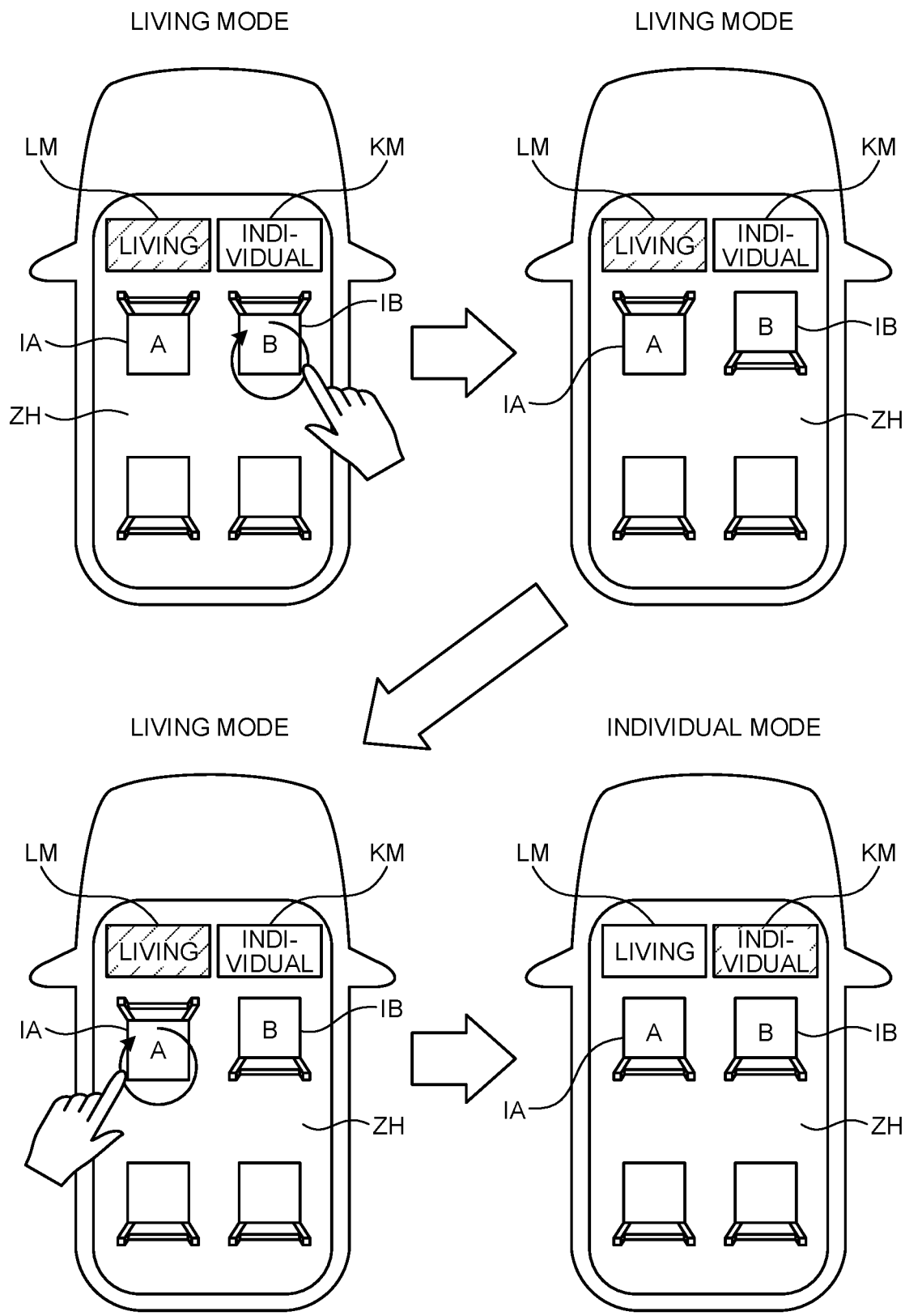
FIG. 12 is a diagram illustrating an example of a UI that changes a direction of a seat by the information terminal according to the second embodiment.

FIG. 12 is a view illustrating a UI when the direction of the seat is changed one by one. In the living mode, when the user UA operates an icon IB of a seat B so as to rotate the seat B, only the seat B rotates by 180 degrees, and the direction of the seat is changed. At this time, since the remaining seats face each other, the living mode is maintained as the mode. When there are a large number of seats in the vehicle, it may be determined that the living mode is maintained when the number of seats facing each other is larger than the number of seats not facing each other. When the user UA operates an icon IA of a seat A so as to rotate the seat A, only the seat A rotates by 180 degrees, and the direction of the seat is changed. In this case, since all the front seats face the traveling direction, the mode is changed to the individual mode.

Figure 13:
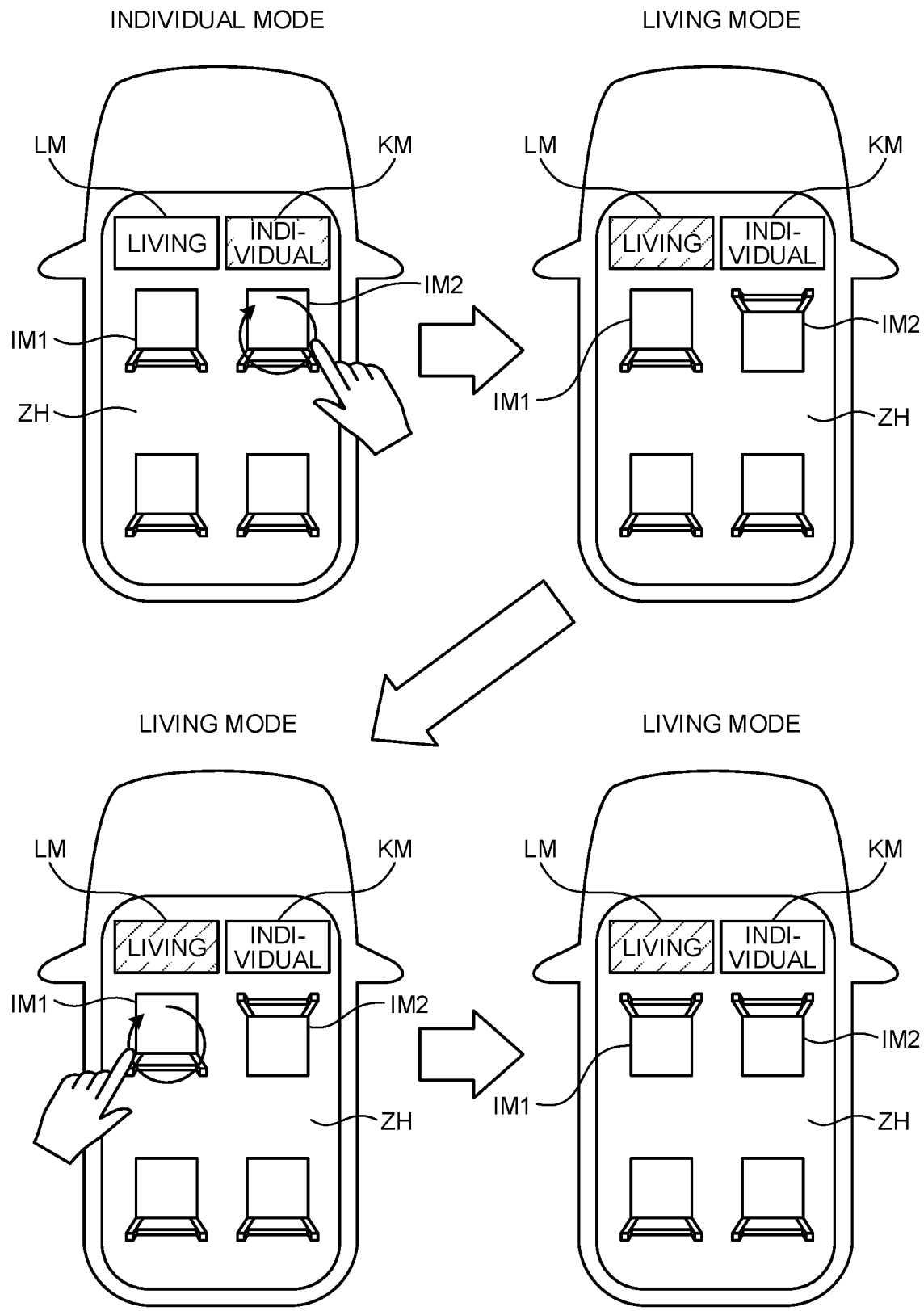
FIG. 13 is a diagram illustrating an example of a UI that changes a direction of a seat by the information terminal according to the second embodiment.

FIG. 13 is a diagram illustrating a UI when the individual mode is changed to the living mode. In the individual mode, when the user UA rotates one (for example, the front seat icon IM2) of front seat icons IM (front seat icons IM1 and IM2), three of the four seats face each other, and thus the mode shifts to the living mode. When the remaining front seat icons IM (for example, the front seat icon IM1) are rotated, all the seats face each other, and the living mode is maintained. As described above, in a case where the number of seats facing each other among the plurality of seats in the vehicle is larger than the number of seats not facing each other, the living mode is set, so that it is possible to perform temperature adjustment and dimming with priority given to a conference or a happy family scene.

FIG. 14A is a flowchart illustrating a flow of the UI of FIG. 12. In a case where the living mode is displayed on the information terminal (Step S91), it is determined whether or not the chair icon IB has been touched (Step S92). In a case where there is a touch (Step S92: Yes), a signal for rotating the chair corresponding to the chair icon IB by 180 degrees is transmitted to the vehicle. Furthermore, the chair icon IB is rotated by 180 degrees and displayed on the information terminal. At this time, since the number of chairs facing each other (three seats) is larger than the number of chairs not facing each other (one seat), the living mode is maintained (Step S93). Next, it is determined whether or not the chair icon IA has been touched (Step S94), and in a case where the chair icon IA has been touched (Step S94: Yes), a signal for rotating the chair corresponding to the chair icon IA by 180 degrees is transmitted to the vehicle. Furthermore, the chair icon IA is rotated by 180 degrees and displayed on the information terminal. At this time, since the number of chairs not facing each other (four seats) is larger than the number of chairs facing each other (0 seats), the mode is changed to the individual mode (Step S95). Here, as an example, the flow is in the order of the chair icons IA and IB, but the present invention is not limited thereto, and the chair is determined in the order of the chair icons touched by the user, and the chair is rotated.

Figure 14B:
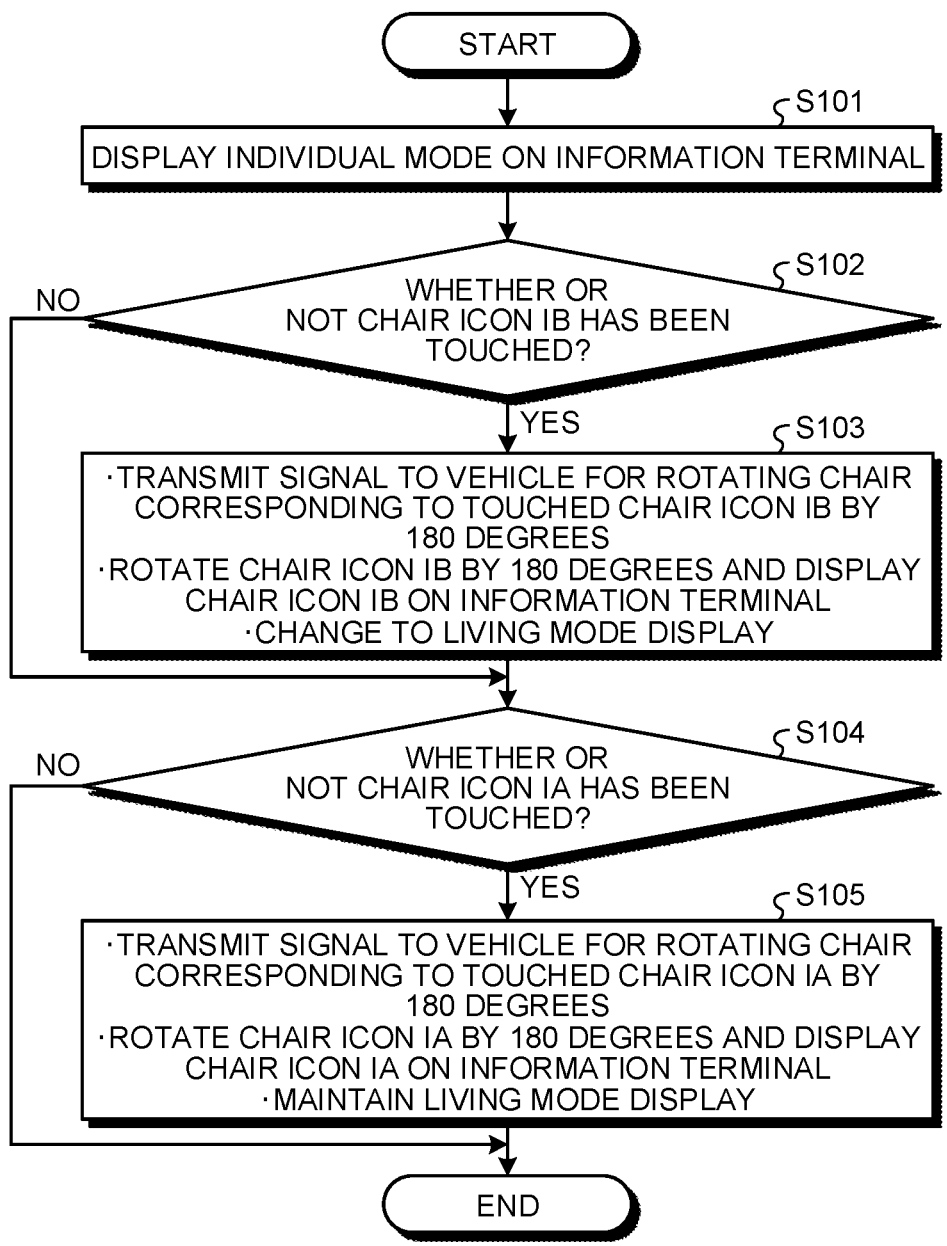
FIG. 14B is a flowchart illustrating an example of processing of changing a direction of a seat by the information terminal according to the second embodiment.

FIG. 14B is a flowchart illustrating a flow of the UI of FIG. 13. When the individual mode is displayed on the information terminal (Step S101), it is determined whether or not the chair icon IB has been touched (Step S102). When there is a touch (Step S102: Yes), a signal for rotating the chair corresponding to the chair icon IB by 180 degrees is transmitted to the vehicle. Furthermore, the chair icon IB is rotated by 180 degrees and displayed on the information terminal. At this time, since the number of chairs facing each other (three seats) is larger than the number of chairs not facing each other (one seat), the mode is changed to the living mode (Step S103). Next, it is determined whether or not the chair icon IA has been touched (Step S104), and in a case where the chair icon IA has been touched (Step S104: Yes), a signal for rotating the chair corresponding to the chair icon IA by 180 degrees is transmitted to the vehicle. Furthermore, the chair icon IA is rotated by 180 degrees and displayed on the information terminal. At this time, since the number of chairs facing each other (four seats) is larger than the number of chairs not facing each other (0 seats), the living mode is maintained (Step S105).

Figure 16:
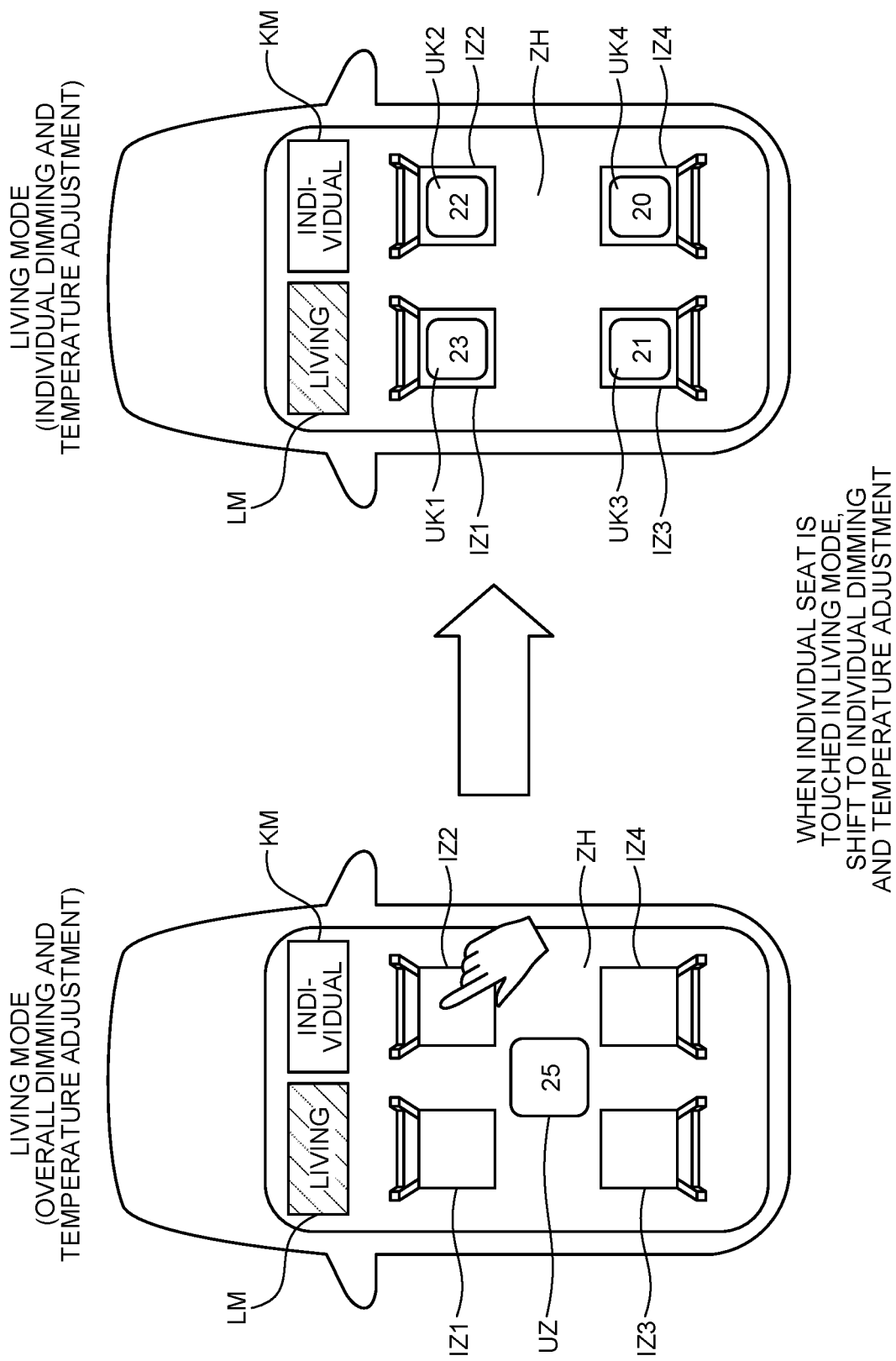
FIG. 16 is a diagram illustrating an example of processing of adjusting the temperature and lighting of the seat by the information terminal according to the second embodiment.

FIG. 16 illustrates a flow of changing from overall temperature adjustment and dimming to individual temperature adjustment and dimming of each seat in the living mode. In the living mode, since a scene such as a conference is assumed, basically, a controller UZ is displayed in the vicinity of the center of the floor plan of the vehicle by default for temperature adjustment and dimming in the entire vehicle. In the living mode, when the user determines that individual temperature adjustment and dimming of each seat are necessary, the user touches a seat icon IZ (chair icons IZ1 to IZ4). When determining that the seat icon IZ is touched in the living mode, the information terminal device displays a controller UK for temperature adjustment and dimming on each seat.

FIG. 17 illustrates a flow when the temperature adjustment and dimming of each seat is changed to the overall temperature adjustment and dimming in the living mode. In the living mode, when the user touches the vicinity of the center of the floor plan of the vehicle, the controller UK on each seat disappears, and the controller UZ for performing overall temperature adjustment and dimming is displayed in the vicinity of the center of the floor plan of the vehicle. As described above, when the information terminal determines that the vicinity of the center of the room layout in the vehicle is touched, the information terminal changes the display of the UI of the controller from the individual temperature adjustment and dimming controller UK of each seat to the overall temperature adjustment and dimming controller UZ.

FIG. 18A illustrates a processing flow when the overall temperature adjustment and dimming is changed to individual temperature adjustment and dimming in the living mode. In the living mode, the information terminal displays the controller UZ in the vicinity of the center of the room layout in the vehicle for overall temperature adjustment and dimming which are default settings (Step S111). It is determined whether any of the chair icons IZ has been touched (Step S112), and if there has been a touch (Step S112: Yes), the controller UK is displayed on each seat for individual temperature adjustment and dimming while the living mode display is maintained (Step S113).

FIG. 18B illustrates a processing flow when changing from individual temperature adjustment and dimming to overall temperature adjustment and dimming in the living mode. In the living mode, the information terminal displays the controller UK on each seat for individual temperature adjustment and dimming (Step S121). It is determined whether or not there is a touch on the vicinity of the center of the room layout in the vehicle (Step S122), and in a case where there is a touch (Step S122: Yes), the controller UZ is displayed in the vicinity of the center of the room layout in the vehicle for overall temperature adjustment and dimming while the living mode display is maintained (Step S123).

FIG. 19 illustrates a flow when changing from individual temperature adjustment and dimming to overall temperature adjustment and dimming in the individual mode. In the individual mode, since a scene in which each seat enjoys an individual private space is assumed, basically, the controller UK is displayed on each seat by default for individual temperature adjustment and dimming. In the individual mode, when the user determines that the overall temperature adjustment and dimming is necessary, the user touches the vicinity of the center of the room layout in the vehicle. When the information terminal device determines that the vicinity of the center of the floor plan of the vehicle is touched in the individual mode, the information terminal device turns off the controller UK displayed on each seat and displays the controller UZ near the center of the vehicle for overall temperature adjustment and dimming.

FIG. 20 illustrates a flow when the overall temperature adjustment and dimming is changed to individual temperature adjustment and dimming in the individual mode. In the individual mode, when one of the chair icons IZ is touched, the controller UZ displayed in the vicinity of the center of the floor plan of the vehicle disappears, and the controller UK is displayed on each seat. As described above, when the information terminal determines that any seat icon is touched, the information terminal changes the display of the UI of the controller from the overall temperature adjustment and dimming to individual temperature adjustment and dimming.

FIG. 21A illustrates a processing flow when changing from individual temperature adjustment and dimming to overall temperature adjustment and dimming in the individual mode. In the individual mode, the information terminal displays a temperature display icon (controller UK) on each seat for individual temperature adjustment and dimming which are default settings (Step S131). Furthermore, the information terminal determines whether or not there is a touch on the vicinity of the center of the interior floor plan (Step S132), and if there is a touch (Step S132: Yes), the information terminal turns off the controller UK on each seat for overall temperature adjustment and dimming while maintaining the individual mode display, and displays a temperature display icon (controller UZ) near the center of the interior floor plan (Step S133).

FIG. 21B illustrates a processing flow when the overall temperature adjustment and dimming is changed to individual temperature adjustment and dimming in the individual mode. In the individual mode, the information terminal displays a temperature display icon (controller UZ) near the center of the room layout in the vehicle for overall temperature adjustment and dimming (Step S141). It is determined whether any of the seat icons has been touched (Step S142), and when the seat icon has been touched (Step S142: Yes), a temperature display icon (controller UK) is displayed above each of the seat icons for individual temperature adjustment and dimming while maintaining the individual mode display (Step S143).

FIGS. 22 and 25A illustrate an example of temperature adjustment and dimming. In the living mode, the information terminal displays a temperature display icon (controller UZ) in the vicinity of the center of the room layout in the vehicle for overall temperature adjustment and dimming which are default settings (Step S151). Next, the information terminal determines whether the controller UZ has been touched (Step S152). When the information terminal determines that the controller UZ has been touched (Step S152: Yes), a slide bar SB1 for temperature adjustment and a slide bar SB2 for dimming (controller CL1 for temperature/illuminance adjustment) are displayed on the left and right sides of the controller UZ (Step S153). When it is determined that there is a touch on the slide bar SB1 for temperature adjustment and there is an upward slide, a control signal for raising the temperature is transmitted to the vehicle, and the color temperature of the entire floor plan of the vehicle is lowered and displayed. For example, the color is changed to a red color and displayed. When it is determined that the vehicle slides downward, a control signal for lowering the temperature is transmitted to the vehicle, and the color temperature of the entire floor plan of the vehicle is increased and displayed. For example, the color is changed to a blue color and displayed. When it is determined that the slide bar SB2 for dimming has been touched and has been slid upward, a control signal for brightening the lighting inside the vehicle is transmitted to the vehicle, and the entire color of the floor plan of the vehicle interior is changed to a yellow color and displayed. When it is determined that the vehicle has slid downward, a control signal for darkening the lighting inside the vehicle is transmitted to the vehicle, and the color of the entire floor plan inside the vehicle is changed to a gray color and displayed. As described above, at the time of overall temperature adjustment and dimming, the controller UZ in the vicinity of the center is used, and the color of the interior floor plan changes, so that it is possible to reliably adjust the temperature and illuminance intended for the entire interior without errors. The positions of the slide bars (slide bars SB1 and SB2) for adjusting the temperature and illuminance are merely an example, and the slide bars may be arranged above and below the controller UZ, or the left and right positions may be interchanged and displayed.

Figure 23:
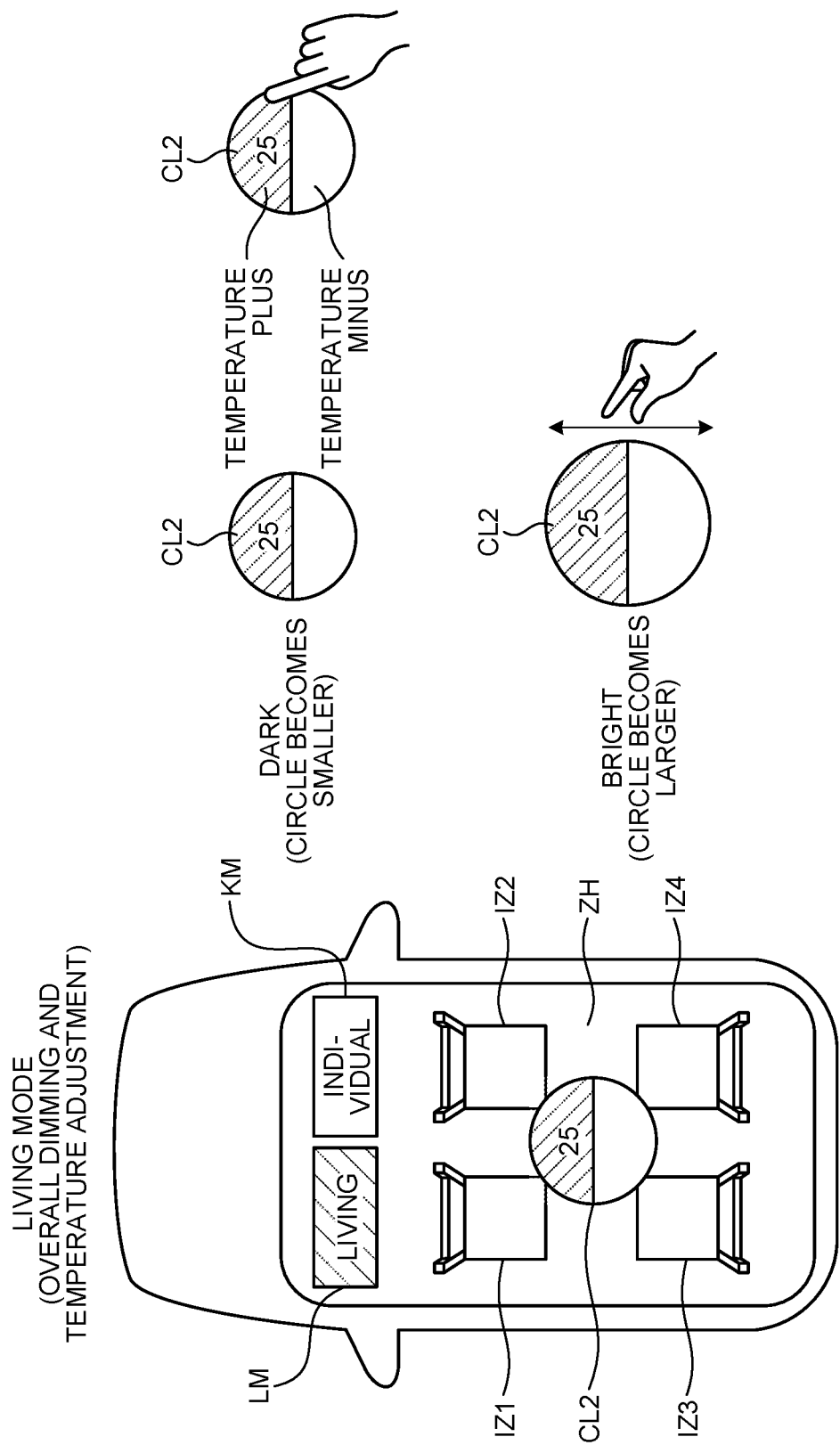
FIG. 23 is a diagram illustrating an example of processing of adjusting the temperature and lighting of the seat by the information terminal according to the second embodiment.

FIG. 23 is a diagram illustrating another form of the UI of the controller. The controller CL2 is displayed in a circular shape. When it is determined that an operation input of expanding the circle in the vertical or horizontal direction is received so as to increase the size of the circle, a control signal is transmitted to the vehicle so that the light is adjusted brightly, and the entire inside of the vehicle is changed to a yellow color and displayed. On the other hand, when it is determined that an operation input for reducing the size of the circle in the vertical or horizontal direction is received, a control signal is transmitted to the vehicle so as to adjust the light to be dark, and the entire inside of the vehicle is changed to a gray color and displayed. When it is determined that the upper half of the controller CL2 is touched, a control signal for raising the temperature in the vehicle is transmitted to the vehicle. On the other hand, when it is determined that the lower half is touched, a control signal for lowering the temperature in the vehicle is transmitted to the vehicle. Furthermore, when the temperature is raised, the color temperature in the vehicle is lowered, and when the temperature is lowered, the color temperature in the vehicle is raised and displayed.

FIGS. 24 and 25B are diagrams illustrating an example when temperature adjustment and dimming are performed for each seat individually. In the individual mode, the information terminal displays a temperature display icon (controller UK) on each seat for individual temperature adjustment and dimming (Step S161). Next, the information terminal determines whether or not the controller UK has been touched (Step S162). When the information terminal determines that one of the controllers UK on each seat is touched (Step S162: Yes), slide bars SB1 and SB2 are displayed on the left and right of the touched controller UK (Step S163). Since the operation is similar to that in FIG. 22, the description thereof is omitted. Note that a circular controller CL2 as illustrated in FIG. 23 may be used.

Figure 26:
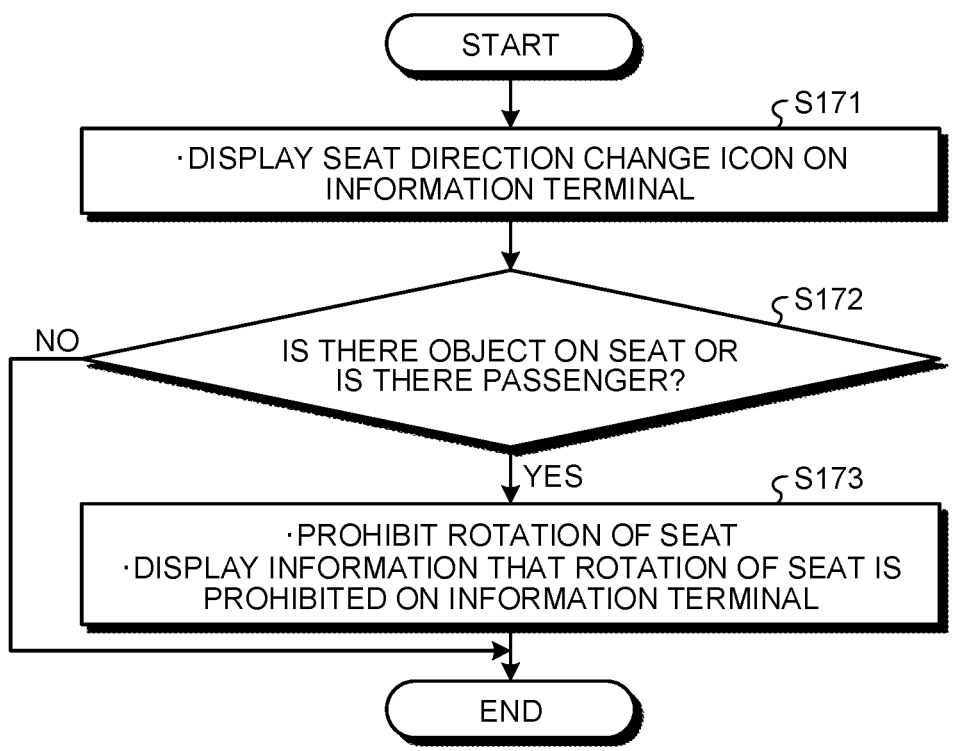
FIG. 26 is a flowchart illustrating an example of processing of changing a direction of a seat by the information terminal according to the second embodiment.

FIG. 26 is a diagram illustrating a flow of processing of prohibiting rotation of a seat in a case where an object is placed on the seat or in a case where a person is sitting, in consideration of safety. An in-vehicle monitoring system displays a seat direction change icon on the information terminal (Step S171). The in-vehicle monitoring system determines whether an object is placed on each seat or a person is seated (Steps S172), and transmits information on whether the object is placed on each seat or the person is seated to an information terminal. In a case where an instruction to rotate the seat is received with respect to the seat on which it is determined that an object is placed or a person is seated on the basis of the received information, the information terminal notifies that the seat cannot be rotated without rotating the seat (Step S173). For example, the seat may be displayed in red, blinking in red, or the like. Here, an example of rotating the seat has been described, but the present invention is not limited thereto, and an operation such as moving the seat may also be prohibited. In this manner, in a case where an object is placed on a seat or in a case where a person is sitting, it is possible to improve safety in the vehicle by prohibiting processing such as rotating or moving the seat.

Third Embodiment

Figure 27:
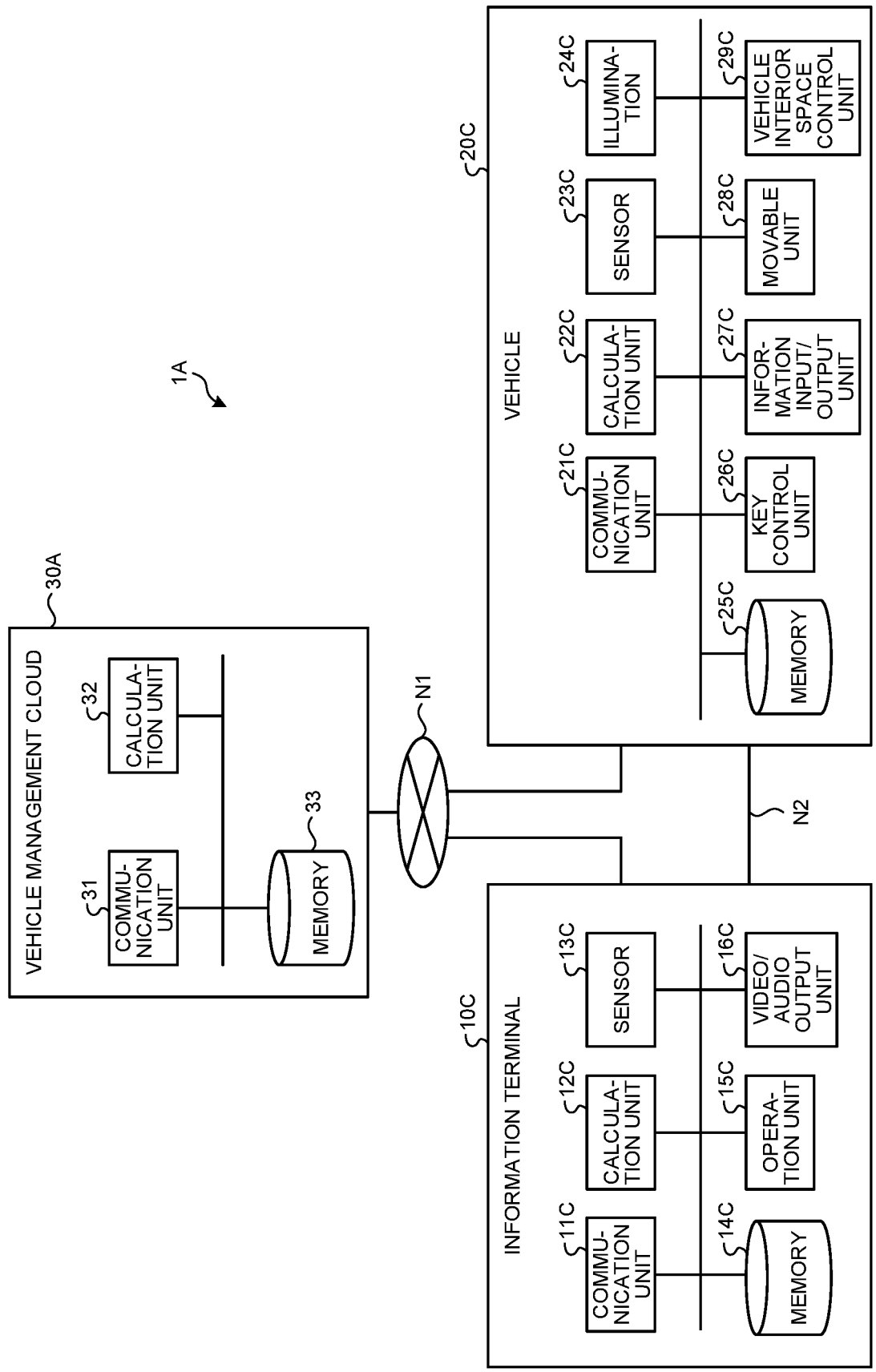
FIG. 27 is a block diagram illustrating an example of an overall configuration of a vehicle allocation system according to a third embodiment.

FIG. 27 is a block diagram illustrating an example of an overall configuration of a vehicle allocation system 1A according to an exemplary embodiment of the present disclosure. The vehicle allocation system 1A includes an information terminal 10C, a vehicle 20C, and a vehicle management cloud 30A. The information terminal 10C is an information terminal used by the user UC. Since the configurations of the information terminal 10C, the vehicle 20C, and the vehicle management cloud 30A are similar to those of the information terminal 10A, the vehicle 20A, and the vehicle management cloud 30 in FIG. 1, the description thereof will be omitted.

Figure 28:
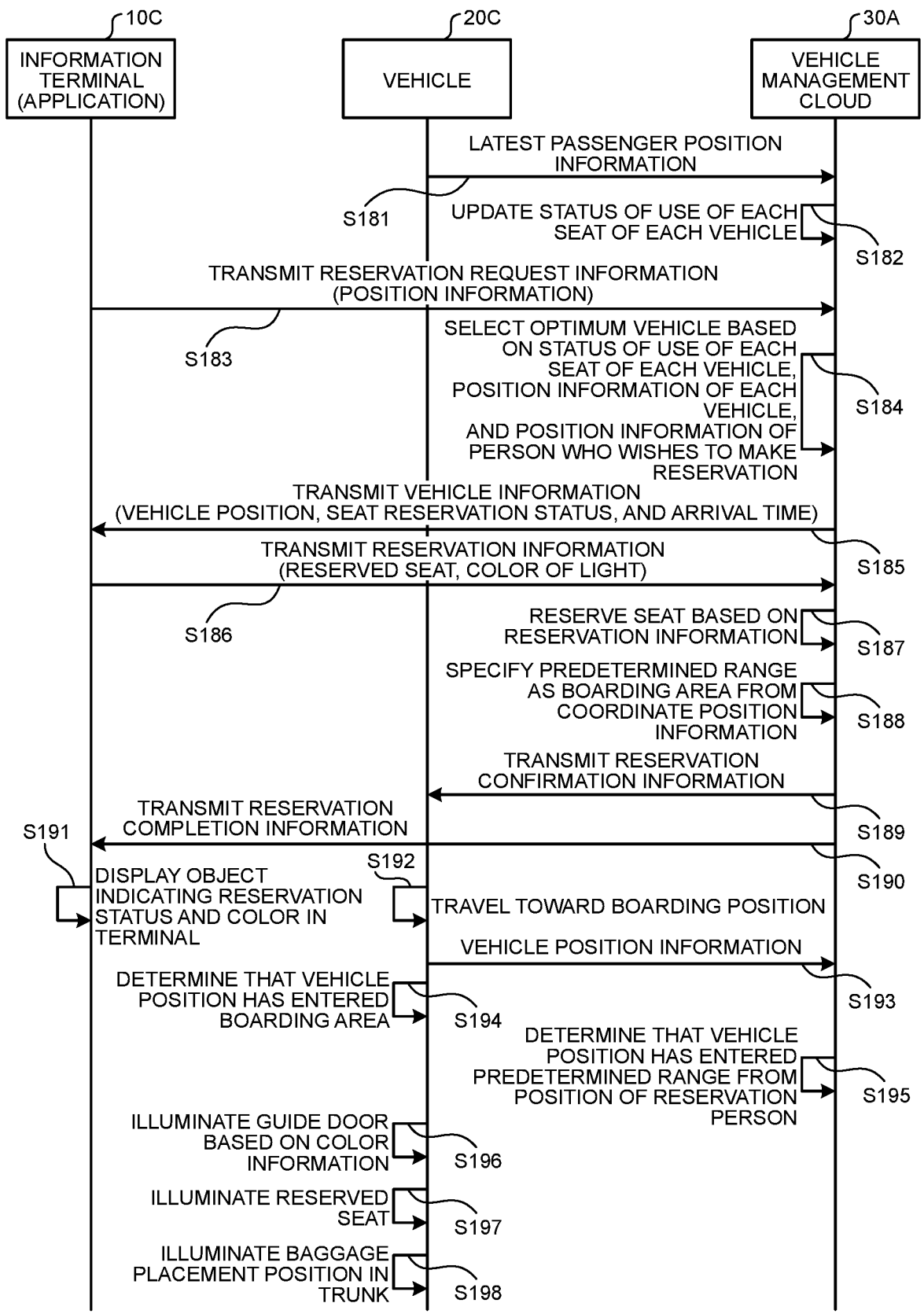
FIG. 28 is a sequence diagram illustrating an example of processing of the vehicle allocation system according to the third embodiment.

FIG. 28 is a sequence diagram illustrating an example of processing of the vehicle allocation system. Since the processing from steps S181 to S185 is similar to the processing from steps S1 to S5 in FIG. 2 of the first embodiment, the description thereof is omitted.

After the processing of Step S185, the user UC selects a reserved seat from the available seats displayed on the information terminal 10C. Furthermore, the user UC selects the color of the light used for guiding to the reserved seat. Further, the user UC selects whether or not to use the trunk. The information terminal 10C transmits the reservation information (reserved seat information, color information, and trunk use information) to the vehicle management cloud 30A (Step S186). When a plurality of vehicle candidates are displayed, the user UC specifies the vehicle candidate to be reserved and then selects the reserved seat.

The vehicle management cloud 30A reserves the seat selected by the user UC on the basis of the reservation information (Step S187). Furthermore, the vehicle management cloud 30A specifies a predetermined range from the coordinate position of the user UC as a boarding area (Step S188).

Then, the vehicle management cloud 30A transmits reservation confirmation information (coordinate position of user UC, use time, destination, destination arrival information, reserved seat information, color information, trunk use information, and boarding area information) to the vehicle 20C as reservation confirmation information (Step S189). Note that the vehicle management cloud 30A may not specify the boarding area, and the vehicle 20C may specify the boarding area from the coordinate position of the user UC. In this case, the vehicle management cloud 30A does not transmit the boarding area information to the vehicle 20C.

Furthermore, the vehicle management cloud 30A transmits the reservation completion information to the information terminal 10C (Step S190). The reservation completion information includes information on a reserved seat reserved by the user UC, color information, and seating information indicating a seat on which another passenger is seated.

Figure 31:
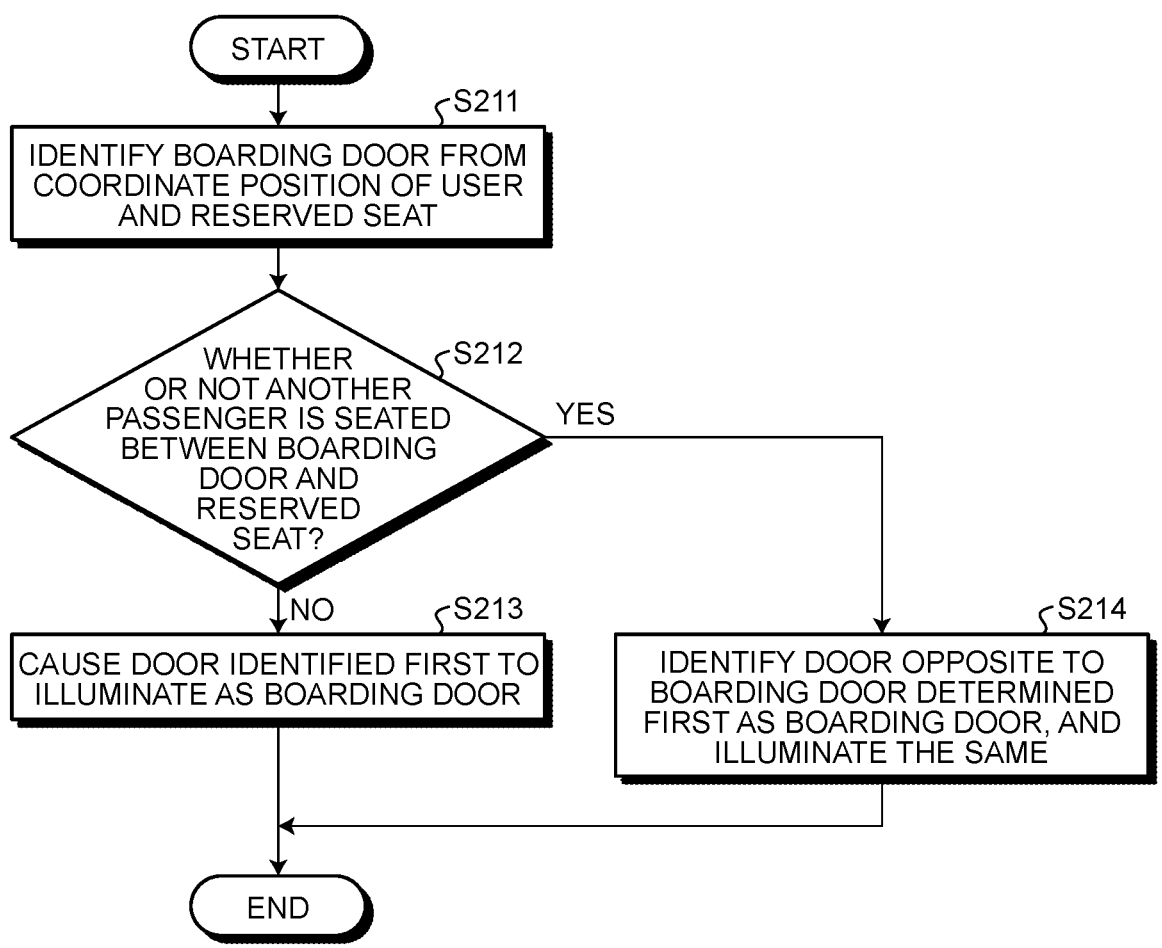
FIG. 31 is a flowchart illustrating an example of processing of specifying a boarding door according to the third embodiment.
Figure 32:
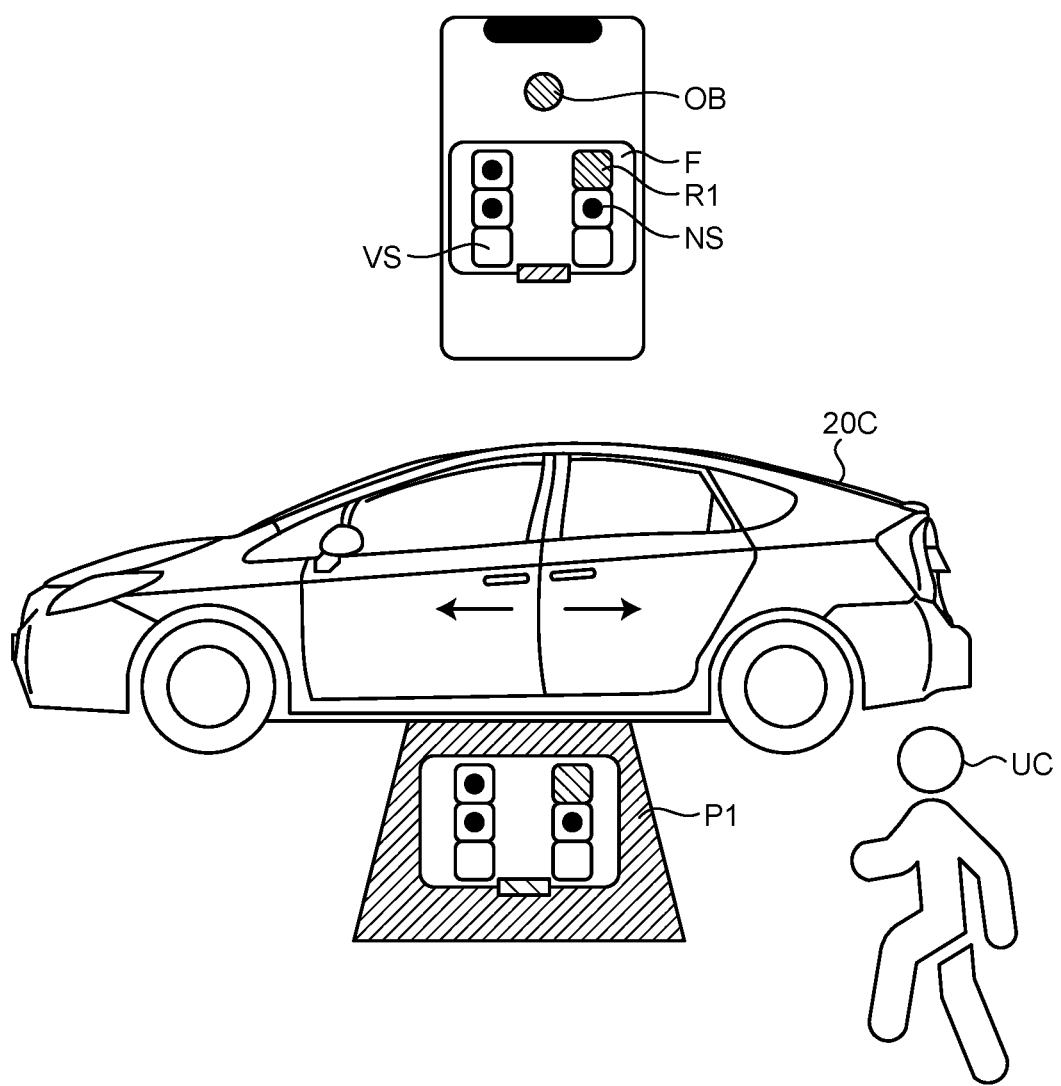
FIG. 32 is a diagram illustrating an example of guidance by a projector of the vehicle according to the third embodiment.

Based on the reservation completion information, as illustrated in FIGS. 31 and 32 described above, the information terminal 10C displays the situation inside the vehicle 20C (seating information indicating a seat on which another passenger is seated, and information of a reserved seat reserved by the user UC) and the object indicating the color information selected by the user on the display of the information terminal 10C (Step S191).

Note that, in a case where the vehicle management cloud 30A determines that the vehicle 20C has arrived within the predetermined range of the user UC, the information terminal 10C may display the fact and the color information selected by the user on the display or the like of the information terminal 10C using an object or the like. Since the user UC can confirm the color selected by the user UC in advance with the information terminal 10C, it is possible to prevent erroneous recognition.

Furthermore, in a case where the vehicle 20C detects the user UC with a sensor such as an image sensor, the information terminal 10C may cause a display or the like of the information terminal 10C to display the color information selected by the user using an object or the like together with the fact. As a result, the user can confirm immediately before boarding, and it is possible to further prevent erroneous recognition.

The vehicle 20C causes the own vehicle to travel toward the coordinate position of the user UC on the basis of the reservation confirmation information (Step S192). Furthermore, the vehicle 20C periodically transmits information on the coordinate position of the own vehicle to the vehicle management cloud 30A (Step S193).

Next, the vehicle 20C determines that the coordinate position of the own vehicle has entered the boarding area based on the reservation confirmation information (Step S194). Furthermore, the vehicle management cloud 30A determines that the vehicle position has entered the predetermined range based on the position of the reservation person (Step S195).

Next, the vehicle 20C illuminates the guide door based on the color of the light designated in Step S186 (Step S196). Furthermore, the vehicle 20C illuminates the reserved seat based on the color of the light designated in Step S186 (Step S197). Furthermore, the vehicle 20C illuminates the baggage placement position and/or the baggage lock in the trunk based on the color of the light designated in Step S186 (Step S198). Note that the processing of steps S196 to S197 may be executed simultaneously, or may be sequentially executed in the order illustrated in FIGS. 29 and 36 described later.

Figure 29:
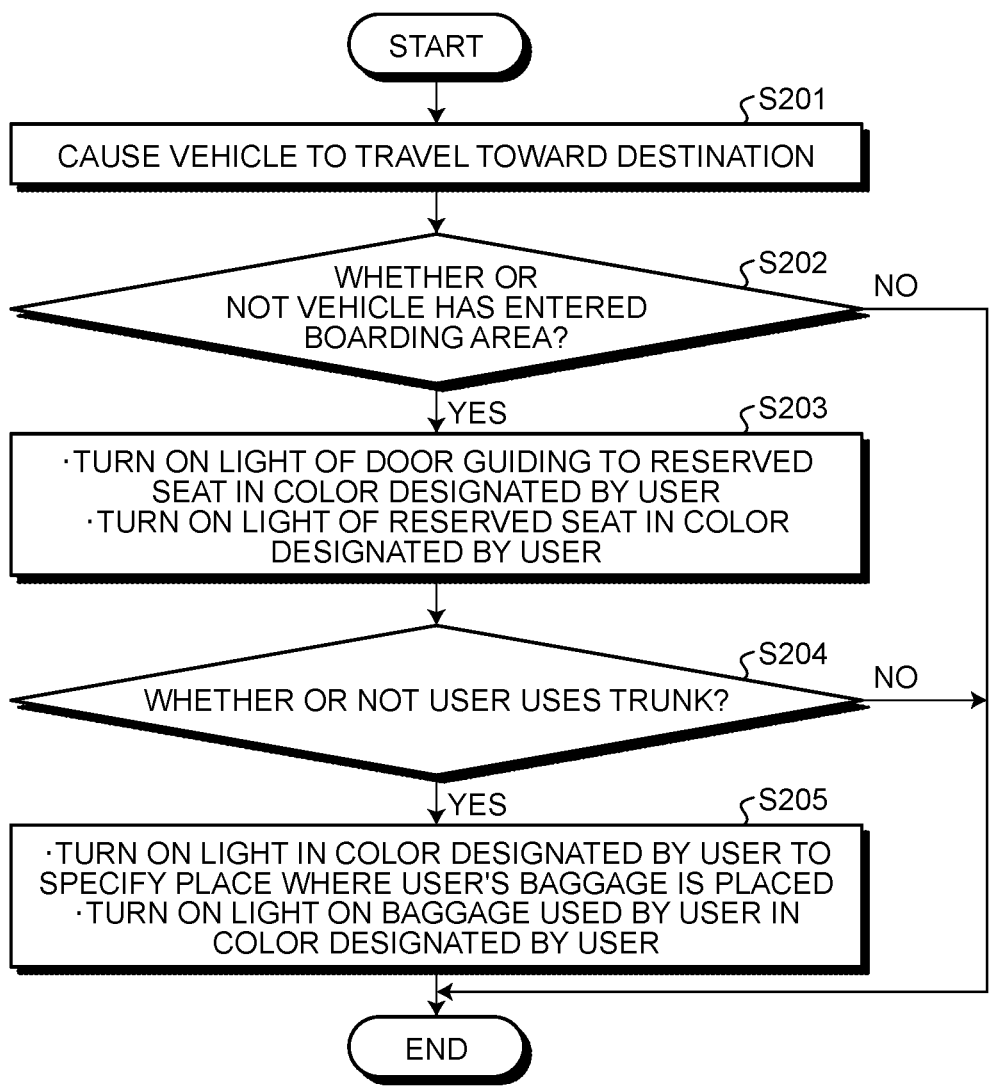
FIG. 29 is a flowchart illustrating an example of lighting processing of light when guiding a user to a reserved seat according to the third embodiment.

FIG. 29 is a flowchart illustrating an example of light lighting processing for guiding a user to a reserved seat. The vehicle 20C periodically transmits information on the coordinate position of the own vehicle to the vehicle management cloud 30A, and causes the vehicle to travel toward the coordinate position of the user UC on the basis of the reservation confirmation information (Step S201).

Next, the vehicle 20C determines whether the coordinate position of the own vehicle has entered the riding area (Step S202). In a case where it is determined that the coordinate position of the own vehicle is within the boarding area (Step S202: Yes), the light installed on the door close to the reserved seat is turned on in the color designated by the user UC (Step S203). By turning on the light of the door when the vehicle enters the boarding area, the user can recognize the boarding door in advance, and smooth boarding can be realized.

Figure 30:
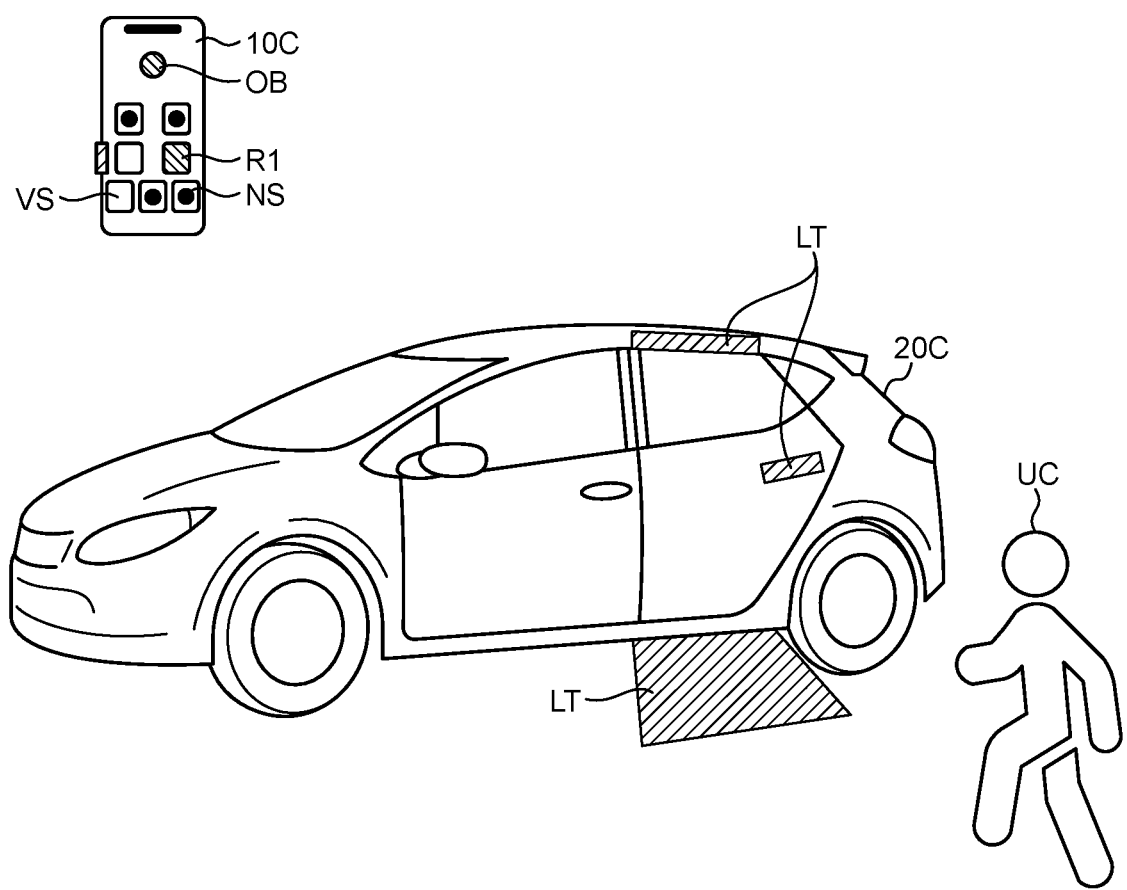
FIG. 30 is a diagram illustrating an example of guidance by light of a door of a vehicle according to the third embodiment.

Here, FIG. 30 is a diagram illustrating an example of guidance by a light of a door of the vehicle 20C. In FIG. 30, an object OB, a reserved seat R1, a vacant seat VS, and a seat NS being used are displayed on the display of the information terminal 10C.

The object OB is, for example, an icon indicating a color designated by the user UC. Furthermore, the reserved seat R1 is, for example, an icon indicating a seat reserved by the user UC. Furthermore, the vacant seat VS is, for example, an icon indicating a vacant seat among the seats of the vehicle 20C. Furthermore, the seat NS in use is an icon indicating the seat in use among the seats of the vehicle 20C.

Furthermore, in FIG. 30, the vehicle 20C lights the light LT installed on the door close to the reserved seat R1 reserved by the user UC in the same color as the object OB indicating the color designated by the user UC.

Here, FIG. 31 is a flowchart illustrating a method of identifying a boarding door. The vehicle 20C identifies the boarding door from the coordinate position of the user and the reserved seat (Step S211). Next, the vehicle 20C determines whether another passenger is seated between the boarding door and the reserved seat (Step S212). In a case where it is determined that another passenger is not seated (Step S212: No), the vehicle 20C causes the door identified first to illuminate as a boarding door (Step S213).

On the other hand, in a case where it is determined that another passenger is seated between the boarding door and the reserved seat (Step S212: Yes), the vehicle 20C identifies a door opposite to the boarding door identified first as the boarding door and illuminates the same (Step S214). As described above, by changing the boarding door according to the passenger between the boarding door and the reserved seat, smoother boarding can be realized.

Here, FIG. 32 is another example of guiding the user UC who is a reservation person to the reserved seat in the case of the double-sided automatic driving vehicle in which the doors are opened to the left and right. In the case of double doors, since the doors are simultaneously opened to the left and right, the vehicle 20C performs the same display as that displayed on the display of the information terminal 10C near the bottom of the door.

For example, when the floor plan F of the seats in the vehicle, the usage status of the seats (vacant seats VS, seats NS in use), and the reserved seat R1 are displayed on the display of the information terminal 10C, the display P1 similar to the display is displayed near the bottom of the door when the automatic driving vehicle arrives.

In this case, since the same guide diagram as the guide diagram of the inside of the vehicle 20C displayed on the display of the information terminal 10C is displayed near the bottom of the door of the arriving vehicle 20C, the user UC can smoothly know the reserved seat and can shorten the boarding time.

Furthermore, in addition to the light installed on the door, an indicator light installed on the outer surface of the vehicle may be turned on in a color designated by the user UC. For example, the visibility can be further enhanced by using an indicator light attached to the roof of the vehicle. Note that the process of turning on the indicator light in the color designated by the user UC may be performed before the vehicle management cloud 30A detects the user.

Furthermore, information indicating that the vehicle is a vehicle reserved by the user UC may be displayed on the indicator light of the vehicle 20C. For example, by displaying the reservation number of the user UC on the indicator light of the vehicle 20C, it is possible to reduce the possibility of erroneous recognition by the user UC. Furthermore, by displaying the reservation number in the color designated by the user UC, the recognition rate can be improved. Note that the processing of displaying the reservation number and the like on the indicator light may be performed before the vehicle management cloud 30A detects the user.

Figure 33:
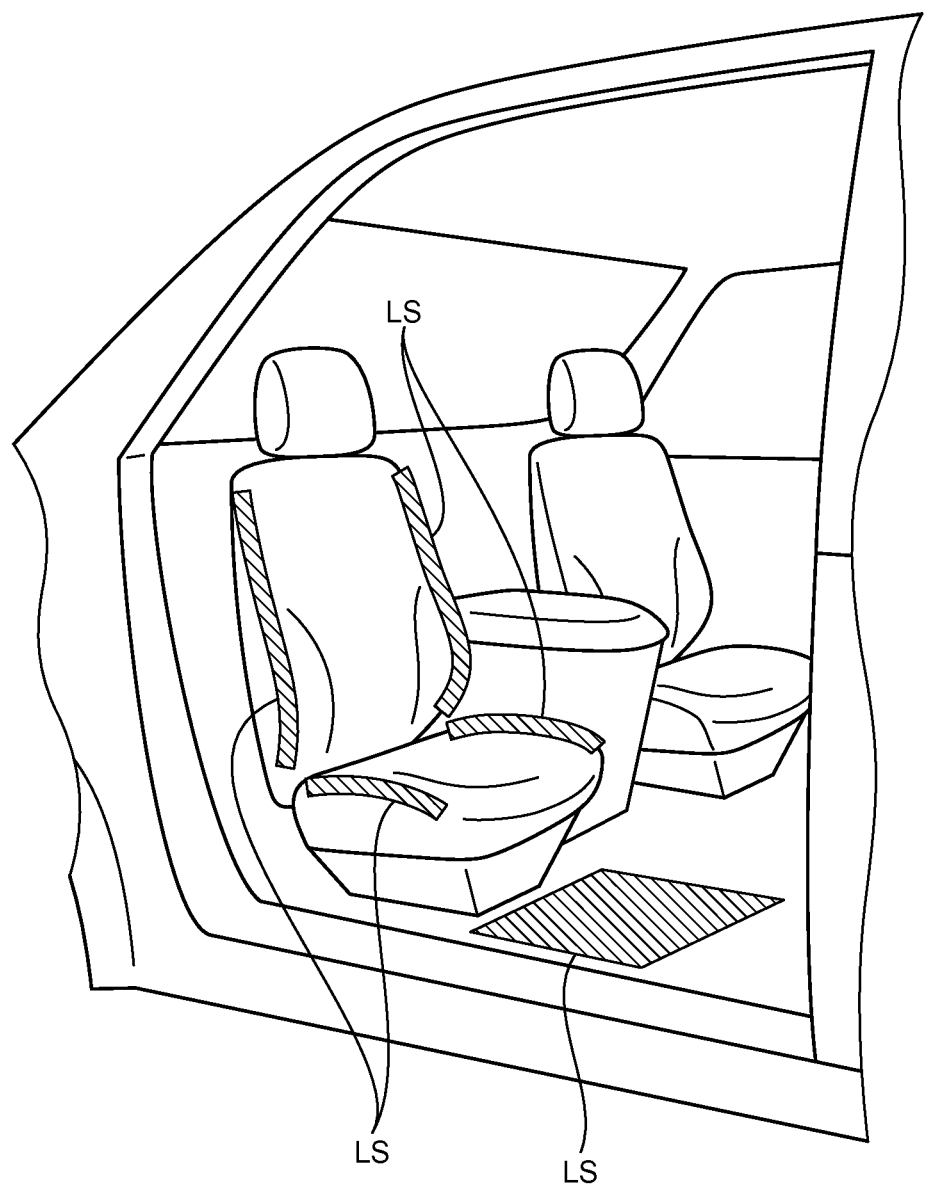
FIG. 33 is a diagram illustrating an example of guidance by light of the seat of the vehicle according to the third embodiment.

Here, FIG. 33 is a diagram illustrating an example of guidance by a light of a seat of the vehicle 20C. As illustrated in FIG. 33, the vehicle 20C lights a light LS installed in the reserved seat in the color designated by the user UC. As illustrated in FIG. 33, the light LS is installed so as to illuminate the edge of the seat and the feet of the seat, and smooth guidance by light is possible.

Furthermore, the lighting of the light installed in the seat may be started after detection of unlocking of the door that is turned on. By starting lighting after detecting the unlocking of the door, the user who gets in the vehicle can confirm the lighting of the light, and the visibility can be further enhanced.

Furthermore, the lighting of the light installed in the seat may be started simultaneously with the lighting of the light of the door. By starting at the same time as turning on the light of the door, it is possible to cause another passenger to recognize the reserved seat, and for example, in a case where baggage is placed on the reserved seat, it is possible to prepare for the user to get on, such as moving in advance, and thus, it is possible to smoothly get on.

Furthermore, in FIG. 28, whether or not the vehicle 20C has entered the boarding area is used as a reference. However, when the distance from the vehicle 20C to the boarding area is less than or equal to a predetermined distance, the lights of the doors and the lights of the seats may be turned on.

Figure 34A:
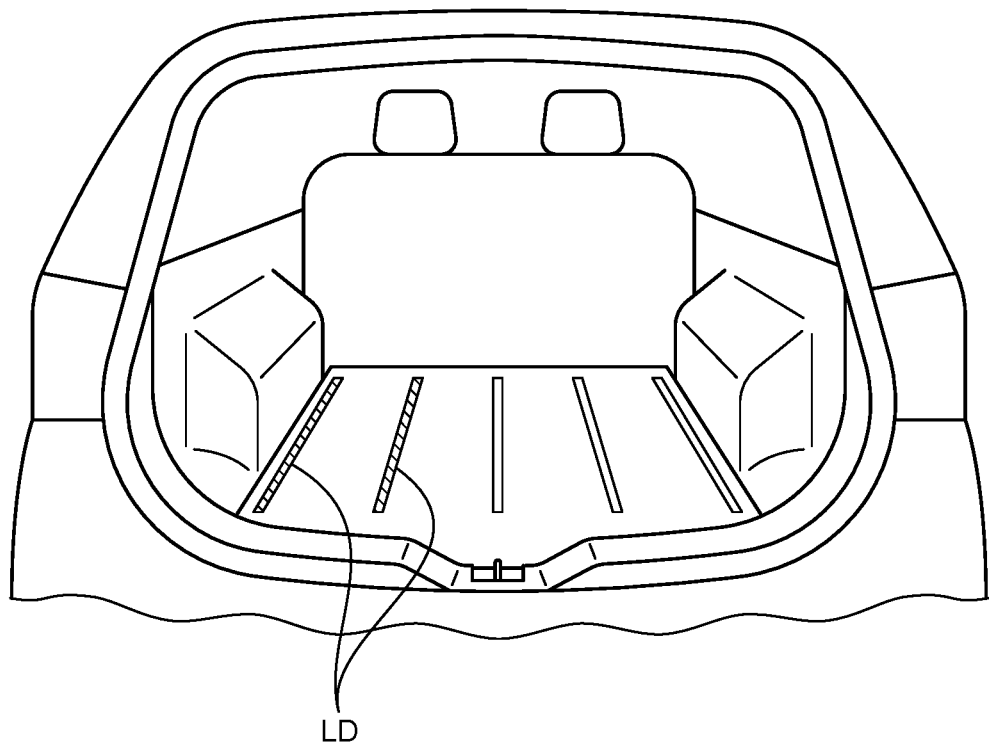
FIG. 34A is a diagram illustrating an example of guidance of a baggage placement position by light of a trunk of the vehicle according to the third embodiment.
Figure 34B:
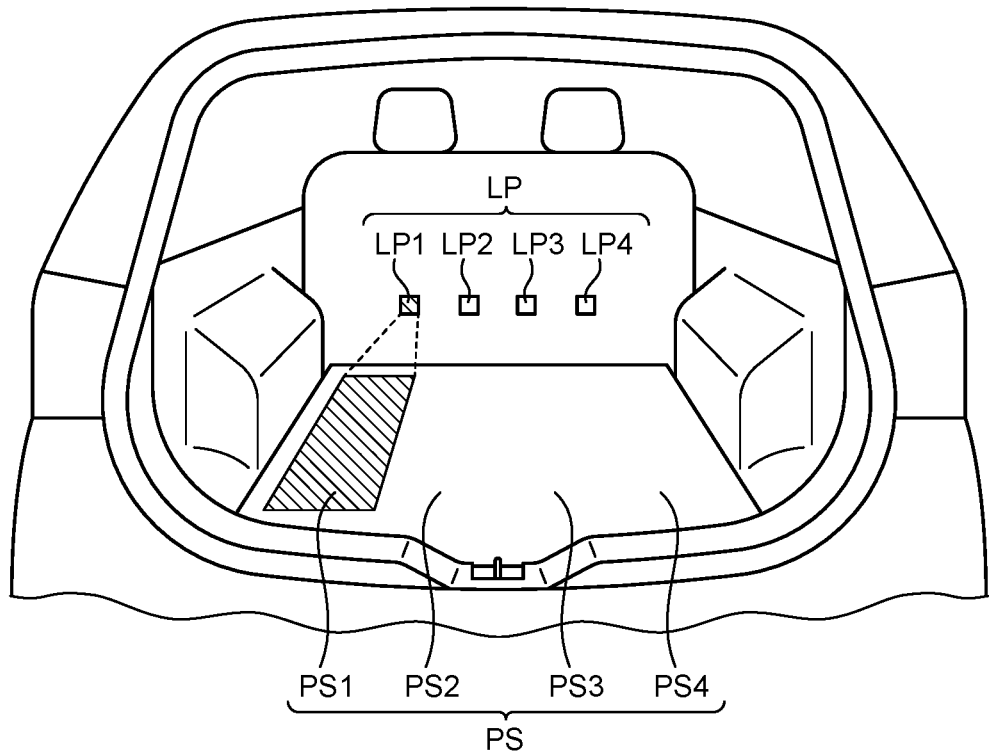
FIG. 34B is a diagram illustrating an example of guidance of the baggage placement position by light of the trunk of the vehicle according to the third embodiment.

Returning to Step S204 in FIG. 29, the description will be continued. The vehicle management cloud 30A determines whether or not the user UC uses the trunk on the basis of the trunk use information (Step S204). In a case where the user UC determines to use the trunk (Step S204: Yes), the vehicle management cloud 30A turns on the light in the trunk in the color designated by the user UC so as to specify the location where the baggage of the user UC is placed, as illustrated in FIGS. 34A and 34B (Step S205). Furthermore, as illustrated in FIG. 35, the vehicle management cloud 30A turns on the baggage lock light used by the user UC in the color designated by the user UC (Step S205).

FIG. 34A illustrates an example in which a plurality of lights LD is installed so as to partition the location of the baggage in the trunk, and a space between two lights LD to be turned on is specified as the location of the baggage. Of course, the number of lights LD to be turned on may be one, and it is sufficient that the location of the load in the trunk can be specified by turning on the lights LD. FIG. 34B illustrates an example in which the light LP is installed on the back side of the rear seat, and the location is specified by illuminating the location PS where the baggage is placed.

In FIG. 34B, a plurality of lights LP (LP1 to LP4) are installed on the back side of the rear seat, and one of the lights LP1 is used to illuminate the baggage placement location PS1 with the color designated by the user, so that the baggage placement location PS1 used by the user can be specified from the plurality of baggage placement locations (PS1 to PS4).

Figure 35:
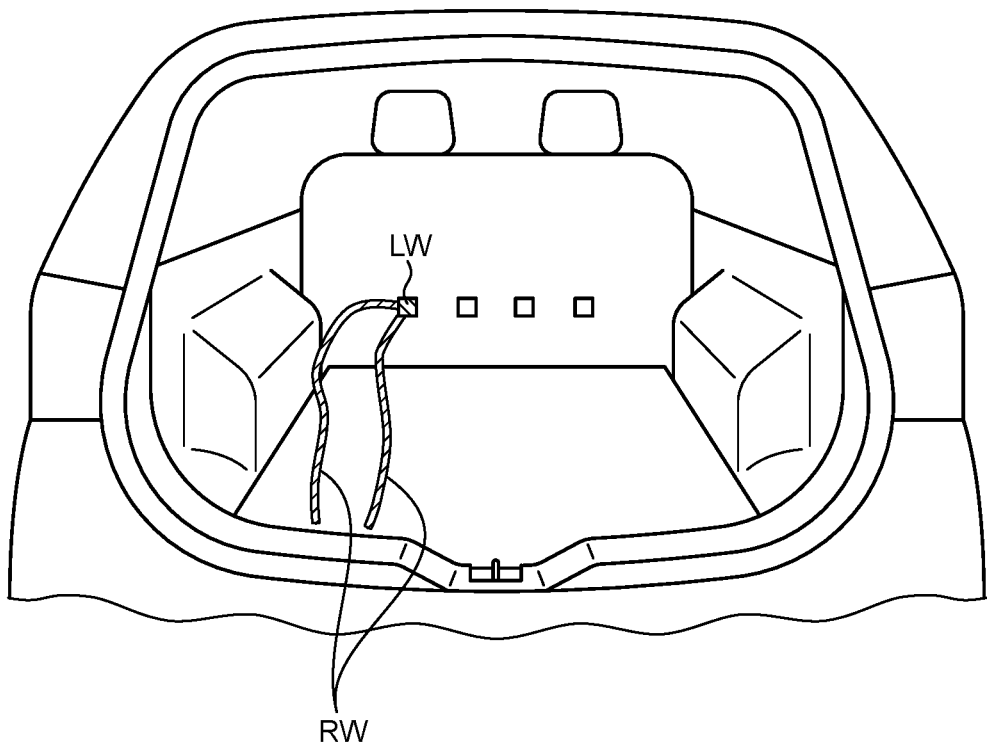
FIG. 35 is a diagram illustrating an example of guidance by light of a baggage lock in the trunk of the vehicle according to the third embodiment.

FIG. 35 illustrates an example in which a baggage lock for fixing baggage is installed in the trunk, and a light LW is installed on the baggage lock. FIG. 35 illustrates an example in which the baggage lock includes the light LW at the root portion of the baggage lock and the light RW at the locking wire portion. However, the load lock may include only one of the light LW and the light RW. Furthermore, both the light LW at the root portion of the baggage lock and the light RW at the locking wire portion may be turned on, or only one of them may be turned on.

After determining that the trunk is closed, the vehicle 20C turns off the light in the trunk or turns off the light of the baggage lock. Note that, in a case where the baggage lock is used, the vehicle 20C may turn off the light when the baggage lock is locked.

As described above, the three methods of turning on the light of the door, turning on the light of the seat, and turning on the baggage lock of the trunk are used as the guidance method of the user UC, but any two of these guidance methods may be used.

Note that, in the boarding area, when the user UC is detected using a sensor (such as an image sensor) installed in the vehicle 20C or coordinate position information transmitted from the information terminal 10C, a light installed on a door may be turned on. Since the user UC can confirm lighting of the door immediately before boarding, it is possible to improve visibility.

Furthermore, in a case where the user UC is detected, the light in the trunk may be turned on or the light of the baggage lock may be turned on. By turning on the light immediately before use by the user, power saving can be further achieved.

Here, FIG. 36 is a flowchart illustrating an example of a method of turning on a light of a door, a light of a seat, and a light of a baggage lock in a case where the user UC is detected using a sensor installed in the vehicle 20C or coordinate position information transmitted from the information terminal 10C.

FIG. 36 is different from FIG. 29 in a lighting order of lights, and FIG. 36 is different in that lighting of lights of baggage locks is prioritized over lighting of lights of doors and lights of seats. Step S221 is similar to Step S201 in FIG. 29, and thus description thereof is omitted.

Next, the vehicle 20C determines whether a user has been detected (Step S222). In a case where the vehicle 20C does not detect the user UC (Step S222: No), this process ends. Note that, in this case, the processing of Step S222 may be repeated until the vehicle 20C detects the user UC.

On the other hand, in a case where the vehicle 20C detects the user UC (Step S222: Yes), it is determined whether or not to use the trunk on the basis of the trunk use information (Step S223). When it is determined that the user UC uses the trunk (Step S223: Yes), as illustrated in FIGS. 34A to 35, the vehicle 20C turns on the light in the trunk and/or the light of the baggage lock (Step S224).

In a case where it is determined that the trunk is closed or the baggage lock is attached, the vehicle 20C turns off the light in the trunk or the light of the baggage lock, and then turns on the light of the door and the light of the seat as illustrated in FIGS. 30, 32, and 33 (Step S225). On the other hand, in a case where it is determined in Step S223 that the user UC does not use the trunk on the basis of the trunk usage information (Step S223: No), the process proceeds to Step S225 without turning on the light in the trunk or the light of the baggage lock.

Figure 37A:
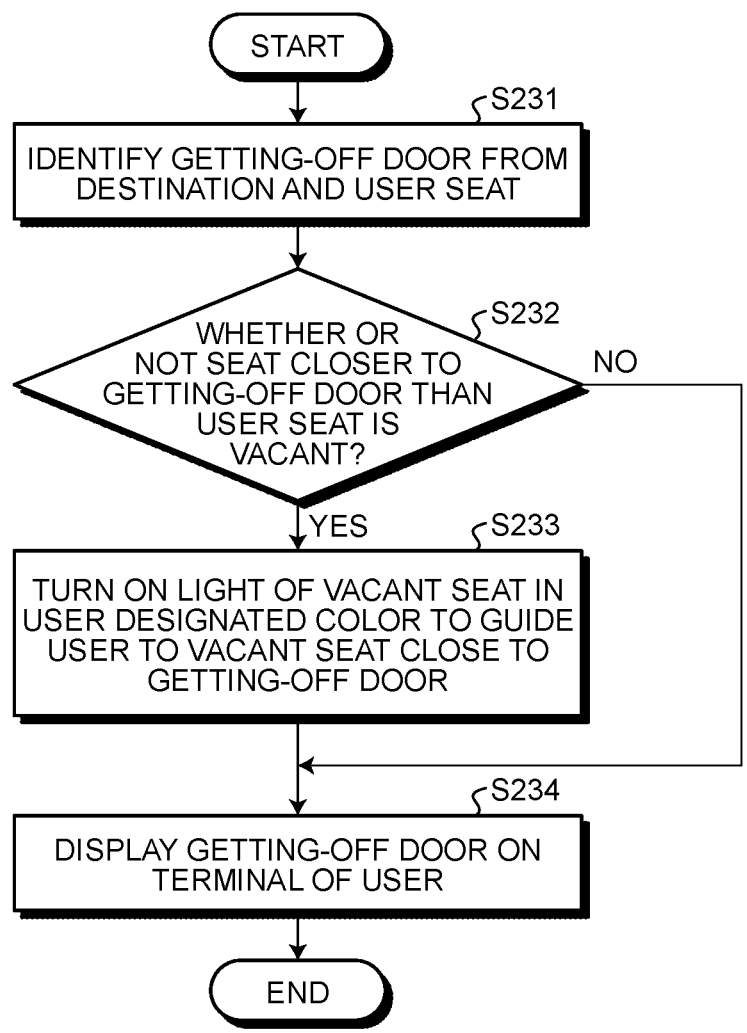
FIG. 37A is a flowchart illustrating an example of processing of guiding a user to a vacant seat closer to a getting-off door according to the third embodiment.

Note that the vehicle management cloud 30A may specify a predetermined range as a getting-off area from the destination information, and include the getting-off area in the reservation confirmation information. FIG. 37A is a flowchart illustrating an example of a process of guiding the user to a vacant seat closer to the getting-off door. In this case, as illustrated in FIG. 37A, after the vehicle 20C enters the predetermined range from the getting-off area, the vehicle management cloud 30A identifies the getting-off door on the basis of the destination and the seat information of the user (Step S231). The door closest to the user's seat on the side where the destination is located with respect to the traveling direction is specified as the getting-off door. For example, in a case where the user's seat is on the right rear side in the traveling direction and the destination is on the left side in the traveling direction, the door on the left rear side in the traveling direction is specified as the getting-off door.

Next, the vehicle management cloud 30A determines whether a seat closer to the door for getting off than the seat of the user UC is vacant (Step S232). In a case where it is determined that a seat closer to the door for getting off than the seat of the user UC is vacant (Step S232: Yes), the vehicle management cloud 30A causes the light of the vacant seat of the vehicle 20C to illuminate in the color designated by the user UC in order to guide the user UC to a vacant seat (Step S233). On the other hand, when it is determined that a seat closer to the door for getting off than the seat of the user UC is not vacant (Step S232: No), the process proceeds to Step S234.

Then, the vehicle management cloud 30A displays the getting-off door on the display of the information terminal 10C (Step S234). With such a configuration, the user UC can move to a seat close to the door when getting off the vehicle before getting off the vehicle, so that it is possible to efficiently get off the vehicle. Alternatively, the getting-off area may not be specified, and after the vehicle enters a predetermined range from the destination, it may be determined whether or not a seat closer to the door at the time of getting off is a vacant seat.

Figure 37B:
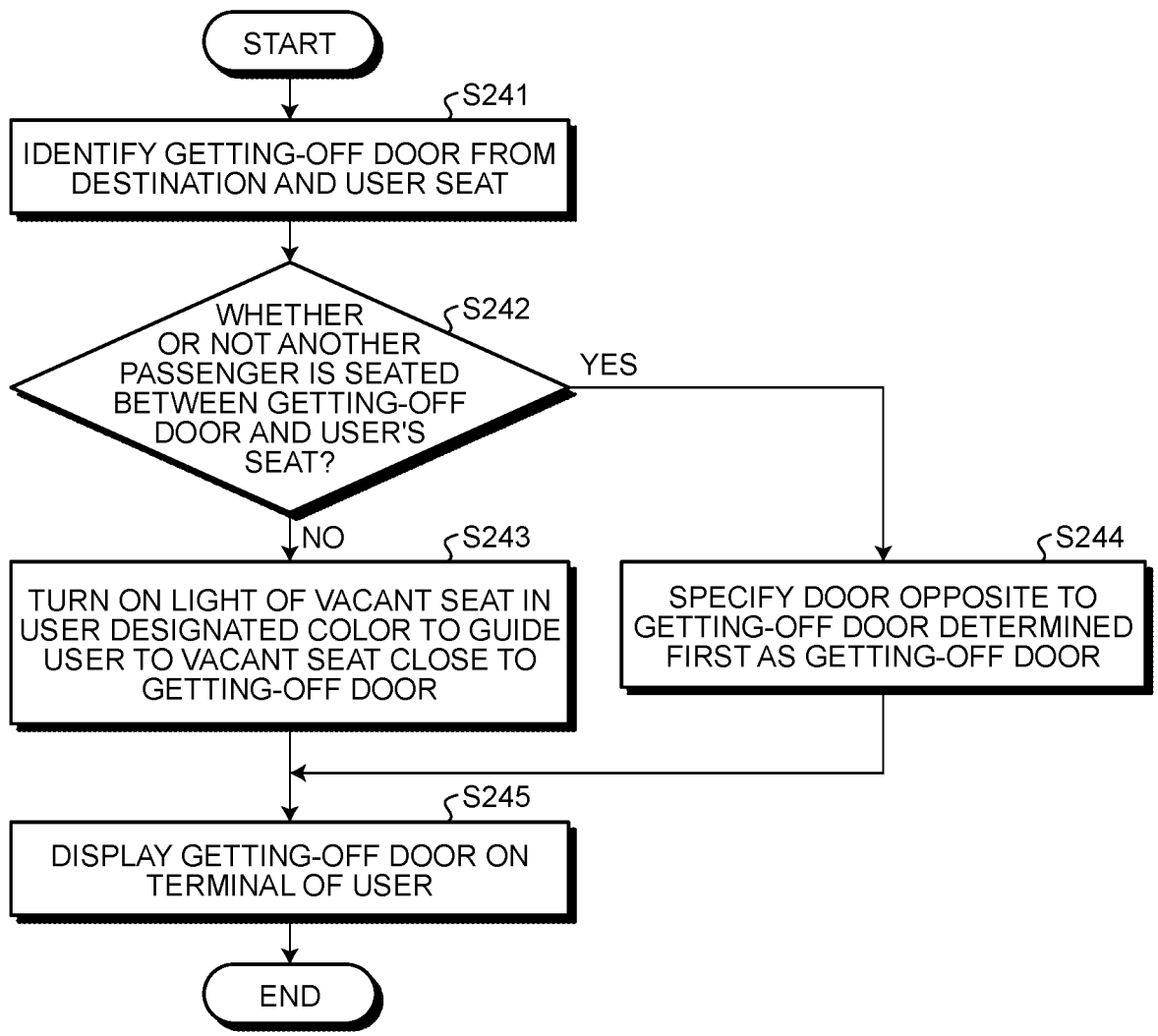
FIG. 37B is a flowchart illustrating an example of processing of specifying the getting-off door according to the third embodiment.

Here, FIG. 37B is a flowchart illustrating an example of another method of guiding the user to a vacant seat close to the getting-off door in order to make getting-off smoother. First, the vehicle management cloud 30A identifies the getting-off door from the destination and the seat information of the user (Step S241). Next, the vehicle management cloud 30A determines whether another passenger is seated between the getting-off door and the user's seat (Step S242).

When it is determined that another passenger is not seated (Step S242: No), the vehicle management cloud 30A lights light of a vacant seat in a color designated by the user in order to guide the user UC to the vacant seat close to the getting-off door (Step S243), and displays the getting-off door on the display of the information terminal 10C (Step S245).

On the other hand, in a case where it is determined that another passenger is seated between the getting-off door and the seat of the user UC (Step S242: Yes), the vehicle management cloud 30A specifies the door on the opposite side of the getting-off door as the getting-off door (Step S244), and displays the getting-off door on the display of the information terminal 10C (Step S245).

In this manner, by guiding the user to the seat close to the getting-off door, it is possible to smoothly get off the vehicle. Furthermore, when there is another passenger between the door and the seat of the user, the door on the opposite side is specified as the getting-off door, so that it is possible to improve the efficiency when getting off the vehicle. Note that the vehicle management cloud 30A may perform the above processing while the vehicle 20C is temporarily stopped due to waiting at a traffic light or the like within a predetermined range of the getting-off area for the safety of the user.

Note that, when a different user UD makes a ridesharing reservation for the vehicle 20C reserved by the user UC, the vehicle management cloud 30A performs display on the display of an information terminal 20D of the user UD so as to select from colors other than the color selected by the user UC. The vehicle management cloud 30A assigns the color selected by the user UD as the color of the user UD, and assigns the seat selected by the user UD among the available seats as the reserved seat of the user UD.

Then, the vehicle management cloud 30A transmits reservation completion information to the information terminal 20D. In this case, the operation is the same as that at the time of reservation of the user UC except that a color other than the color selected by the user UC is selected. By using different colors for the user UC and the user UD, it is possible to prevent erroneous recognition in a case where the user UC and the user UD are close to each other.

Other Embodiments

The present disclosure is not limited to the embodiments described above. The present disclosure can also include modifications or omissions added to the above embodiments and forms constructed by combining components in different embodiments within the scope conceivable by those skilled in the art without departing from the gist of the present disclosure. Other embodiments will be additionally described below.

A control method according to one aspect of the present disclosure may be a control method of a vehicle including a communication circuit capable of communicating with a computer via a network, the control method including: (A1) acquiring, from the computer via the communication circuit, first reservation information including first boarding area information indicating a first boarding area for a first user who has reserved the vehicle to board and first seat information indicating a first seat reserved by the first user among a plurality of seats of the vehicle; (A2) causing the vehicle to travel to the first boarding area based on the first boarding area information; and (A3) causing a projector provided on a side surface of the vehicle to irradiate a road surface near a bottom of a door where the first user is to board with light when the vehicle detects the first user in the first boarding area, and displaying an image indicating a position of the first seat on the road surface.

For example, the image may include a diagram illustrating an arrangement of the plurality of seats in the vehicle, and an object illustrating an area showing the first seat.

A control method according to one aspect of the present disclosure may be a control method of a terminal capable of communicating via a network with a computer that manages vehicle allocation of an autonomously traveling vehicle, the control method including: (B1) receiving selection of a first seat requested by a first user of the terminal from among a plurality of seats of the vehicle, the plurality of seats including a plurality of front seats that can be set forward or backward with respect to a traveling direction of the vehicle, and a plurality of rear seats located behind the plurality of front seats in the traveling direction; (B2) displaying, on a display of the terminal, a first object that collectively sets a vehicle interior temperature of the vehicle when the plurality of front seats and the plurality of rear seats face each other, and in response to an input operation to the first object by the first user, transmitting an instruction to control the vehicle interior temperature to the vehicle via the network; and (B3) displaying, on the display, a second object that individually sets a temperature of the first seat when the plurality of front seats and the plurality of rear seats face forward in the traveling direction, and in response to an input operation to the second object by the first user, transmitting an instruction to control the temperature of the first seat to the vehicle via the network.

A control method according to one aspect of the present disclosure may be a control method of a vehicle including a communication circuit capable of communicating with a computer via a network, the control method including: (C1) acquiring, from the computer via the communication circuit, first reservation information including first boarding area information indicating a first boarding area for a first user who has reserved the vehicle to board and first seat information indicating a first seat reserved by the first user among a plurality of seats of the vehicle; (C2) causing the vehicle to travel to the first boarding area based on the first boarding area information; and (C3) in the first boarding area, causing at least two lighting devices to emit light in a common color, the at least two lighting devices being selected from a group consisting of a first door light provided on a side surface of the vehicle and indicating a first door where the first user is to board, a first seat light provided in the vehicle and indicating the first seat reserved by the first user, and a first baggage light provided in a trunk of the vehicle and indicating an installation position where a first baggage of the first user is to be placed or a lock to be attached to the first baggage.

Note that the reference signs (A1), (A2), (A3), and the like described above are merely attached to identify each step in the control method, and do not limit the order of each step or exclude entry of other steps.

According to the present disclosure, further improvement can be made.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control method of a vehicle including a communication circuit capable of communicating with a computer via a network, the method comprising:

acquiring, from the computer via the communication circuit, first reservation information including first boarding area information indicating a first boarding area for a first user who has reserved the vehicle to board, first seat information indicating a first seat reserved by the first user among a plurality of seats of the vehicle, and first color information indicating a first color selected from a plurality of colors to identify the first user from other users who ride in the vehicle;

causing the vehicle to travel to the first boarding area based on the first boarding area information; and causing, in the first boarding area, at least two lighting devices to emit light of the first color based on the first color information, the at least two lighting devices being selected from a group consisting of a first door light provided on a side surface of the vehicle and indicating a first door where the first user is to board, a first seat light provided in the vehicle and indicating the first seat reserved by the first user, and a first baggage light provided in a trunk of the vehicle and indicating an installation position where a first baggage of the first user is to be placed or a lock to be attached to the first baggage, wherein the vehicle includes, in the trunk, a plurality of locking wires that are respectively to be attached to and locked to pieces of baggage of a plurality of users, and the first baggage light is provided on a first locking wire that is to be attached to and locked to the first baggage of the first user.

2. A control method of a vehicle including a communication circuit capable of communicating with a computer via a network, the method comprising:

acquiring, from the computer via the communication circuit, first reservation information including first boarding area information indicating a first boarding area for a first user who has reserved the vehicle to board, first seat information indicating a first seat reserved by the first user among a plurality of seats of the vehicle, and first color information indicating a first color selected from a plurality of colors to identify the first user from other users who ride in the vehicle;

causing the vehicle to travel to the first boarding area based on the first boarding area information; and causing, in the first boarding area, at least two lighting devices to emit light of the first color based on the first color information, the at least two lighting devices being selected from a group consisting of a first door light provided on a side surface of the vehicle and indicating a first door where the first user is to board, a first seat light provided in the vehicle and indicating the first seat reserved by the first user, and a first baggage light provided in a trunk of the vehicle and indicating an installation position where a first baggage of the first user is to be placed or a lock to be attached to the first baggage, wherein the first reservation information further includes baggage information indicating whether or not the first user requests to use the trunk of the vehicle, and the control method further comprises:

when the first user requests to use the trunk based on the baggage information, causing the first baggage light to emit the light of the first color after detecting the first user, turning off the first baggage light after the first user places the first baggage at the installation position or attaches the lock to the first baggage, and causing the first door light to emit the light of the first color after turning off the first baggage light; and when the first user does not request to use the trunk based on the baggage information, causing the first door light to emit the light of the first color without causing the first baggage light to emit the light after detecting the first user.

* * * * *